US008407417B2

(12) United States Patent
Matsuda et al.

(10) Patent No.: US 8,407,417 B2
(45) Date of Patent: Mar. 26, 2013

(54) STORAGE SYSTEM PROVIDING VIRTUAL VOLUMES

(75) Inventors: Ken Matsuda, Odawara (JP); Daisuke Orikasa, Odawara (JP); Yutaka Takata, Ninomiya (JP); Yoshiaki Eguchi, Yokohama (JP); Ai Satoyama, Sagamihara (JP); Yoichi Mizuno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 441 days.

(21) Appl. No.: 12/678,227

(22) PCT Filed: Dec. 24, 2009

(86) PCT No.: PCT/JP2009/007208
§ 371 (c)(1),
(2), (4) Date: Mar. 15, 2010

(87) PCT Pub. No.: WO2011/077490
PCT Pub. Date: Jun. 30, 2011

(65) Prior Publication Data
US 2011/0246739 A1 Oct. 6, 2011

(51) Int. Cl.
*G06F 12/10* (2006.01)
(52) U.S. Cl. ........ 711/114; 711/165; 711/170; 711/203; 718/104
(58) Field of Classification Search .................. 711/114, 711/165, 203, 170; 718/104
See application file for complete search history.

(56) References Cited

U.S. PATENT DOCUMENTS

| | | | |
|---|---|---|---|
| 6,816,957 B1* | 11/2004 | Halladay et al. | 711/170 |
| 7,035,883 B2 | 4/2006 | Kezuka et al. | |
| 7,398,418 B2 | 7/2008 | Soran et al. | |
| 2002/0049824 A1* | 4/2002 | Wilson | 709/213 |
| 2002/0059539 A1 | 5/2002 | Anderson | |
| 2003/0114177 A1* | 6/2003 | Sinnarajah et al. | 455/515 |
| 2006/0047930 A1 | 3/2006 | Takahashi et al. | |
| 2006/0155950 A1* | 7/2006 | Smith | 711/171 |
| 2006/0242376 A1 | 10/2006 | Tsuge et al. | |
| 2007/0055713 A1 | 3/2007 | Nagai et al. | |
| 2007/0185902 A1 | 8/2007 | Messinger et al. | |
| 2007/0226631 A1 | 9/2007 | Tevis | |
| 2009/0043942 A1* | 2/2009 | Shiga | 711/4 |
| 2009/0144732 A1* | 6/2009 | Tanaka | 718/1 |

FOREIGN PATENT DOCUMENTS

| | | |
|---|---|---|
| JP | 2001-519563 A | 10/2001 |
| JP | 2006-302077 A | 11/2006 |
| JP | 2007-200333 A | 8/2007 |
| JP | 2007-234006 A | 9/2007 |
| JP | 2008-47156 A | 2/2008 |
| JP | 2009-43055 A | 2/2009 |
| JP | 2009-134397 A | 6/2009 |

* cited by examiner

*Primary Examiner* — Jae Yu
(74) *Attorney, Agent, or Firm* — Mattingly & Malur, PC

(57) ABSTRACT

Multiple storage area groups into which multiple storage areas provided by multiple storage devices are classified with reference to storage area attributes are managed. The multiple logical volumes to which, in accordance with a write request to at least one address included in multiple addresses in the logical volume, at least one storage area included in the multiple storage areas is allocated are provided. In accordance with the access condition of the at least one address in the logical volume, the data written to the at least one address by the write request is migrated from the at least one storage area included in one of the multiple storage area groups to at least one storage area in another storage area group included in the multiple storage area groups.

21 Claims, 39 Drawing Sheets

| RVOL TYPE | TIER ID |
|---|---|
| SSD | 00 |
| HDD-SAS(15K) | 01 |
| HDD-SAS(10K) | 02 |
| HDD-SATA | 03 |
| ... | ... |

| POOL ID | TIER ID | TIER RANGE | PVOL ID | TIER THRESHOLD | USAGE RATE | ACTUAL PAGE ID |
|---|---|---|---|---|---|---|
| 00 | 00 | 1000-5000 | 00 | 90% | 75% | 00000-00999 |
|  |  |  | 02 |  |  |  |
|  |  |  | ⋮ |  |  |  |
|  | 01 | 0-999 | 04 | 80% | 75% | 01000-02999 |
|  |  |  | ⋮ |  |  |  |
|  |  |  | ⋮ |  |  |  |
| ⋮ | ⋮ | ⋮ | ⋮ | ⋮ | ⋮ | ⋮ |

| RG ID | PDEV ID | TYPE | PVOL ID | CAPACITY |
|---|---|---|---|---|
| 00 | 01-04 | SSD | 01 | 500GB |
| | | | 02 | 500GB |
| 01 | 05-08 | HDD-SAS(15K) | 03 | 500GB |
| | | | 04 | 500GB |
| | | | 05 | 500GB |
| ... | ... | ... | ... | ... |

| VVOL ID | VIRTUAL PAGE ID | POOL ID | ACTUAL PAGE ID | TIER ID |
|---|---|---|---|---|
| 00 | 00000 | 00 | 00010 | 01 |
| | 00001 | 00 | 00100 | 00 |
| | ... | ... | ... | ... |
| 01 | 00000 | 00 | 00020 | 01 |
| | 00001 | - | - | - |
| ... | ... | ... | ... | ... |

| POOL ID | ACTUAL PAGE ID | STATUS |
|---|---|---|
| 00 | 00000 | ON USE |
| | 00001 | FREE |
| ... | ... | ... |

| VVOL ID | TOTAL NUMBER OF I/OS | AVERAGE NUMBER OF I/OS | MAXIMUM NUMBER OF I/OS | LAST I/O TIME |
|---|---|---|---|---|
| 00 | 10001 | 1000 | 2000 | 17:00 |
| 01 | — | — | — | — |
| ... | ... | ... | ... | ... |

409B

| VVOL ID | VIRTUAL PAGE ID | TOTAL NUMBER OF I/OS | AVERAGE NUMBER OF I/OS | MAXIMUM NUMBER OF I/OS | LAST I/O TIME |
|---|---|---|---|---|---|
| 00 | 00000 | 1000 | 100 | 200 | 17:00 |
|  | 00001 | 20 | 2 | 5 | 12:00 |
|  | ... | ... | ... | ... | ... |
| 01 | 00000 | — | — | — | — |
|  | 00001 | — | — | — | — |
|  | ... | ... | ... | ... | ... |

FIG.13

| VVOL ID | AVERAGE NUMBER OF I/OS | NUMBER OF PAGES |
|---|---|---|
| 00 | 0 | 561 |
| | 1 | 27 |
| | 2 | 141 |
| | 3 | 57 |
| | 4-7 | 72 |
| | 8-15 | 236 |
| | 16-31 | 0 |
| ... | ... | ... |

| VIRTUAL PAGE ID | MIGRATION SOURCE TIER ID | MIGRATION DESTINATION TIER ID | MIGRATION STATUS |
|---|---|---|---|
| 10001 | 00 | 01 | COMPLETED |
| 10002 | 01 | 02 | COMPLETED |
| 10005 | 02 | 03 | IN PROCESS |
| 10008 | 03 | 01 | IN PROCESS |
| 10014 | 01 | 00 | NOT COMPLETED |
| ... | ... | ... | ... |

| VVOL ID | PAGE-BASED MIGRATION | VVOL-BASED MIGRATION | TIER MAINTENANCE | ALLOCATED TIER ID | STORAGE THRESHOLD |
|---|---|---|---|---|---|
| 00 | ON | OFF | ON | 00 | 80% |
|  |  |  |  | 01 | INVALID |
|  |  |  |  | 03 | INVALID |
| 01 | OFF | ON | OFF | 01 | 70% |
|  |  |  |  | 02 | INVALID |
| 02 | OFF | OFF | ON | 02 | INVALID |
|  |  |  |  | 03 | 70% |
| ... | ... | ... | ... | ... | ... |

POOL DEFINITION — 1700

| | |
|---|---|
| POOL ID | 00 ▶ |
| HIERARCHIZATION | ● ON  ○ OFF |
| REALLOCATION | ● ON  ○ OFF |
| AUTOMATIC PERFORMANCE | ○ ON  ● OFF |
| PERFORMANCE CYCLE | 1 DAY ▶ |
| PERFORMANCE TIME | 24:00 ▶ |
| MONITOR TIME ZONE | FROM 07:00 ▶ TO 23:00 ▶ |
| TIER THRESHOLD | 90%  ○ COMMON  ● INDIVIDUAL  TIER 00 90%  01 80%  03 70% |

APPLY    CANCEL

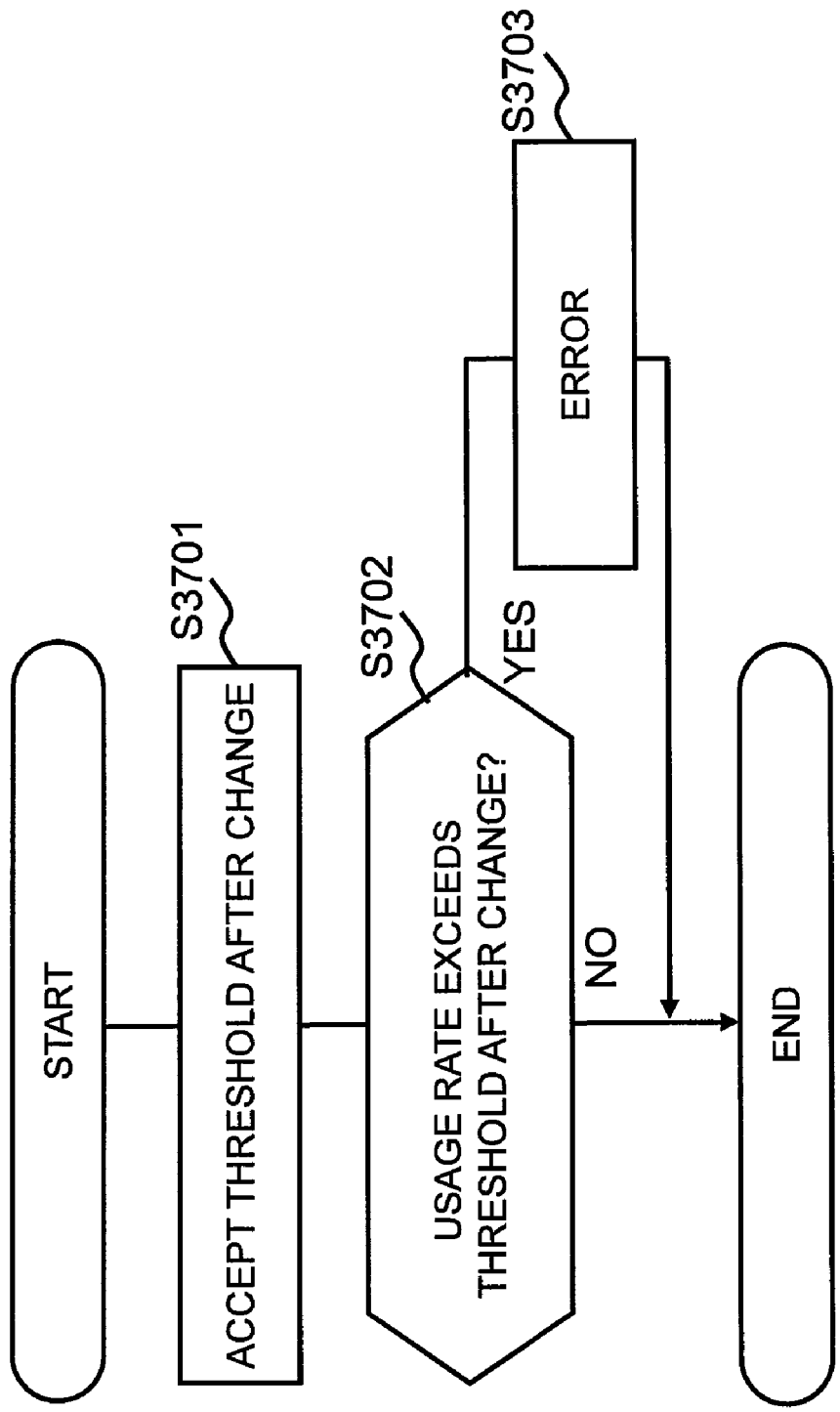

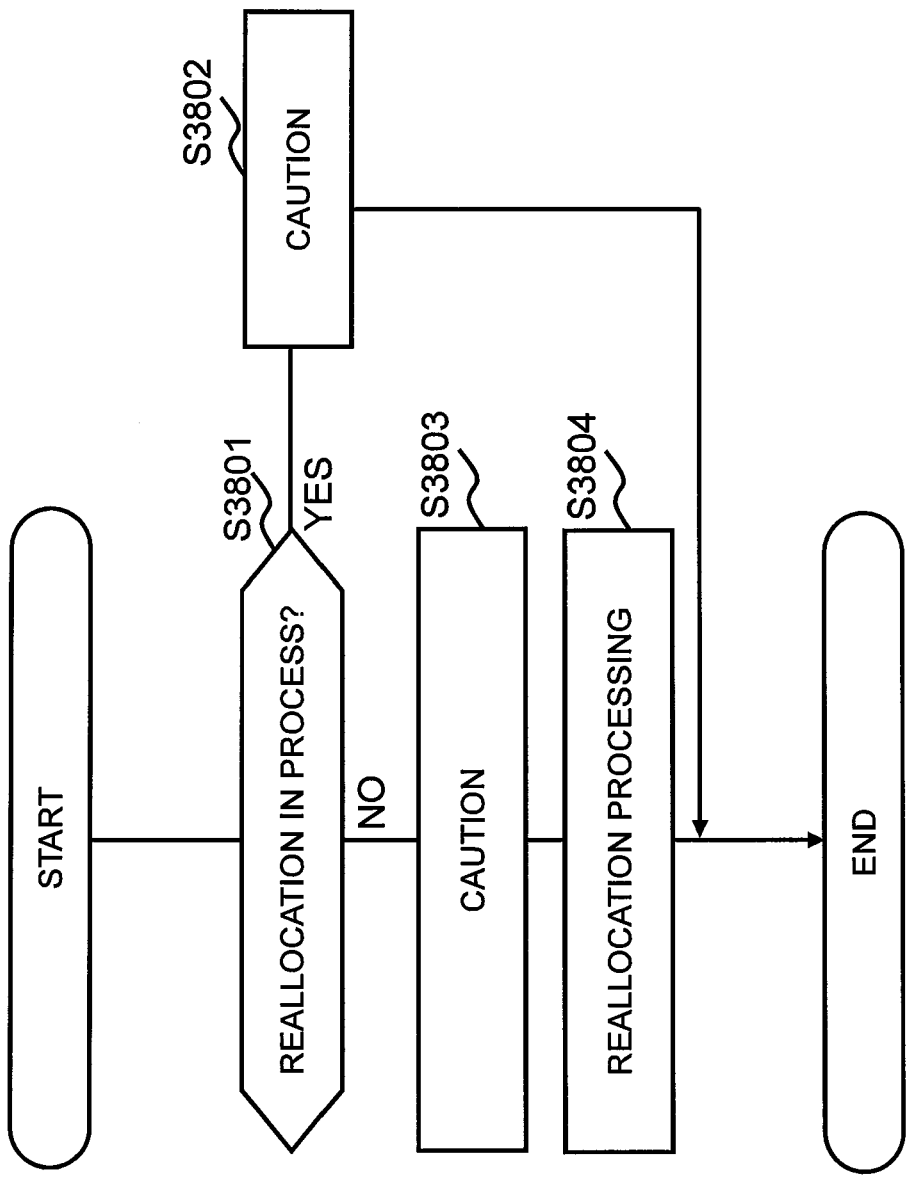

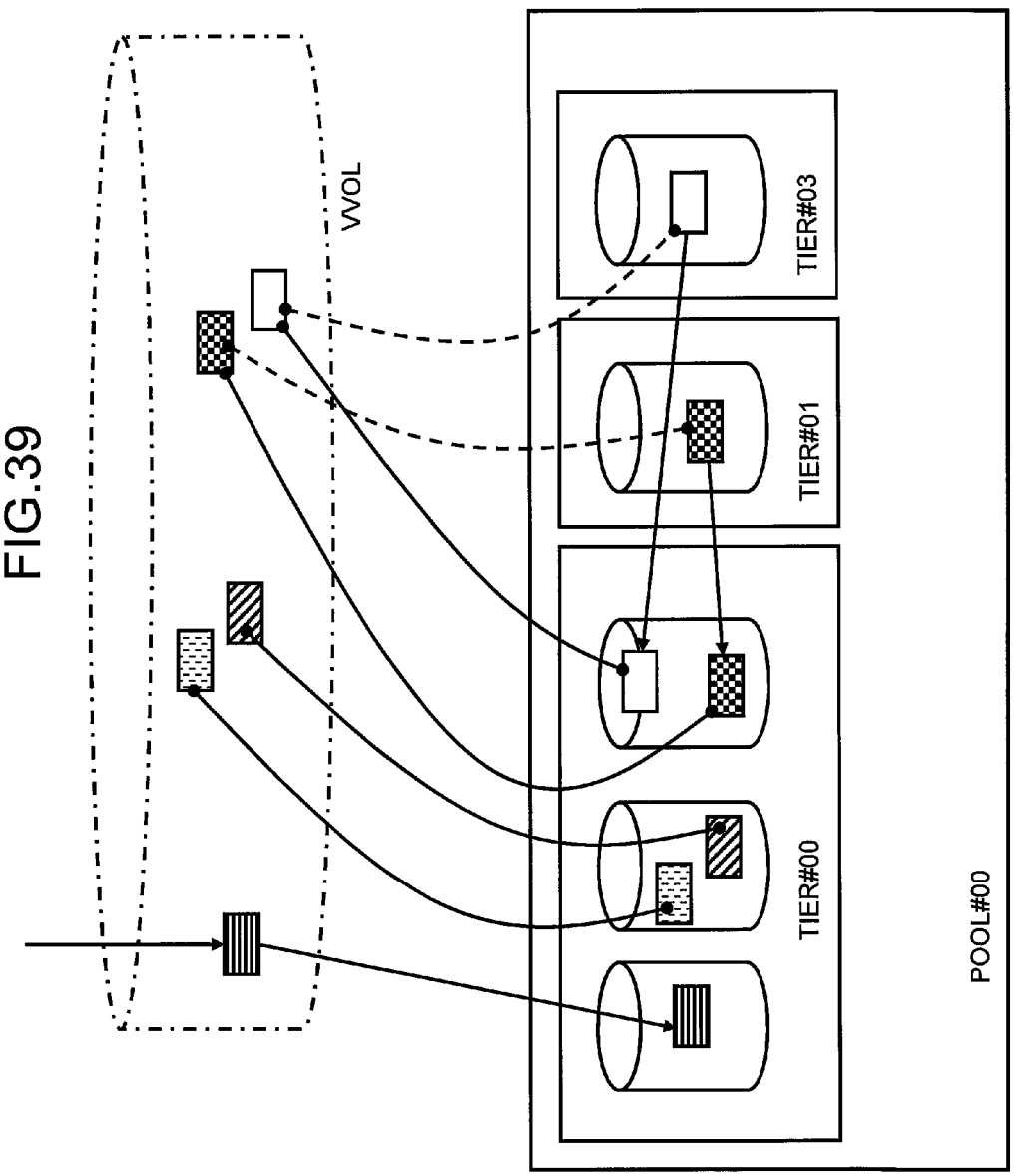

STORAGE SYSTEM PROVIDING VIRTUAL VOLUMES

TECHNICAL FIELD

This invention relates to storage control to which Thin Provisioning (also referred to as Dynamic Provisioning) is applied.

BACKGROUND ART

The technology of data migration is well known. Data migration is generally performed in units of volumes. For example, according to the Citation 1, all data stored in the first logical volume is migrated from the first logical volume to the second logical volume.

The technology of storage hierarchization is also well known. For example, according to the Citation 2, each of multiple logical volumes which multiple storage systems comprise is classified in any one tier of multiple tiers, and the logical volumes belonging to a certain tier are migrated to another tier. Multiple tiers, for example, include highly-reliable tiers, low-cost tiers and others.

CITATION LIST

[Patent Literature]
[PTL 1] Japanese Unexamined Patent Application Publication No. 2006-302077
[PTL 2] Japanese Unexamined Patent Application Publication No. 2008-047156

SUMMARY OF INVENTION

[Technical Problem]

Meanwhile, the technology referred to as Thin Provisioning (also referred to as Dynamic Provisioning) is well known. According to Thin Provisioning, a virtual logical volume (virtual volume) consisting of multiple virtual storage areas (virtual pages) and multiple actual storage areas (actual pages) are provided. If write to a virtual page is performed, an actual page is allocated to the virtual page and, to the allocated actual page, the data as the write target is written.

Let us assume that the above-mentioned data migration technology and the storage hierarchization technology are applied to Thin Provisioning. Let us also assume that the first virtual volume belongs to the first tier and that the second virtual volume belongs to the second tier. In this case, from the first virtual volume belonging to the first tier to the second virtual volume belonging to the second tier, all data can be migrated.

According to this technology, though all data in the first virtual volume is migrated from the first tier to the second tier, it is not necessarily desirable for all the data to exist in the second tier.

Therefore, the purpose of this invention is the appropriate allocation of data in virtual volumes in accordance with Thin Provisioning.
Solution to Problem Multiple storage area groups into which multiple storage areas provided by multiple storage devices are classified with reference to storage area attributes are managed. The multiple logical volumes to which, in accordance with a write request to at least one address included in multiple addresses in the logical volume, at least one storage area included in the multiple storage areas is allocated are provided. In accordance with the access condition of the at least one address in the logical volume, the data written to the at least one address by the write request is migrated from the at least one storage area included in one of the multiple storage area groups to at least one storage area in another storage area group included in the multiple storage area groups.

BRIEF DESCRIPTION OF DRAWINGS

FIG. 6 shows the configuration of a tier management table 402.
FIG. 9 shows the configuration of a PVOL management table 405.
FIG. 10 shows the configuration of an allocation table 407.
FIG. 11 shows the configuration of an actual page management table 408.
FIG. 12 shows the configuration of monitor tables 409.
FIG. 13 shows the configuration of a frequency distribution table 410.
FIG. 14 shows the configuration of a migration page table 411.
FIG. 15 shows the configuration of a migration definition table 412.
FIG. 17 shows a pool definition GUI 1700.

FIG. 37 shows the flow of the tier threshold changing processing.

FIG. 38 shows the flow of the threshold excess handling processing.

FIG. 39 shows the overview of the data element aggregation processing.

DESCRIPTION OF EMBODIMENT

Figure 1:
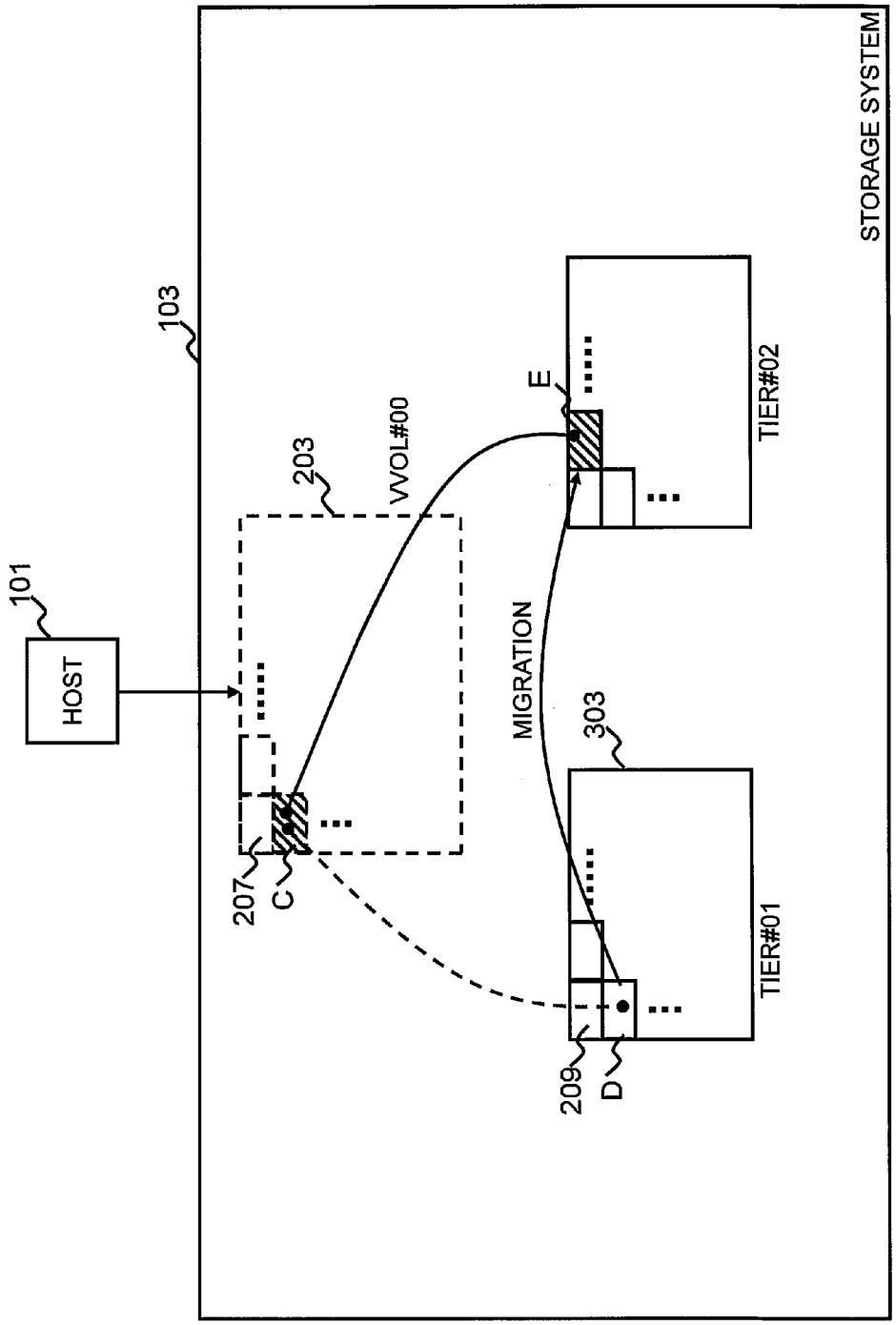
FIG. 1 shows the overview of the Embodiment 1 of this invention.

The aspects with reference to the following multiple embodiments of this invention are described below.

<Aspect 1>

The method of controlling the storage system characterized by managing multiple storage area groups into which multiple storage areas provided from multiple storage devices are classified with reference to storage area attributes, providing the multiple logical volumes to which, in accordance with a write request to at least one address included in multiple addresses in the logical volume, at least one storage area included in the multiple storage areas is allocated, and, in accordance with the access condition of the at least one address in the logical volume, migrating the data written to the at least one address by the write request from the at least one storage area included in one of the multiple storage area groups to at least one storage area in another storage area group included in the multiple storage area groups.

<Aspect 2>

The method complying with the aspect 1 of controlling the storage system characterized by that the storage system can also perform the data migration in units of logical volumes.

<Aspect 3>

The storage system coupled to one or more hosts which comprises multiple types of physical storage device groups and a storage control device. The storage control device comprises a storage resource, the multiple types of physical storage device groups, and a controller coupled to the storage resource and the host (s). A physical storage device group is configured of one or more physical storage devices. The multiple types of physical storage device groups are the bases of multiple types of actual page groups. The type of an actual page group is based on the attribute of the physical storage device group which is the base of the actual page group. An actual page group comprises multiple actual pages. The controller provides one or more virtual volumes to the one or more hosts. The virtual volume is a virtual logical volume configured of multiple virtual pages. The virtual pages are virtual storage areas. The actual pages are actual storage areas. The storage resource stores the allocation information which is the information indicating which actual page is allocated to which virtual page (any form of information may be permitted such as a table form or a queue form). The controller receives a write command from the host, identifies the virtual page as the write destination with reference to the write command, updates the allocation information to allocate a free actual page to the identified virtual page, and stores the write target data in the allocated actual page. The actual page is an actual storage area, and the data stored in the actual page is stored in the physical storage device which is the base of the actual page. The controller performs the migration processing which includes the processing (A) and (B) described below, which are, (A) migrating the data stored in the first actual page in the actual page group of the first type to the second actual page in the actual page group of the second type and (B) updating the allocation information to allocate the second actual page instead of the first actual page to the first virtual page which is the virtual page as the allocation destination of the first actual page. The controller, for example, may also be permitted to comprise at least one processor. The storage resource, for example, may also be permitted to be a memory. The host may also be permitted to be a computer, another storage system, or another storage control device.

By this method, data in virtual volumes can be reallocated in units of pages.

<Aspect 4>

In the storage system complying with the aspect 3, the storage resource stores monitor information which indicates the I/O (Input/Output) frequency of each virtual page. The controller, in accordance with the I/O to the virtual page or the actual page allocated to the virtual page, updates the I/O frequency of the virtual page in the monitor information. The first virtual page is the virtual page whose I/O frequency identified by the monitor information does not satisfy a predetermined condition.

By this method, in accordance with the I/O frequency of the virtual page, data reallocation can be performed.

<Aspect 5>

In the storage system complying with the aspect 4, the storage resource stores actual page group management information including the information indicating the I/O frequency range set for each actual page group type. The predetermined condition is falling within the I/O frequency range of the actual page group of the first type. The actual page group of the second type is the actual page group whose I/O frequency range falls within the I/O frequency of the first virtual page.

By this method, data can be allocated in the actual page group of the type corresponding with the I/O frequency range which the I/O frequency of the virtual page to which the actual page storing the data is allocated falls within.

<Aspect 6>

In the storage system complying with any of the aspects 3 to 5, the controller receives an I/O command from the host and identifies the virtual page as the I/O destination from the I/O command. The controller, if performing I/O for the actual page allocated to the virtual page as the I/O destination, updates the I/O frequency corresponding with the virtual page as the I/O destination in the monitor information or, if not performing I/O for the actual page allocated to the virtual page as the I/O destination, does not update the I/O frequency corresponding with the virtual page as the I/O destination in the monitor information.

By this method, only when I/O is performed for an actual page, the I/O frequency of the virtual page to which the actual page is allocated can be updated.

<Aspect 7>

In the storage system complying with any of the aspects 4 to 6, the storage resource stores, as the monitor information, the monitor information in the active status and the monitor information in the standby status. The controller updates the I/O frequency in the active monitor information. The controller, in the migration processing, with reference to the active monitor information, identifies the first virtual page as well as changes the status of the standby monitor information from standby to active, and then, if performing I/O for an actual page in accordance with an I/O command by which the virtual page is identified, updates the I/O frequency of the identified virtual page in the monitor information whose status is changed to active.

By this method, even when the migration processing is performed, monitoring (updating) the I/O frequency can be continued.

<Aspect 8>

In the storage system complying with the aspect 7, the controller, using the active monitor information, creates the relation information which is the information indicating the relation between the I/O frequency and the number of virtual pages, and outputs the relation information to display the created relation information. The controller, when receiving an instruction for starting migration, starts the migration processing.

By this method, the operator browsing the relation information, can start the migration processing manually.

<Aspect 9>

In the storage system complying with any of the aspects 3 to 7, the controller, if the usage rate of the first actual data group exceeds the specified threshold for the rate, starts the migration processing.

Therefore, if the usage rate of the first actual data group exceeds the specified threshold for the rate, by the migration processing, the number of free actual pages can be expected to increase in the first actual data group.

<Aspect 10>

In the storage system complying with any of the aspects 3 to 9, the actual data group of the first type is the most significant actual data group. The controller, to the virtual page as the write destination identified by the write command, always allocates an actual page from the actual data group of the first type.

By this method, data can be stored preferentially in the most significant actual data group.

<Aspect 11>

In the storage system complying with any of the aspects 3 to 10, as the virtual volumes, the first and the second virtual volumes exist. Multiple pools based on the multiple types of physical storage device groups exist. A pool comprises one or more types of actual page groups and allocated to at least one virtual volume. The controller, for the first virtual volume, performs the page-based migration processing and, for the second virtual volume, performs the volume-based migration processing. The controller, in the page-based migration processing, in the pool allocated to the first virtual volume, migrates data from the first actual page to the second actual page. The controller, in the volume-based migration processing, migrates data in all the actual pages allocated to the second virtual volume in the pool allocated to the second virtual volume to actual pages in a different pool from the pool allocated to the second virtual volume respectively.

That is, as well as migrating data in one virtual volume in units of pages, all the data in one virtual volume can be migrated among pools.

<Aspect 12>

In the storage system complying with the aspect 11, the storage resource stores monitor information which is the information indicating the I/O frequency of the second virtual volume and the actual page group management information which is the information including the information indicating the I/O frequency range set for each actual page group type. The controller, in accordance with the I/O for the second virtual volume or the actual page allocated to the second virtual volume, updates the I/O frequency of the second virtual volume in the monitor information. The controller, with reference to the I/O frequency range corresponding with the type of the actual page group comprising the actual page allocated to the second virtual volume, ascertains the threshold range of the I/O frequency. The controller, if the I/O frequency of the second virtual volume does not fall within the threshold range, for acquiring the threshold range within which the I/O frequency of the second virtual volume falls, migrates the data in all the actual pages allocated to the second virtual volume to the another pool.

By this method, the data in the second virtual volume can be migrated to the pool corresponding with the I/O frequency of the second virtual volume.

<Aspect 13>

In the storage system complying with the aspect 12, in the volume-based migration processing, for all the actual pages as the migration source, the type of the actual page group comprising the actual pages as the migration source is the same as the actual page group comprising the actual pages as the migration destination.

By this method, the performance of the virtual volume does not have to be practically changed.

<Aspect 14>

In the storage system complying with the aspect 12, in the volume-based migration processing, for all the actual pages as the migration source, regardless of the type of the actual page group comprising the actual pages as the migration source, the actual pages as the migration destination are the actual pages in the actual page group of one specified type.

By this method, all the data in the second virtual volume can be aggregated in the specified type of actual page group in the pool as the migration destination.

<Aspect 15>

In the storage system complying with any of the aspects 3 to 14, the controller, if the larger number of actual pages than a specified rate of all the actual pages allocated to the virtual volume exist in a certain type of actual page group, among all the actual pages allocated to the virtual volume, the data in the actual pages in the actual page groups of other types than the certain type of actual page group is migrated to the actual page in the certain type of actual page group.

By this method, in accordance with the condition of data allocation in the virtual volume, in the actual page group of the type considered to be appropriate for the virtual volume, the data in the virtual volume can be aggregated.

<Aspect 16>

In the storage system complying with the aspect 15, the actual pages allocated to the virtual page after migration to the actual pages in the certain type of actual page group are always the actual pages in the certain type of actual page group.

By this method, after data is aggregated by the migration processing, to the second virtual volume, actual pages are allocated from the certain type of actual page group.

<Aspect 17>

In the storage system complying with any of the aspects 3 to 16, the controller, if receiving a write command by which the first virtual page is identified from the host after the migration processing is started and, at the same time, if data migration from the first actual page to the second actual page is not started yet, cancels the migration, writes the data complying with the write command to the actual page in the second type of actual page group, and also updates the allocation information to allocate the actual page as the write destination instead of the first actual page to the first virtual page.

As data is written to the actual page group as the migration destination before migration, migration does not have to be performed for the virtual page as the write destination of the data.

<Aspect 18>

In the storage system complying with any of the aspects 3 to 16, the controller, if receiving a write command by which the first virtual page is identified from the host after the migration processing is started and, at the same time, if data migration from the first actual page to the second actual page is not started yet, writes the data complying with the write command to the first actual page, and then, performs the processing (A) and (B).

<Aspect 19>

In the storage system complying with any of the aspects 3 to 18, the controller, if receiving a write command by which the first virtual page is identified from the host after the migration processing is started and, at the same time, if data is being migrated from the first actual page to the second actual page, cancels the migration, writes the data complying with the write command to the actual page in the second type of actual page group, and also updates the allocation information to allocate the actual page as the write destination instead of the first actual page to the first virtual page.

<Aspect 20>

In the storage system complying with any of the aspects 3 to 18, the controller, if receiving a write command by which the first virtual page is identified from the host after the migration processing is started and, at the same time, if data is being migrated from the first actual page to the second actual page, writes the data complying with the write command to the first actual page, and then, resumes the data migration from the first actual page to the actual page in the second type of actual page group.

<Aspect 21>

In the storage system complying with any of the aspects 3 to 18, the controller, if receiving a write command by which the first virtual page is identified from the host after the migration processing is started and, at the same time, if data is being migrated from the first actual page to the second actual page, after the migration is completed, in accordance with the allocation information, writes the data complying with the write command to the second actual page.

<Aspect 22>

In the storage system complying with any of the aspects 3 to 18, the controller, if receiving a write command by which the first virtual page is identified from the host after the migration processing is started and, at the same time, if data is being migrated from the first actual page to the second actual page, writes data complying with the write command to both the first actual page and the second actual page.

<Aspect 23>

In the storage system complying with any of the aspects 3 to 22, the controller, if receiving a write command by which the first virtual page is identified from the host after the migration processing is started and, at the same time, if the processing (A) and (B) are completed, in accordance with the allocation information, writes the data complying with the write command to the second actual page.

<Aspect 24>

In the storage system complying with any of the aspects 3 to 23, the first virtual page is the virtual page whose last I/O time, which is the latest time of performing I/O, satisfies a predetermined condition.

<Aspect 25>

In the storage system complying with the aspect 24, the predetermined condition is that the last I/O time should be earlier than the current time by a specified length of time or larger. The second type of actual page group is the actual page group that is less significant than the first actual page group.

<Aspect 26>

In the storage system complying with any of the aspects 3 to 25, the first virtual page is the virtual page for which I/O complying with a sequential access occurred. The second type of actual page group is the actual page group that is less significant than the first type of actual page group.

<Aspect 27>

In the storage system complying with the aspect 4, the controller updates the monitor information only in a specified time zone. The controller, each time the specified time zone is passed, saves the monitor information. The first virtual page is the virtual page whose I/O frequency identified by the monitor information corresponding with the specified time zone does not satisfy the predetermined condition.

<Aspect 28>

The storage control device coupled to the host, and comprises a storage resource and a controller coupled to the storage resource and the host. The controller provides a virtual volume configured of multiple virtual pages to the host. The storage resource stores the allocation information which is the information indicating which actual page is allocated to which virtual page. The controller receives a write command from the host, identifies the virtual page as the write destination from the write command, updates the allocation information to allocate a free actual page to the identified virtual page from one of multiple types of actual page groups, and stores the write target data in the allocated actual page. The actual page is an actual storage area. The virtual page is a virtual storage area. The virtual volume is a virtual logical volume. The actual page group comprises multiple actual pages. The controller performs the migration processing which includes the processing (A) and (B), which are, (A) migrating the data stored in the first actual page in the actual page group of the first type to the second actual page in the actual page group of the second type and (B) updating the allocation information to allocate the second actual page instead of the first actual page to the first virtual page which is the virtual page as the allocation destination of the first actual page.

<Aspect 29>

In the storage system complying with the aspect 4, an identified I/O frequency is the average of the number of I/Os in a certain period of time.

<Aspect 30>

In the storage system complying with the aspect 4, the identified I/O frequency is the maximum number of I/Os of multiple numbers of I/Os respectively corresponding with multiple points of time in a certain time zone.

<Aspect 31>

In the storage system complying with the aspect 4, the controller receives a specification for whether the identified I/O frequency should be the average number of I/Os or the maximum number of I/Os. If the specification for the average number of I/Os, the identified I/O frequency is the average of the number of I/Os in a certain period of time. If the specification for the maximum number of I/Os, the identified I/O frequency is the maximum number of I/Os of multiple numbers of I/Os respectively corresponding with multiple points of time in a certain time zone.

The above-mentioned aspects 1 and 2 are the aspects referring to the control method of the storage system as an example, the aspects 3 to 27 and 29 to 31 are the aspects referring to the storage system as an example, and the aspect 28 is an aspect referring to the storage control device as an example, any aspects of which can be at least one aspect of a storage system, a storage control device, a storage control method, the control method of a storage system or a storage control device, a storage system or a storage control device, and a computer program (e.g. a computer program for storage control or a computer program performed by a storage system or the storage control device).

The storage system related to some of the embodiments of this invention is described below with reference to the attached figures. Note that, in the description below, the target might be referred to by a combination of the name and the ID instead of the reference sign. For example, if the logical volume is referred to by the reference sign 500, [the combination] is "logical volume 500" while, if the logical volume whose ID is 00 is referred to, [the combination] is "logical volume #00." Furthermore, data stored in one actual page is hereinafter referred to as "data elements." Furthermore, the data elements stored in actual pages allocated to virtual pages might be referred to as "data elements in virtual pages" or by similar expressions.

[Embodiment 1]

FIG. 1 shows the overview of the Embodiment 1 of this invention.

To a storage system 103, a host device (hereinafter referred to as a host) 101 is coupled. There may be one host 101 or may also be multiple hosts 101. The storage system 103 provides a virtual volume (hereinafter referred to as a VVOL (Virtual VOLume)) 203 to the host 101 and comprises multiple types of tiers 303.

A VVOL 203 is a virtual logical volume complying with Thin Provisioning, that is, a logical volume not based on a physical storage device (hereinafter referred to as a PDEV). A VVOL 203 is configured of multiple virtual pages 207. A virtual page 207 is a virtual storage area. As a VVOL 203, let us assume that one VVOL #00 exists. Hereinafter, a virtual page #b in a VVOL #a is referred to as a "virtual page #(a-b)." The VVOL 203 for Thin Provisioning is provided to the host 101 as what comprises a virtual capacity and, in accordance with a write request from the host 101 to an address in a virtual page, an actual page is allocated. Therefore, except for the status where actual pages are already allocated to fill the virtual capacity, the total capacity of all the actual pages allocated to a VVOL 203 is smaller than the virtual capacity. One VVOL 203 is provided to one or more hosts 101 and, if the VVOL 203 is provided to multiple hosts 101, the VVOL is supposed to be shared by these multiple hosts 101.

A tier 303 is configured of multiple actual pages 209. An actual page 209 is an actual storage area. As a tier 303, for example, let us assume that two tiers #01 and #02 exist. Hereinafter, an actual page #d in a tier #c is assumed to be referred to as an "actual page #(c-d)." Note that a tier 303, for example, may be configured of one or more actual volumes (hereinafter referred to as an RVOL (Real VOLume)). An RVOL is an actual logical volume, that is, a logical volume based on a PDEV. Each of multiple tiers 303 in one pool is, in the status before data migration, set to be used by one or more VVOLs 203.

The host 101 is generally a computer, but may also be permitted to be another storage system instead of a computer. The host 101, for example, transmits an I/O (Input/Output) command to the storage system 103. The I/O command is, for example, a write command or a read command, comprising I/O destination information. The I/O destination information is the information indicating the I/O destination, for example, including the ID of a VVOL 203 (e.g. an LUN (Logical Unit Number)) and the address of the I/O destination (e.g. an LBA (Logical Block Address)). From the I/O destination information, the VVOL 203 and the virtual page 207 of the I/O destination is identified.

Let us assume that the storage system 103 receives a write command from the host 101 and that, with reference to the I/O destination information which the write command comprises, identifies a virtual page #(00-C) as the write destination. The storage system 103, if no actual page 209 is allocated to the identified virtual page #(00-C), allocates one of free (unallocated) actual page #(01-D) to the virtual page 207 and, to the allocated actual page #(01-D), writes the data elements of the write target complying with the write command.

In this embodiment, data migration is performed in units of pages. As more specifically described, for example, as shown in FIG. 1, the storage system 103 performs the processing below, that is, migrating the data elements in the actual page #(01-D) allocated to the virtual page #(00-C) to a free (unallocated) actual page #(02-E), changing the allocation source of the virtual page #(00-C) from the actual page #(01-D) to the actual page #(02-E), and updating the status of the actual page #(01-D) to free (unallocated).

The Embodiment 1 is described below in details.

Figure 2:
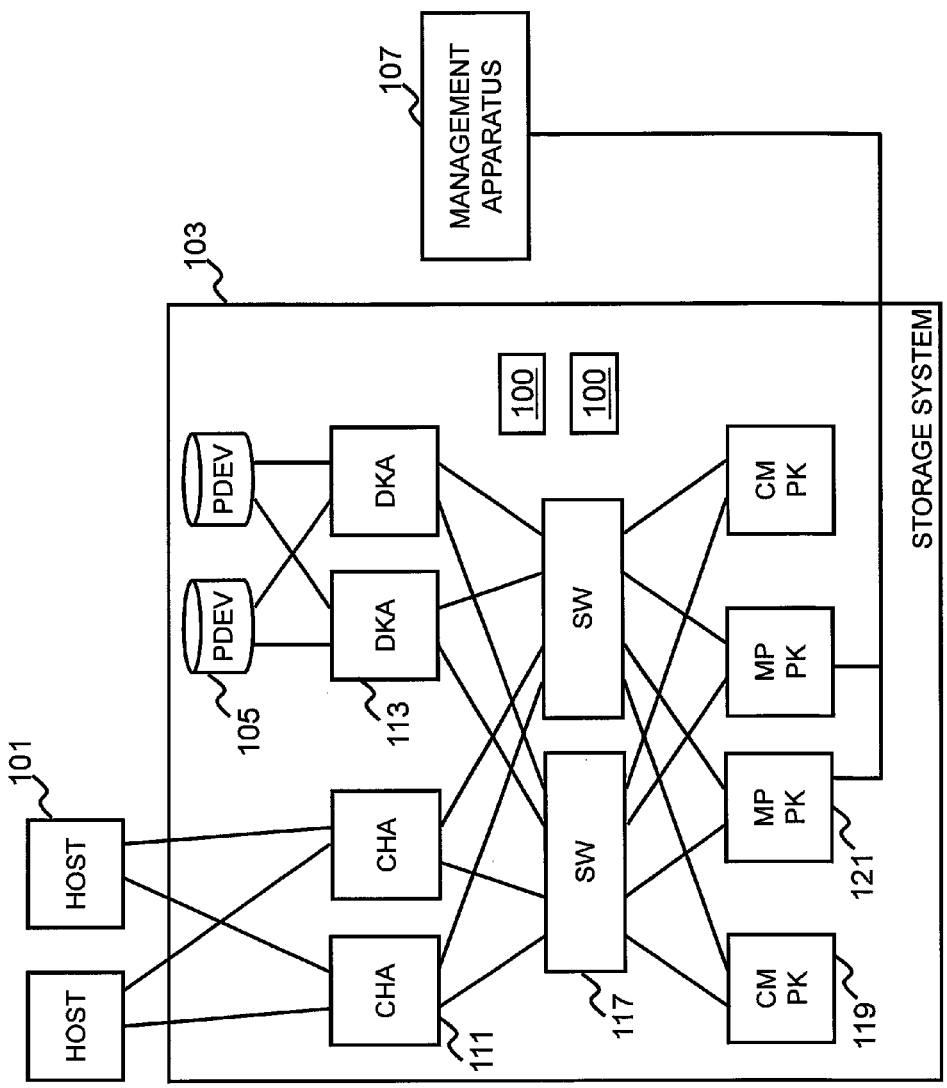
FIG. 2 shows the configuration of a storage system 103.

FIG. 2 shows the configuration of a storage system 103.

The storage system 103 comprises multiple PDEVs 105, a storage control device coupled to the multiple PDEVs 105, and power-supply units 100.

The multiple PDEVs 105 include multiple types of PDEVs, for example, SSDs (Solid State Drives) and HDDs (hard disk drives). HDDs are, for example, HDD-FC (Fibre Channel), HDD-SATA (Serial ATA), HDD-SAS (Serial Attached SCSI), and others.

The storage control device comprises a controller and multiple CMPKs (cache memory packages) 119 coupled to the controller. The controller comprises multiple CHAs (channel adapters) 111, multiple DKAs (disk adapters) 113, multiple MPPKs (microprocessor packages) 121, and SWs (switches) 117. Though the CHAs 111, the DKAs 113, the MPPKs 121, the SWs 117, and the power-supply units 100 are multiple from the perspective of redundancy, at least one of those numbers is not limited to 2 as shown in the figure and may also be permitted to be larger or smaller than 2. The number of CMPKs 119 may also be permitted to be larger than 2.

A power-supply unit 100 supplies power based on power from commercial power supply to each of the packages 119, 111, 113, 121, and 117.

A CHA 111 is an interface device coupled to the host 101. The CHA 111 receives an I/O command (write command or read command) from the host 101 and transfers the received I/O command to one of the multiple MPPKs 121.

A CHA 111 comprises a protocol chip 112 and an LR (Local Router) 114. The protocol chip 112 performs protocol conversion for the communication with the host 101. The LR 114 transfers a received I/O command to an MPPK 121 corresponding with the I/O destination identified from the I/O destination information which the I/O command comprises.

The DKA 113 is an interface device coupled to the HDDs 105. The DKA 113 reads data from an HDD 105 and transfers the data to a DRAM (Dynamic Random Access Memory) in the CMPK 119, and writes the data from the CMPK 119 to the HDD 105.

An MPPK 121 is a device comprising one or more MPs (microprocessors). An MP processes I/O commands from the CHAs 111.

To an SW 117, multiple packages, that is, the CHAs 111, the DKAs 113, the CMPKs 119, and the MPPKs 121 are coupled. The SWs 117 control connection among the PKs (packages).

A CMPK 119 comprises a volatile memory and/or non-volatile memory. A CMPK 119, for example, includes a storage area (hereinafter referred to as a cache memory or, abbreviated as CM) where the data elements as the I/O target for a virtual page 207 (actual page 209) are temporarily stored. Furthermore, a CMPK 119 includes a storage area where various types of information and computer programs are stored. The information and computer programs are described later.

To the storage system 103, a management apparatus 107 is coupled. The management apparatus 107 is, for example, a computer comprising a display device and an input device. The administrator can perform various types of setting from the management apparatus 107 for the storage system 103.

Figure 3:
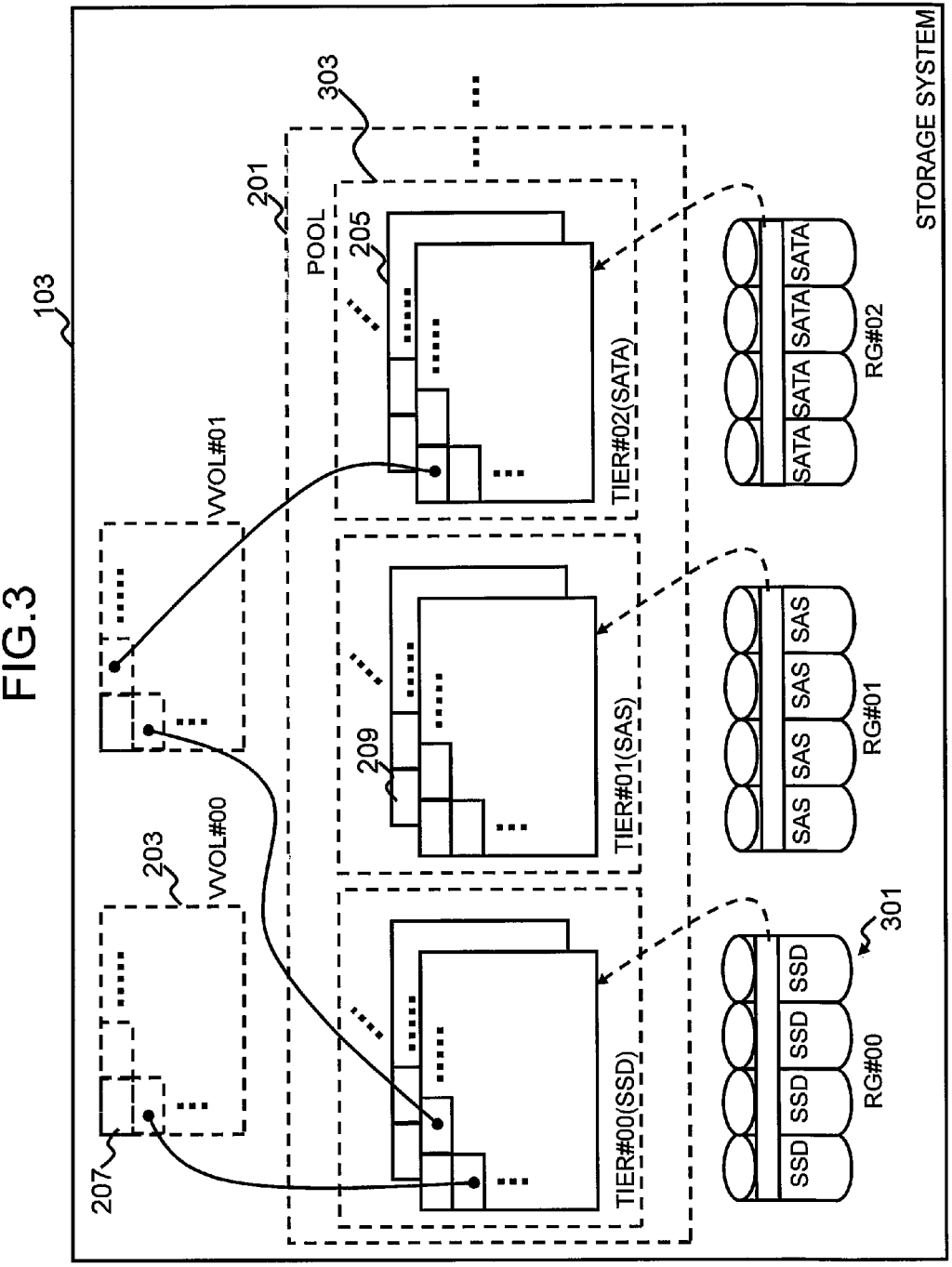
FIG. 3 shows the relations among respective types of storage areas in the storage system 103.

FIG. 3 shows the relations among respective types of storage areas in the storage system 103.

As shown in FIG. 3, from lower to higher, one or more RGs 301, one or more pools 201, and one or more VVOLs 203 are managed.

An RG 301 is the abbreviation of a RAID group. One RG 301 is configured of the same type of PDEVs. The PDEV type is defined by at least either one of the performance or the unit cost. The performance is, for example, the data I/O speed or the response time (the length of time since a command is received from the host until a response is returned). The unit cost is the cost required for saving the data of a unit size (e.g. what is called a bit cost). For example, an RG #00 is configured of multiple SSDs, an RG #01 is configured of multiple HDD-SASs, and an RG #02 is configured of multiple HDD-SATAs. Note that the capacity of multiple PDEVs configuring one RG is, for example, equal.

A pool 201 is a set of actual pages 207. As more specifically described, for example, a pool 201 is configured of one or more RVOLs 205 and each RVOL 205 is configured of one or more actual pages 207. An RVOL configuring a pool 201 is hereinafter referred to as a "PVOL" as the abbreviation of a pool VOL.

Actual pages 207 configuring one pool 201 are hierarchized. That is, in one pool 201, multiple tiers 303 exist. The tiers 303, for example, exist for each RVOL type. For example, according to FIG. 3, as there are 3 types of RVOLs, the number of tiers 303 is also 3. For this reason, to one tier 303, RVOLs 205 corresponding with the tier are supposed to belong. As more specifically described, for example, to a tier #00, which is of the SSD type, the RVOLs based on the RG 301 configured of SSDs are supposed to belong while, to a tier #01, which is of the HDD-SAS type, the RVOLs based on the RG 301 configured of HDD-SASs are supposed to belong and, to a tier #03, which is of the HDD-SATA type, the RVOLs based on the RG 301 configured of HDD-SATAs are supposed to belong. Note that tiers 303 do not necessarily have to be set strictly for each RVOL type. To one tier 303, multiple RVOLs 205 based on the similar type of RGs may also be permitted to belong.

With a VVOL 203, from one or more pools 201, a pool 201 to be the allocation source is associated. Furthermore, with a VVOL 203, from the selected pool 201, a tier (hereinafter referred to as an allocation tier) 303 which can be used as the allocation source 303 is associated. Furthermore, with a VVOL 203, one of one or more allocation tiers 303 is associated as a default tier 303. According to FIG. 3, the allocation tiers of the VVOL #01 are a tier #00 and a tier #02

Furthermore, according to the description above, it is possible that multiple RVOLs, if belonging to the same tier, are based on one RG though, if they belong to different tiers respectively, [the RVOLs] are supposed to be based on different RGs respectively. For serially allocating multiple actual pages to multiple virtual pages in one or more VVOLs 203 associated with the same tier, it is desirable that actual pages are serially selected across the RGs associated with this tier 303. As more specifically described, multiple actual pages are serially selected from multiple RVOLs 205 included in this tier 303, considering the relation with the RGs, actual pages are serially selected from different RGs serially. By this method, it is possible to improve the access performance.

Figure 4:
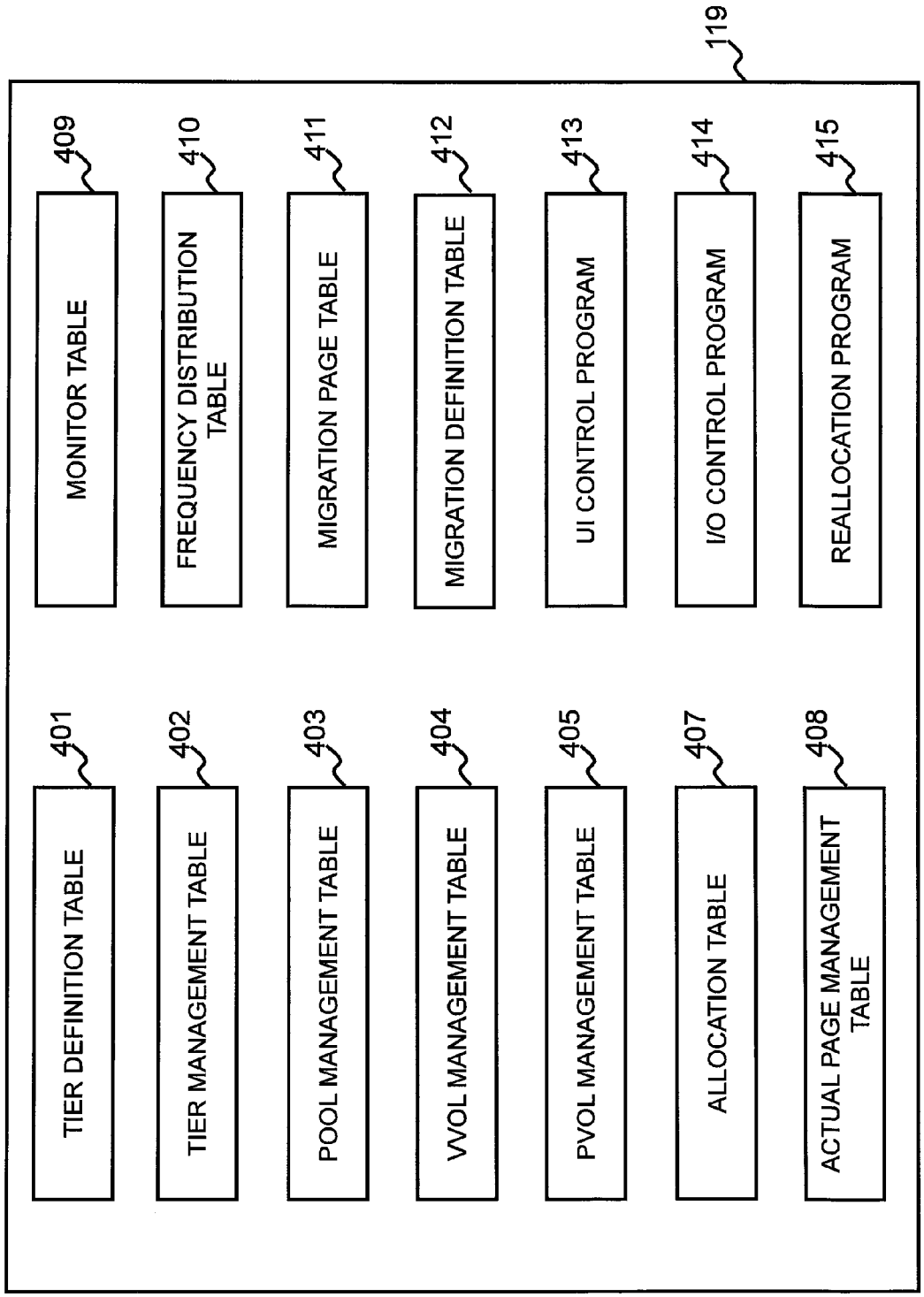
FIG. 4 shows information and computer programs stored in the CMPK 119.

FIG. 4 shows information and computer programs stored in a CMPK 119. Note that, though this embodiment adopts tables as an example of information, the information may also be permitted to be in other forms than tables (e.g. queue form).

The CMPK 119, as information, stores a tier definition table 401, a tier management table 402, a pool management table 403, a VVOL management table 404, a PVOL management table 405, an allocation table 407, an actual page management table 408, a monitor table 409, a frequency distribution table 410, a migration page table 411, and a migration definition table 412. Meanwhile, the CMPK 119 stores, as computer programs, a UI control program 413 for controlling UIs (User Interfaces), an I/O control program 414 for controlling I/O, and a reallocation program 415 for performing reallocation. Note that at least one of these tables and computer programs may also be permitted to be stored in other storage resources than the CMPK 119. For example, at least one computer program and/or migration page table 411 may also be permitted to be stored in a memory in the MPPK 121.

Each table is described below. Note that, though the description below identifies the subjects using the IDs, [the subject] may also be permitted to be identified using at least one name and number instead of or in addition to the ID.

Figure 5:
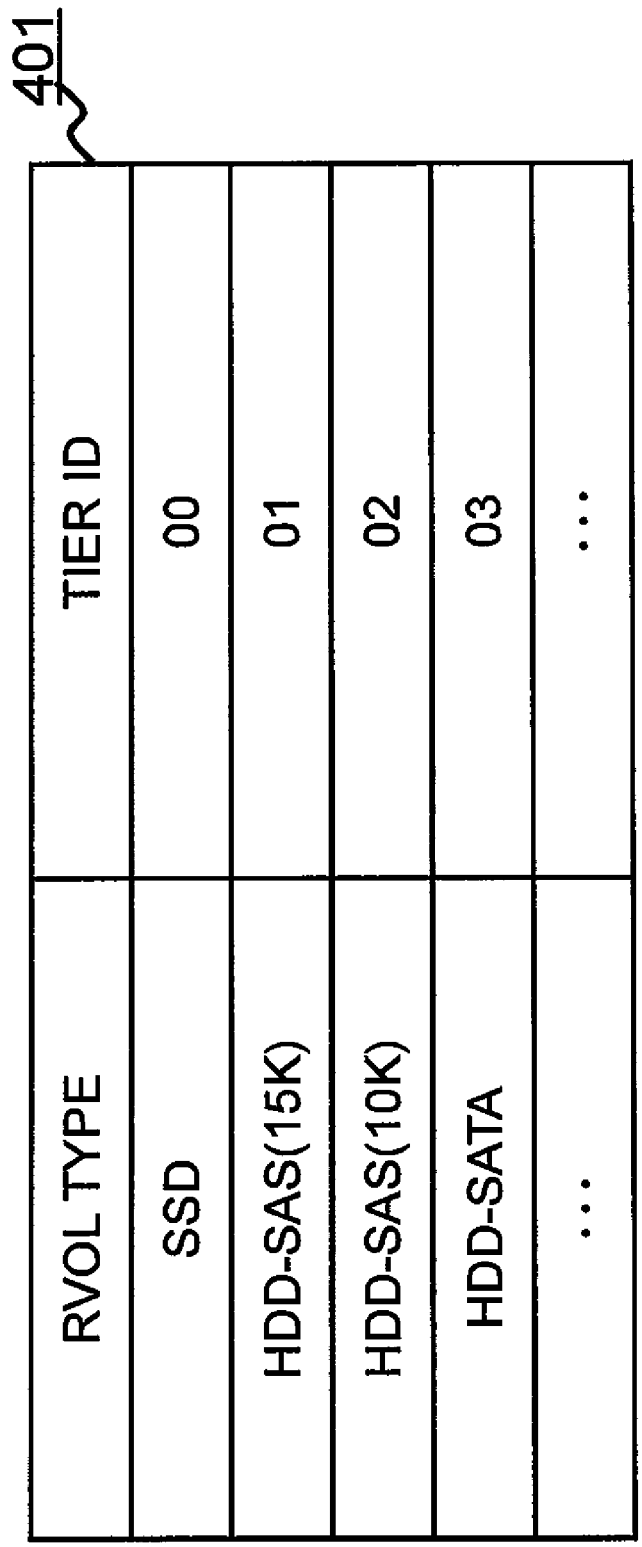
FIG. 5 shows the configuration of a tier definition table 401.

FIG. 5 shows the configuration of a tier definition table 401.

The tier definition table 401 is the table showing the definition of a tier. As more specifically described, for example, the table 401 shows the relation between the RVOL types and the tier IDs. According to the table 401, as a tier corresponding with the RVOL type "SSD," the tier to which the ID "00" is given is supposed to be provided.

FIG. 6 shows the configuration of a tier management table 402.

The tier management table 402 is the table for managing the information related to tiers. As more specifically described, for example, the table 402, for each tier, comprises the pool ID, the tier ID, the tier range, the PVOL ID, the tier threshold, the usage rate, and the actual page ID. As for one tier (hereinafter referred to as a "target tier" in the description of FIG. 6) as an example, these information elements are, specifically, as follows.

The "pool ID" is the ID of the pool comprising the target tier.

The "tier ID" is the ID of the target tier. From the tier ID, the type of the PDEV as the base of the PVOL belonging to the target tier is uniquely identified.

The "tier range" is the range of the load on the actual pages (e.g. I/O frequency) which should exist in the target tier.

The "PVOL ID" is the ID of the PVOL belonging to the target tier.

The "tier threshold" is the threshold of the usage rate of the target tier.

The "usage rate" is the usage rate of the target tier, that is, the rate of the number of already allocated actual pages to the number of actual pages configuring the target tier.

The "actual page ID" is the ID of all the actual pages belonging to the target tier.

Though, according to the example of the table 402 in FIG. 6, the tier threshold is set for each tier, instead of which, it may also be permitted that one tier threshold is set for each pool and that the one tier is common to all the tiers that the one pool comprises.

Figure 7:
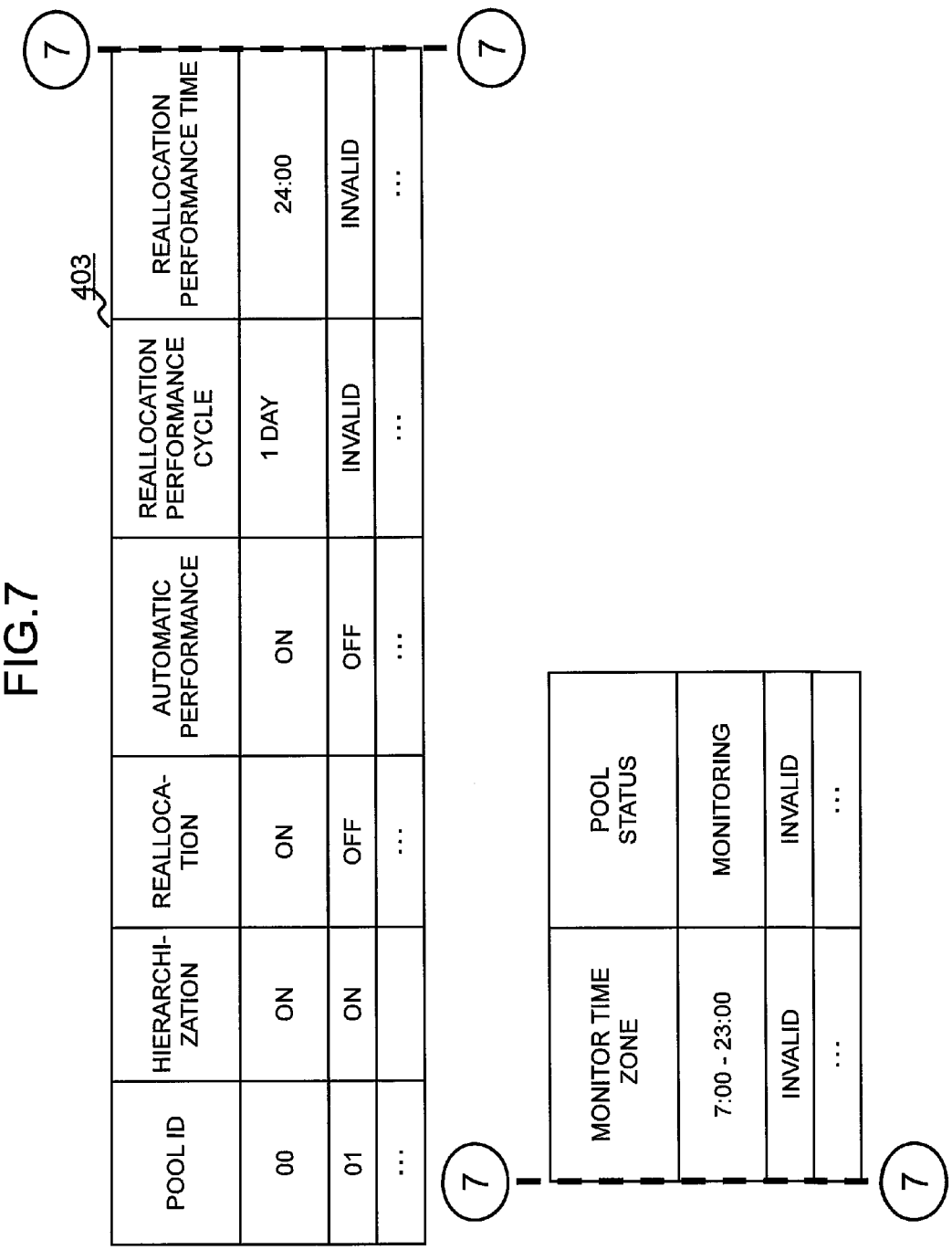
FIG. 7 shows the configuration of a pool management table 403.

FIG. 7 shows the configuration of a pool management table 403.

The pool management table 403 is the table for managing the information related to pools. As more specifically described, for example, the table 403, for each pool, comprises the pool ID, hierarchization, reallocation, automatic performance, reallocation performance cycle, the reallocation performance time, the monitor time zone, and the pool status. As for one pool (hereinafter referred to as a "target pool" in the description of FIG. 7) as an example, these information elements are, specifically, as follows.

The "pool ID" is the ID of the target pool.

"Hierarchization" shows whether to hierarchize the actual pages in the target pool or not. "ON" indicates performing hierarchization (i.e. multiple tiers are set in the target pool) while "OFF" indicates not performing hierarchization (i.e. multiple tiers are not set in the target pool).

"Reallocation" shows whether to reallocate the data elements in the target pool or not. "ON" indicates performing reallocation and "OFF" indicates not performing reallocation. In case of "ON," the I/O frequency of the VVOL to which the target pool is allocated or the virtual pages of the same is monitored while, in case of "OFF," the I/O frequency of the VVOL to which the target pool is allocated or the virtual pages of the same is not monitored. What is important in monitoring I/O frequency is that, if I/O is not actually performed for the VVOL as the I/O destination or the actual pages allocated to the virtual pages, the I/O frequency is not updated and that, if I/O is performed for the allocated actual pages, the I/O frequency is updated. This is also described in the write processing and the read processing later.

"Automatic performance" shows whether to start the reallocation of the data elements in the target pool automatically or manually. "ON" indicates that reallocation is automatically started while "OFF" indicates that reallocation is manually started.

The "reallocation performance cycle" is the cycle of performing reallocation of the data elements in the target pool. For example, "1 day" indicates that reallocation is started every day (every 24 hours).

The "reallocation performance time" shows the time of starting reallocation of the data elements in the target pool.

The "monitor time zone" shows the time zone for monitoring the I/O frequency of the actual pages allocated to the VVOL to which the target pool is allocated.

The "pool status" is the status of the target pool. The values of the "pool status" are, for example, "monitoring," "reallocating," and "not monitoring." "Monitoring" indicates that the I/O frequency of the VVOL to which the target pool is allocated or the virtual pages in the VVOL is being monitored and that the data elements are not being reallocated. "Reallocating" indicates that the reallocation of the data elements (either the reallocation in the target pool or the reallocation of the data elements from the target pool to another pool may be permitted) is being performed. "Not monitoring" indicates that neither the I/O frequency monitoring nor the reallocation of the data elements is being performed.

Figure 8:
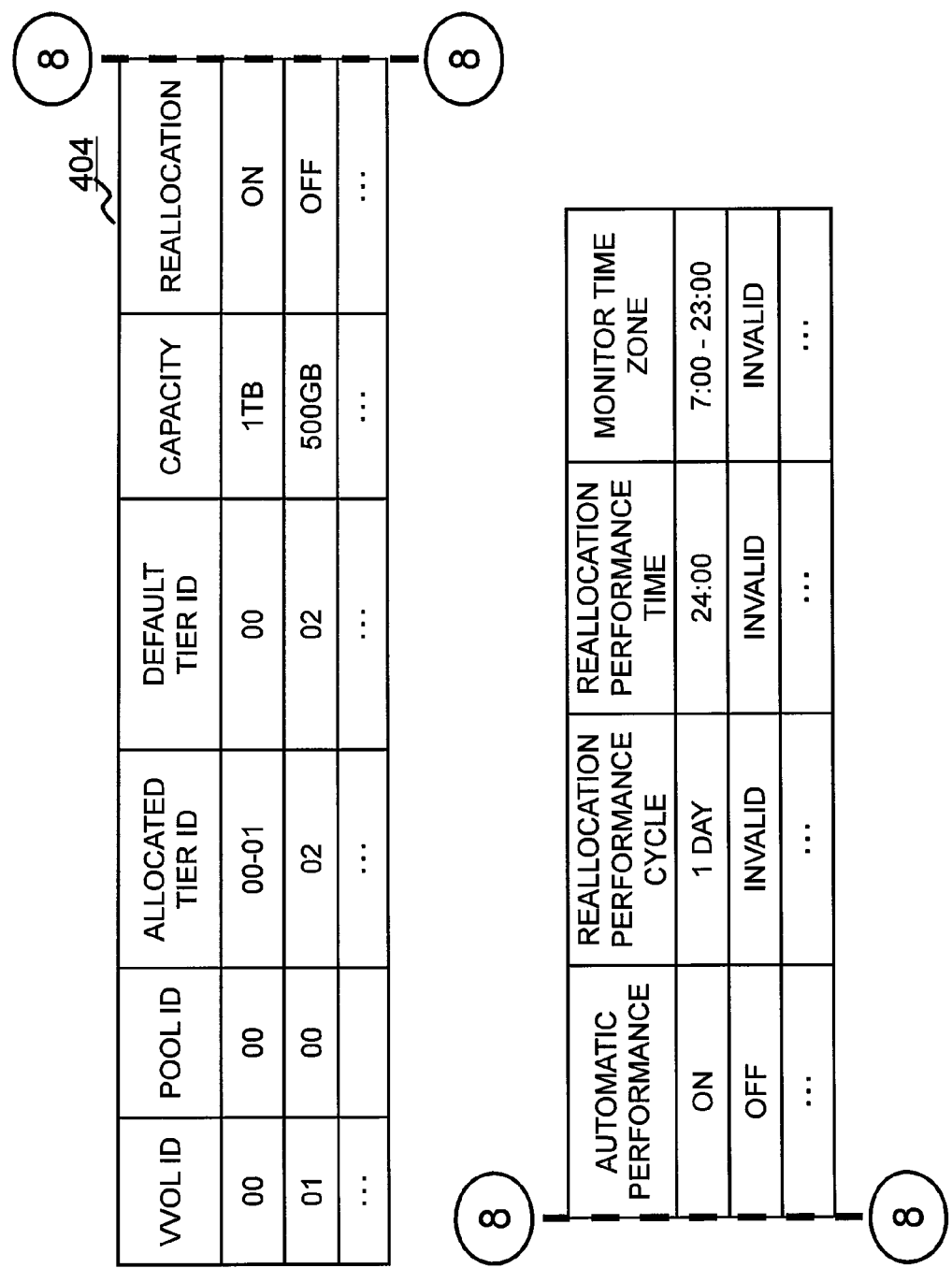
FIG. 8 shows the configuration of a VVOL management table 404.

FIG. 8 shows the configuration of a VVOL management table 404.

The VVOL management table 404 is a table for managing the information related to a VVOL. As more specifically described, for example, the table 404, for each VVOL, comprises the VVOL ID, the PVOL ID, the allocated tier ID, the default tier ID, the capacity, reallocation, automatic performance, the reallocation performance cycle, the reallocation performance time, and the monitor time zone. Among these information elements, reallocation, automatic performance, the reallocation performance cycle, the reallocation performance time, and the monitor time zone are the same as the information elements in the pool management table 403 and, if the value of an information element in this table 404 (e.g. "reallocation") is different from the value of the same information element in the pool management table 403 (e.g. "reallocation"), the value in this table 404 may be permitted to be prioritized. That is, in the pool management table 403, the values of the information elements are set for one pool and, as a result, the values can be reflected on the setting of all the VVOLs to which the pool is allocated, while the setting can be performed for each VVOL. If no specific values are set for a VVOL, the values set for the pool allocated to the VVOL are considered to be the values of the VVOL. As for one VVOL (hereinafter referred to as a "target VVOL" in the description of FIG. 8) as an example, the above-mentioned information elements in this table 404 are, specifically, as follows.

The "VVOL ID" is the ID of the target VVOL.

The "PVOL ID" is the ID of the pool allocated to the target VVOL (hereinafter referred to as an allocated pool).

The "allocated tier ID" is the ID of the tier allocated to the target VVOL among the multiple tiers the allocated pool comprises. To a virtual page in the target VVOL, an actual page is allocated from the allocated tier.

The "default tier ID" is the ID of a default tier. The default tier is the tier which is the provision source of the actual page initially allocated to the virtual page as the write destination from the host 101.

The "capacity" is the capacity of the target VVOL.

"Reallocation" shows whether to reallocate the data elements in the target VVOL or not. "ON" indicates performing reallocation and "OFF" indicates not performing reallocation. In case of "ON," the I/O frequency of the target VVOL or the virtual pages of the same is monitored while, in case of "OFF," the I/O frequency of the target VVOL or the virtual pages of the same is not monitored.

"Automatic performance" shows whether to start the reallocation of the data elements in the target VVOL automatically or manually. "ON" indicates that reallocation is automatically started while "OFF" indicates that reallocation is manually started.

The "reallocation performance cycle" is the cycle of performing reallocation of the data elements in the target VVOL.

The "reallocation performance time" shows the time of starting reallocation of the data elements in the target VVOL.

The "monitor time zone" shows the time zone for monitoring the I/O frequency of the target VVOL or the virtual pages.

FIG. 9 shows the configuration of a PVOL management table 405.

The PVOL management table 405 is the table for managing the information related to PVOLs. As more specifically described, for example, for each PVOL, comprises the RG ID, the PDEV ID, the type, the PVOL ID, and the capacity. As for one PVOL (hereinafter referred to as a "target PVOL" in the description of FIG. 9) as an example, these information elements are, specifically, as follows.

The "RG ID" is the ID of the RG which is the base of the target PVOL.

The "PDEV ID" is the ID of all the PDEVs configuring the RG which is the base of the target PVOL.

The "type" is the type of the target PVOL. This is the same as the type of the PDEV as the base of the target PVOL. For example, if the RVOL type is "SSD," the type of the target PVOL is also "SSD."

The "PVOL ID" is the ID of the target PVOL.

The "capacity" is the capacity of the target PVOL.

FIG. 10 shows the configuration of an allocation table 407.

The allocation table 407 is the table showing which actual page is allocated to which virtual page. As more specifically described, for example, the table 407, for each virtual page, comprises the VVOL ID, the virtual page ID, the pool ID, the actual page ID, and the tier ID. As for one virtual page (hereinafter referred to as a "target virtual page" in the description of FIG. 10) as an example, these information elements are, specifically, as follows.

The "VVOL ID" is the ID of the VVOL comprising the target virtual page.

The "virtual page ID" is the ID of the target virtual page.

The "pool ID" is the ID of the pool allocated to the VVOL comprising the target virtual page.

The "actual page ID" is the ID of the actual page allocated to the target virtual page.

The "tier ID" is the ID of the tier comprising the actual page allocated to the target virtual page.

FIG. 11 shows the configuration of an actual page management table 408.

The actual page management table 408 is the table for managing each actual page status. As more specifically described, for example, the table 408, for each actual page, comprises the pool ID, the actual page ID, and the status. As for one actual page (hereinafter referred to as a "target actual page" in the description of FIG. 11) as an example, these information elements are, specifically, as follows.

The "pool ID" is the ID of the pool comprising the target actual page.

The "actual page ID" is the ID of the target actual page.

The "status" is the status of the target actual page. The values of the status are, for example, "on use" and "free." "On use" indicates that the target actual page is already allocated to any of the virtual pages. "Free" indicates that the target actual page is not allocated to any virtual page and therefore can be allocated to any virtual page.

FIG. 12 shows the configuration of monitor tables 409.

The monitor table 409 exists for each VVOL. The table 409 is the type 1 monitor table 409A showing the I/O frequency of a VVOL or the type 2 monitor table 409B showing the I/O frequency of a virtual page. With reference to one VVOL (hereinafter referred to as a "target VVOL" in the description of FIG. 12) as an example, the table 409A and the table 409B are described below.

The table 409A, as more specifically described, for example, for each VVOL, comprises the VVOL ID, the total number of I/Os, the average number of I/Os, the maximum number of I/Os, and the last I/O time. These information elements are, specifically, as follows.

The "VVOL ID" is the ID of the target VVOL.

The "total number of I/Os" is the number of I/Os performed for the target VVOL (specifically, the I/Os for the actual pages allocated to the target VVOL) during the monitor time zone.

The "average number of I/Os" is the value ascertained by dividing the value of the "total number of I/Os" by the specified length of time.

The "maximum number of I/Os" is the maximum number of I/Os among the multiple numbers of I/Os (the numbers of I/Os for the target VVOL) in the multiple time zones comprising the monitor time zone.

The "last I/O time" is the latest time of performing the I/O for the target VVOL.

The table 409B, as more specifically described, for example, for each virtual page, comprises the VVOL ID, the virtual page ID, the total number of I/Os, the average number of I/Os, the maximum number of I/Os, and the last I/O time. As for one virtual page (hereinafter referred to as a "target virtual page" in the description of FIG. 12) as an example, these information elements are, specifically, as follows.

The "VVOL ID" is the ID of the VVOL comprising the target virtual page (that is, the target VVOL).

The "virtual page ID" is the ID of the target virtual page.

The "total number of I/Os" is the number of I/Os performed for the target virtual page during the monitor time zone.

The "average number of I/Os" is the value ascertained by dividing the value of the "total number of I/Os" by the specified length of time.

The "maximum number of I/Os" is the maximum number of I/Os among the multiple numbers of I/Os (the numbers of I/Os for the target virtual page) in the multiple time zones comprising the monitor time zone.

The "last I/O time" is the latest time of performing the I/O for the target virtual page.

For a VVOL where VOL-based data migration is specified, the table 409A is created while, for a VVOL where page-based data migration is specified, the table 409B is created. The table 409A is taken into consideration for automatic determination on whether to perform VOL-based data migration or not while the table 409B is taken into consideration for automatic determination on whether to perform page-based data migration or not.

Two tables 409A and two tables 409B, for example, exist respectively (or more than two may also be permitted). As for the table 409B as an example, two tables 409B are alternately used. As more specifically described, for example, if reallocation is performed, using a table 409B of the monitor time zone closest to the point of time for performing the processing, the migration page table 411 described later is created and, at the same time, using the other table 409B, the I/O frequency monitoring is performed. In the description below, the tables 409A and 409B which are being used might be referred to as the active tables 409A and 409B while the tables 409A and 409B which are not used might be referred to as the standby tables 409A and 409B.

FIG. 13 shows the configuration of a frequency distribution table 410.

The frequency distribution table 410 is the table showing the correlation between the number of I/Os and the number of virtual pages. This table 410 is created with reference to the type 2 monitor table 409B (i.e. the table showing the I/O frequency per virtual page). As the number of I/Os, at least one of the total number of I/Os, the average number of I/Os, and the maximum number of I/Os in the above-mentioned table 409B may be adopted. FIG. 13 shows an example where the average number of I/Os is adopted. That is, the table 410 shown in FIG. 13 shows the number of virtual pages per average number of I/Os. According to FIG. 13, it can be ascertained that the number of virtual pages whose average number of I/Os is "0" is "561." This table 410 (or the graphs created with reference to this table 410) is displayed on the management apparatus 107. The administrator, with reference to the table 410 (or the graphs created with reference to the same), can manually instruct the storage system 103 to start the reallocation of the data elements.

The frequency distribution table 410 may be permitted to be updated in accordance with the updates of the type 2 monitor table 409B or may also be permitted to be created with reference to the table 409B when the administrator gives an instruction for the display of the frequency distribution.

FIG. 14 shows the configuration of a migration page table 411.

The migration page table 411 is the table created when performing page-based data migration with reference to the type 2 monitor table 409B. The table 411 shows the relation between the migration source and the migration destination. As more specifically described, for example, for each virtual page as the migration target, comprises the virtual page ID, the migration source tier ID, the migration destination tier ID, and the migration status. As for one virtual page (hereinafter referred to as a "target virtual page" in the description of FIG. 14) as an example, these information elements are, specifically, as follows.

The "virtual page ID" is the ID of the target virtual page.

The "migration source tier ID" is the ID comprising the actual page (actual page as the migration source) allocated to the target virtual page.

The "migration destination tier ID" is the ID of the tier to be the migration destination of the data elements. The actual page as the migration destination is any of the free actual pages in the tier.

The "migration status" is the status of the migration of the target virtual page. The values of the "migration status" are, for example, "completed" "in process," and "not completed." "Completed" indicates that the data elements are already migrated from the actual page as the migration source to any one of the actual pages in the tier as the migration destination. "In process" indicates that the data elements are being migrated from the actual page as the migration source to any one of the actual pages in the tier as the migration destination. "Not completed" indicates that the data elements do not start to be migrated yet from the actual page as the migration source to any one of the actual pages in the tier as the migration destination.

Note that the migration page table 411 may also be permitted to comprise other types of information elements related to the migration source, instead of or in addition to the virtual page ID. For example, the ID of the actual page allocated to the virtual page may also be permitted to be included in the table 411.

Furthermore, the migration page table 411 may also be permitted to comprise other types of information elements related to the migration destination, instead of or in addition to the migration destination tier ID. For example, with a free actual page in the migration destination tier is identified with reference to the tables 402 (FIG. 6) and 408 (FIG. 11), the ID of the identified actual page may also be permitted to be included in the table 411. In that case, the status of the identified actual page may also be permitted to be updated from "free" to "on use" (or other type of status e.g. "reserved").

FIG. 15 shows the configuration of a migration definition table 412.

The migration definition table 412, for each VVOL, shows the definition of the migration. As more specifically described, for example, the table 412, for each VVOL, comprises the VVOL ID, page-based migration, VOL-based migration, tier maintenance, the allocated tier ID, and the storage threshold. As for one VVOL (hereinafter referred to as a "target VVOL" in the description of FIG. 15) as an example, these information elements are, specifically, as follows.

The "VVOL ID" is the ID of the target VVOL.

"Page-based migration" shows whether to perform page-based data migration or not. "ON" indicates performing page-based data migration while "OFF" indicates not performing page-based data migration.

"VOL-based migration" shows whether to perform VOL-based data migration (more strictly, VOL-based) or not. "ON" indicates performing VOL-based data migration while "OFF" indicates not performing VOL-based data migration. Therefore, if both "page-based migration" and "VOL-based migration" are "OFF," that indicates that the data elements in the target VVOL are not migrated (reallocated).

"Tier maintenance" shows whether to perform tier-maintained migration or not. Tier maintenance is to make the ID of the migration destination tier (i.e. tier type) the same as the ID of the migration source tier. "ON" indicates maintaining the tier and "OFF" indicates not maintaining the tier.

The "allocated tier ID" is the ID of the allocated tier of the target VVOL.

The "storage threshold" is the threshold of the storage rate of the allocated tier. This threshold is set for each allocated tier. The "storage rate" is, as to one allocated tier (hereinafter referred to as a "target allocated tier" in the description in this paragraph), as follows. That is, the threshold rate shows how much rate of the data elements are stored in the target allocated tier among all the data elements in the target VVOL.

Though, according to the example of the table 412 in FIG. 15, the storage threshold is set for each tier, instead of which, it may also be permitted that one storage threshold is set for one pool and that the one tier is common to all the tiers that the one pool comprises.

The processing performed in this embodiment is described below. Note that, in the description below, the processing performed by the computer program is actually performed by the MP (microprocessor) performing the computer program. The MP exists in the MPPK 121 (refer to FIG. 2).

<Pool Creation>.

Figure 16:
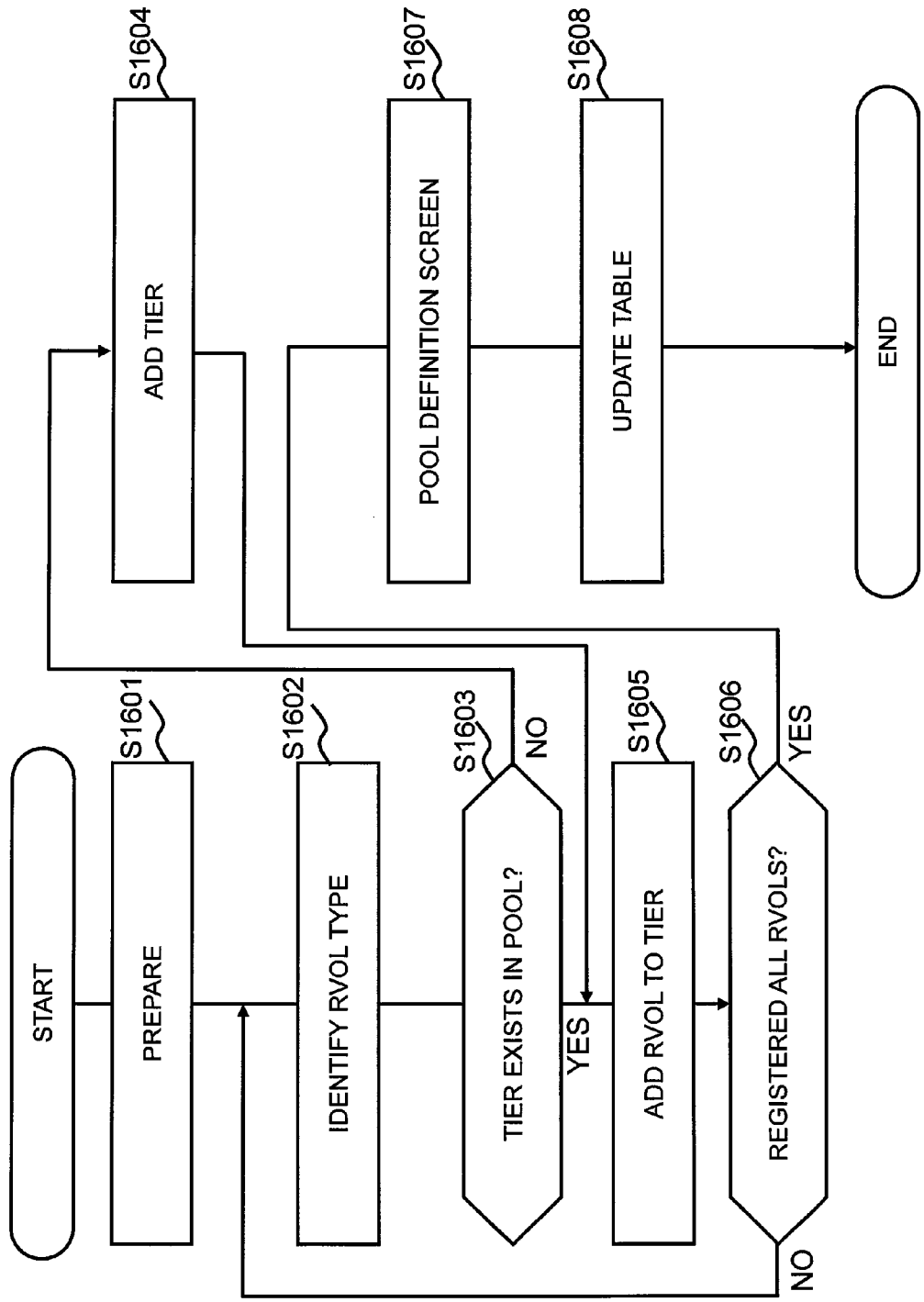
FIG. 16 shows a flowchart of the pool creation processing.

FIG. 16 shows a flow of the pool creation processing. Note that, in this description of <pool creation>, the pool newly created through the pool creation processing is referred to as a "target pool."

(S1601)

The UI control program 413 receives an instruction for pool creation via the management apparatus 107 from the administrator. Then, the program 413, for example, performs the preparation processing below.

The program 413 adds a new record of the target pool to the tables 402 (FIG. 6), 403 (FIG. 7), and 408 (FIG. 11).

The program 413 receives the specification of a PVOL via the management apparatus 107 from the administrator. As more specifically described, for example, the program 413 displays the information related to the RVOL (e.g. the ID, the type, and others) and receives the specification of the RVOL to be the PVOL.

For each specified RVOL, the processing from S1602 to S1605 is performed. With reference to one RVOL (hereinafter referred to as a "target RVOL" in the description of FIG. 16) as an example, the processing from S1602 to S1605 is described.

(S1602)

The program 413 identifies the type of the specified RVOL. As more specifically described, for example, the CMPK 119 stores the RVOL management table comprising, for each RVOL, the ID, the capacity, the type (e.g. SSD, HDD-SAS) and others, and the program 413, from the RVOL management table, identifies the type of the specified RVOL.

(S1603)

The program 413 determines whether the tier corresponding with the identified RVOL type already exists in the target pool or not from the tier management table 403. If the result of this determination is negative, S1604 is performed while, if the result of this determination is affirmative, S1605 is performed.

(S1604)

The program 413 identifies the ID of the tier corresponding with the identified RVOL type from the tier definition table 401. Then, the program 413, for the target pool, adds the identified tier ID to the table 402 (FIG. 6).

(S1605)

The program 413 adds the target RVOL to the tier corresponding with the identified RVOL type (hereinafter referred to as a "target tier" in this paragraph). As more specifically described, for example, the program 413 registers the ID of the target RVOL as the PVOL ID corresponding with the tier ID of the target tier to the table 402 (FIG. 6).

(S1606)

The program 413, for all the specified RVOLs, determines whether the processing S1602 and later is performed or not. If there are any RVOLs for which the processing S1602 and later is not performed among the specified RVOLs, the processing S1602 and later is performed for the RVOLs.

(S1607)

The program 413 displays the pool definition GUI (graphic User Interface). Then, the program 413 accepts various types of setting through the GUI.

FIG. 17 shows a pool definition GUI 1700.

On the GUI 1700, the ID of a target pool is displayed. Note that the program 413, in response to the operation of a specified tool (e.g. a pull-down menu) by the administrator, may also be permitted to display the ID of other pools than the target pool (i.e. existing pools).

Furthermore, the GUI 1700 comprises input tools for the administrator to input, as to the pool indicated by the displayed ID, the values of the information elements which should be set in the table 403 (FIG. 7), "hierarchization," "reallocation," "automatic performance," the "performance cycle," the "performance time," the "monitor time zone," and the "tier threshold." As the input tools referred to in this embodiment, arbitrary tools such as a radio button, a checkbox, and text entry field can be adopted. Note that it is possible for the GUI 1700, as to the "tier threshold," either to make one threshold common to all the tiers the target pool comprises or to set a threshold for each of the tiers the target pool comprises.

Note that, as mentioned above, existing pool IDs can also be displayed on the GUI 1700, and therefore, by using the GUI 1700, the setting of the existing pool desired by the administrator can also be changed. In that case, for example, if the tier threshold desired by the administrator is larger than the usage rate of the tier for which the threshold is set, the program 413 may also be permitted to display a caution of an inappropriate tier threshold on the management apparatus 105 and not register the tier threshold to the table 402 (FIG. 6).

FIG. 16 is referred to again.

(S1608)

The program 413 updates the table. As more specifically described, for example, the program 413 performs the processing below.

The program 413 registers the values of the information elements input to the GUI 1700 in FIG. 17, "hierarchization," "reallocation," "automatic performance," the "performance cycle," the "performance time," the "monitor time zone," and the "tier threshold" to the table 403 (FIG. 7).

The program 413 partitions the target pool into multiple actual pages, and adds the IDs of the multiple actual pages to the tables 402 (FIG. 6) and 408 (FIG. 11).

The actual page capacity may be common to all the pools. Therefore, the number of actual pages configuring the target pool may depend on the capacity of the target pool (total capacity of the PVOL configuring the target pool).

Note that the actual page capacity may be different in respective PVOLs. As more specifically described, for example, the capacity of the actual pages configuring the PVOL based on the RG of RAID5 (4D+1P) and the capacity of the actual pages configuring the PVOL based on the RG of RAID6 (4D+2P) may be different. This is because they are different in the number of parities stored in one actual page.

<VVOL Creation>.

Figure 18:
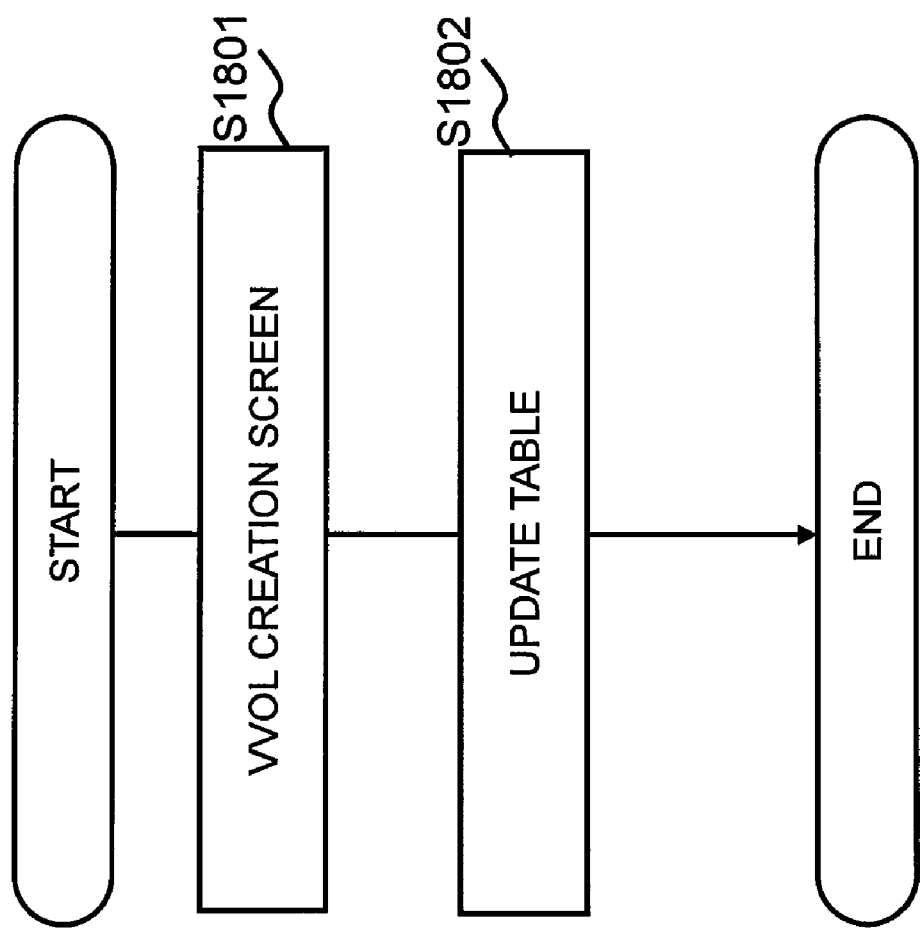
FIG. 18 shows the flow of the VVOL creation processing.

FIG. 18 shows a flow of the VVOL creation processing. Note that, in this description of <VVOL creation>, the VVOL newly created through the VVOL creation processing is referred to as a "target VVOL."

(S1801)

The UI control program 413 displays the VVOL creation GUI. Then, the program 413 accepts various types of setting through the GUI.

Figure 19:
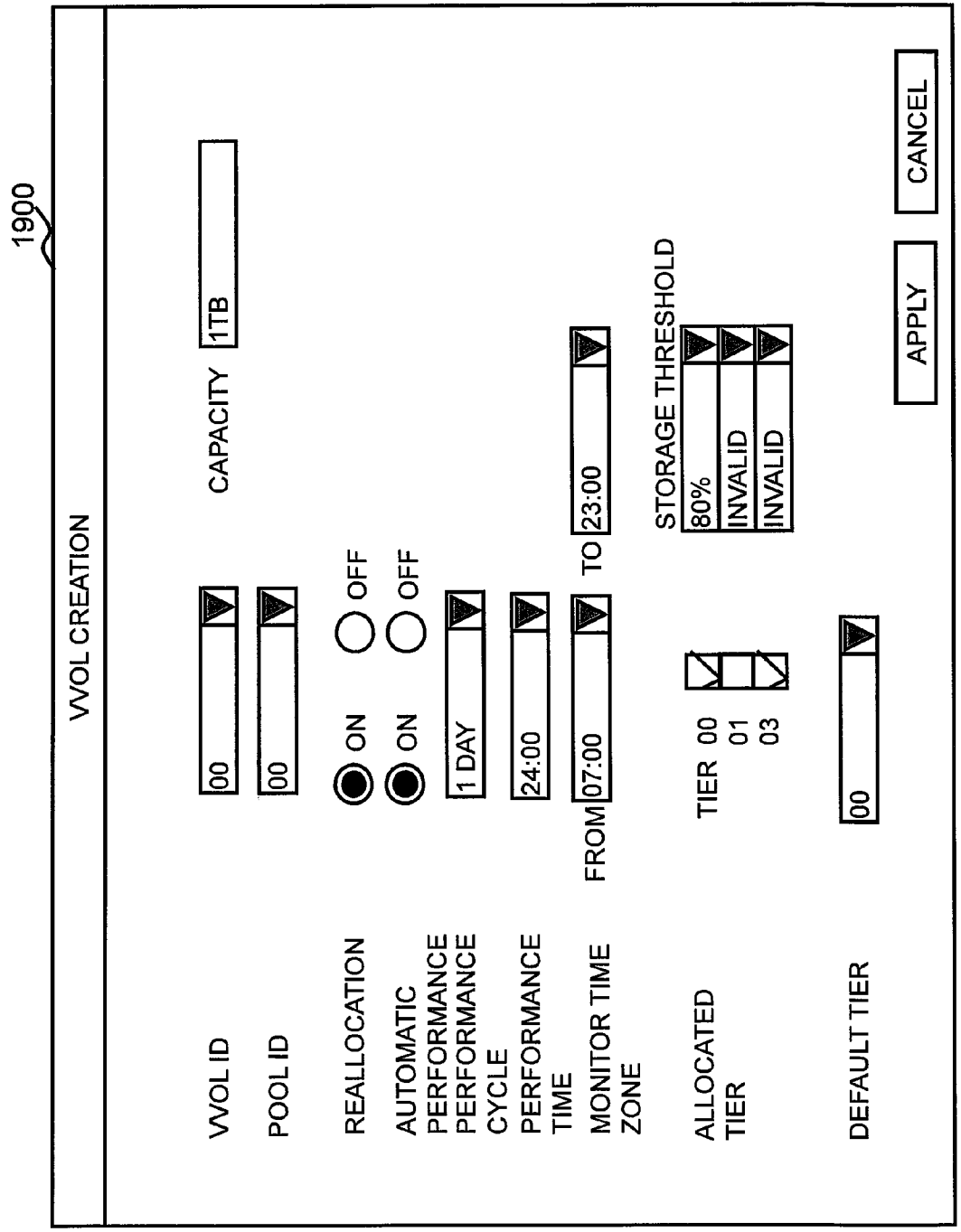
FIG. 19 shows a VVOL creation GUI 1900.

FIG. 19 shows a VVOL creation GUI 1900.

On the GUI 1900, the ID of a target VVOL is displayed. Note that the program 413, in response to the operation of a specified tool (e.g. a pull-down menu) by the administrator, may also be permitted to display the ID of other VVOLs than the target VVOL (i.e. existing VVOLs).

The GUI 1900 comprises input tools for the administrator to use, as to the VVOL indicated by the displayed ID, to input the values of the information elements which should be set in the table 404 (FIG. 8), "pool ID," the "capacity," "reallocation," "automatic performance," the "performance cycle," the "performance time," and the "monitor time zone."

Furthermore, the GUI 1900 identifies the tier ID corresponding with the input pool ID from the table 402 (FIG. 6), and displays all the identified tier IDs. The GUI 1900 comprises input tools for the administrator to use, as to the VVOL indicated by the displayed ID, to input the values of the "allocated tier," the "storage threshold," and the "default tier." The administrator, by using those input tools, can input which of the multiple tiers which the pool indicated by the input pool ID (pool allocated to the VVOL) comprises should be the allocated tiers, which of the allocated tiers should be a "default tier," and the storage threshold of each allocated tier.

FIG. 18 is referred to again.

(S1802)

The program 413 updates the table. As more specifically described, for example, the program 413 performs the processing below.

The program 413 registers the values of the information elements input to the GUI 1900 in FIG. 19, "pool ID," the "capacity," "reallocation," "automatic performance," the "performance cycle," the "performance time," the "monitor time zone," the "allocated tier ID," and the "default tier ID" to the table 404 (FIG. 8).

The program 413, with reference to the capacity of the target VVOL, ascertains the number of virtual pages configuring the target VVOL. The program 413 registers the ID of the target VVOL and the virtual page IDs for the ascertained number of virtual pages to the table 407 (FIG. 10).

The program 413, for the target VVOL, if "reallocation" is "ON," creates the tables 409A and 409B (FIG. 12). This is because the I/O frequency is monitored in the monitor time zone. Note that, to the table 409B, the virtual page IDs for the above-ascertained number of virtual pages are registered.

The program 413, for the target VVOL, registers the "allocated tier ID" and the "storage threshold" to the table 412 (FIG. 15).

<Migration Definition>

Figure 20:
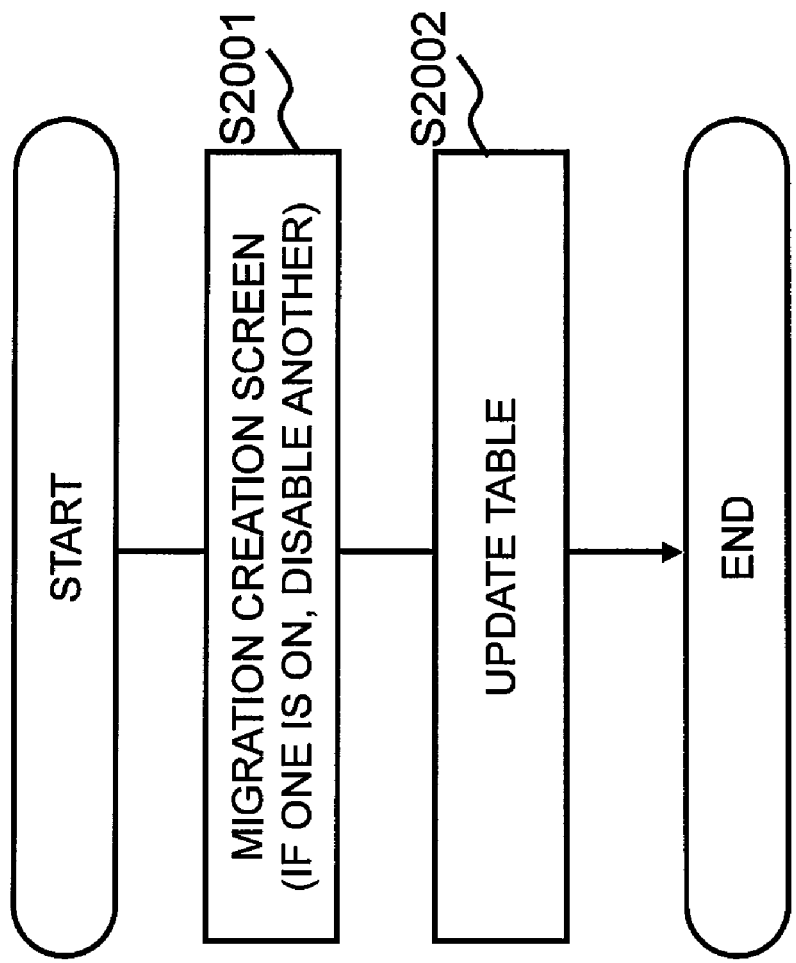
FIG. 20 shows the flow of the migration definition processing.

FIG. 20 shows the flow of the migration definition, processing.

(S2001)

The UI control program 413 displays the migration definition GUI. Then, the program 413, accepts various types of setting through the GUI.

Figure 21:
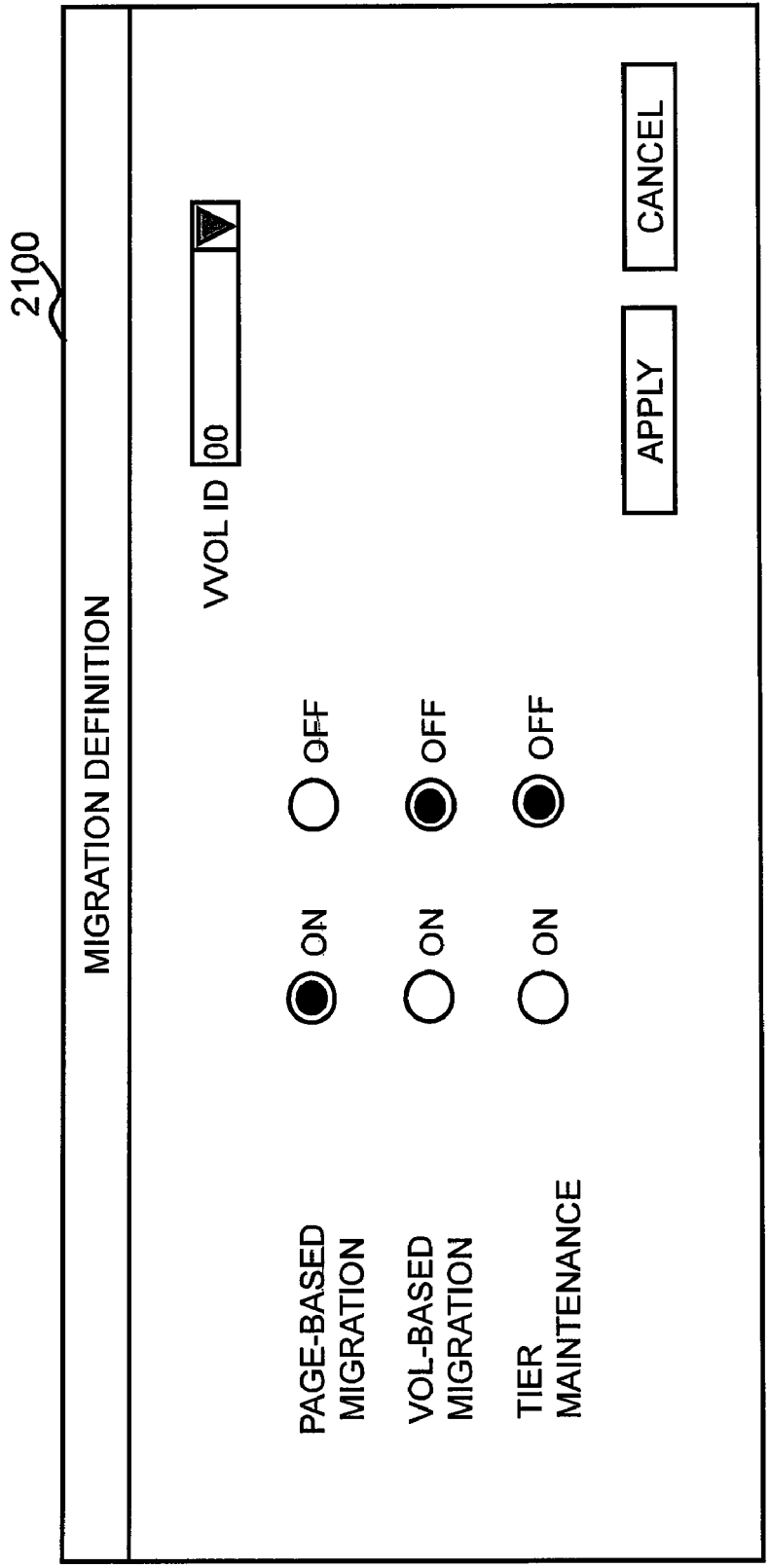
FIG. 21 shows a migration definition GUI 2100.

FIG. 21 shows a migration definition GUI 2100.

The GUI 2100 comprises input tools for the administrator to use to specify the VVOL ID. The administrator, by using the tools, displays the ID of the VVOL as the target of migration definition (hereinafter referred to as a <target VVOL> in this description of "migration definition").

The GUI 2100, comprises input tools for the administrator to use, as to the VVOL indicated by the displayed ID, to input the values of the information elements which should be set in the table 412 (FIG. 15), "page-based migration," "VOL-based migration," and "tier maintenance."

The program 413, in accordance with the operation by the administrator, for example, performs the control below.

The program 413, if "ON" is selected on either "page-based migration" or "VOL-based migration," controls the "ON" on the other one as unselectable. That is, the program 413 performs the control for the prevention of both "page-based migration" and "VOL-based migration" being set to "ON."

The program 413, even if "OFF" is selected on either "page-based migration" or "VOL-based migration," leaves the "OFF" on the other one selectable (that is, the "OFF" is not made unselectable).

The program 413, if "ON" is selected on "VOL-based migration," makes the "ON" on "tier maintenance" selectable, and makes the "OFF" on "tier maintenance" unselectable. Meanwhile, the program 413, if "OFF" is selected on "VOL-based migration," makes the "ON" on "tier maintenance" unselectable, and makes the "OFF" on "tier maintenance" selectable.

FIG. 20 is referred to again.

(S2002)

The program 413 updates the table. As more specifically described, for example, the program 413, in the fields corresponding with the VVOL ID input to the GUI 2100 in FIG. 21 in the table 412 (FIG. 15), registers the values of the information elements input to the GUI 2100, "page-based migration," "VOL-based migration," and "tier maintenance."

<Information Display>.

Figure 22:
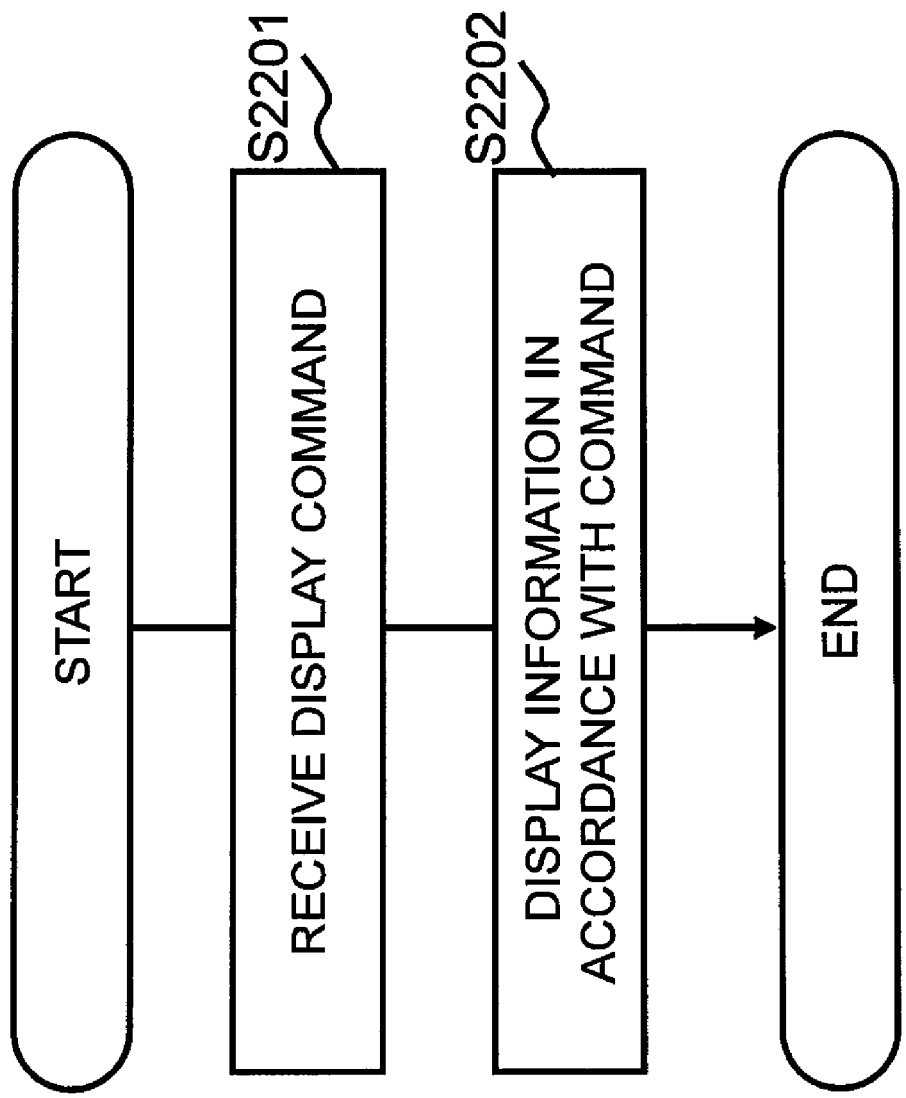
FIG. 22 shows the flow of the information display processing.

FIG. 22 shows the flow of the information display processing.

The UI control program 413 receives a display command from the management apparatus 107 (S2201), and displays the information specified by the display command on the management apparatus 107 (S2202).

The types of information which can be displayed are, for example, at least one of the tables 401 to 412 (or the information which can be acquired by processing the information (e.g. graphs, summaries, and others)).

Figure 23:
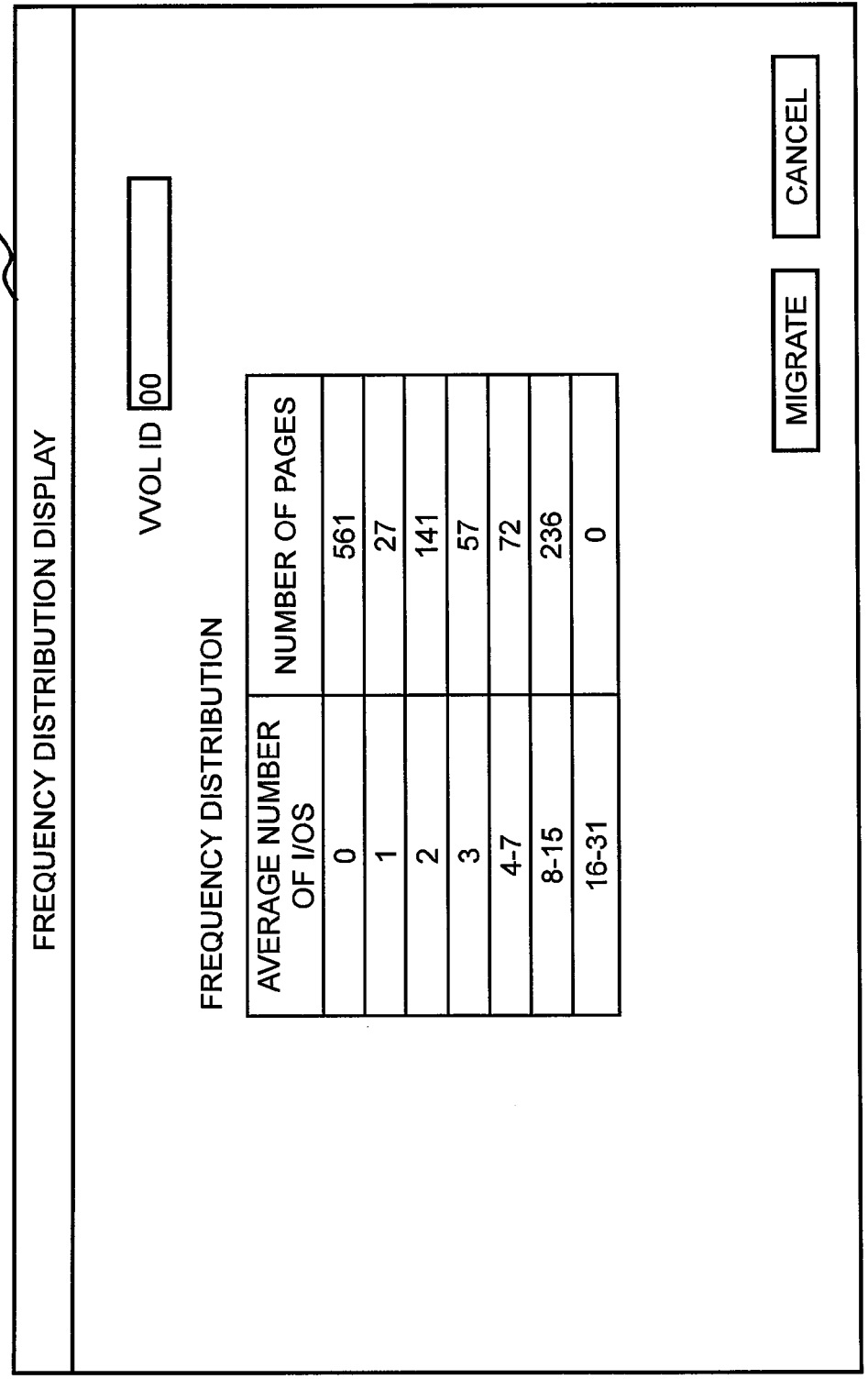
FIG. 23 shows a frequency distribution GUI 2300.

FIG. 23 shows a frequency distribution GUI 2300.

The frequency distribution GUI 2300 is displayed at S2202 in FIG. 22. As more specifically described, for example, at S2201 in FIG. 22, the management apparatus 107, in accordance with the request from the administrator, transmits a frequency distribution display command specifying the VVOL ID desired by the administrator. At S2202 in FIG. 22, the program 413, in accordance with the command, extracts the frequency distribution corresponding with the VVOL ID specified by the command from the table 410 (FIG. 13), and displays the extracted frequency distribution on the management apparatus 107 as shown in FIG. 23. Note that the frequency distribution, though displayed in a table form, instead of or in addition to the same, may also be permitted to be displayed in other forms such as a graphical form.

The administrator, with reference to the frequency distribution displayed on GUI 2300, determines whether to migrate the data elements in the desired VVOL or not. For example, the administrator, if determining that a large number of virtual pages whose average number of I/Os is large exist, may give the storage system 103 an instruction for migrating the data elements in the desired VVOL (e.g. the "migration performance" button on GUI 2300 may be clicked).

As mentioned above, the frequency distribution is used as a criterion for the administrator to determine whether to perform data migration (migrating data elements in the VVOL) or not. In other words, if data migration is automatically performed, the frequency distribution does not have to be calculated.

<Write Processing (Write to a Cache Memory)>.

Figure 24:
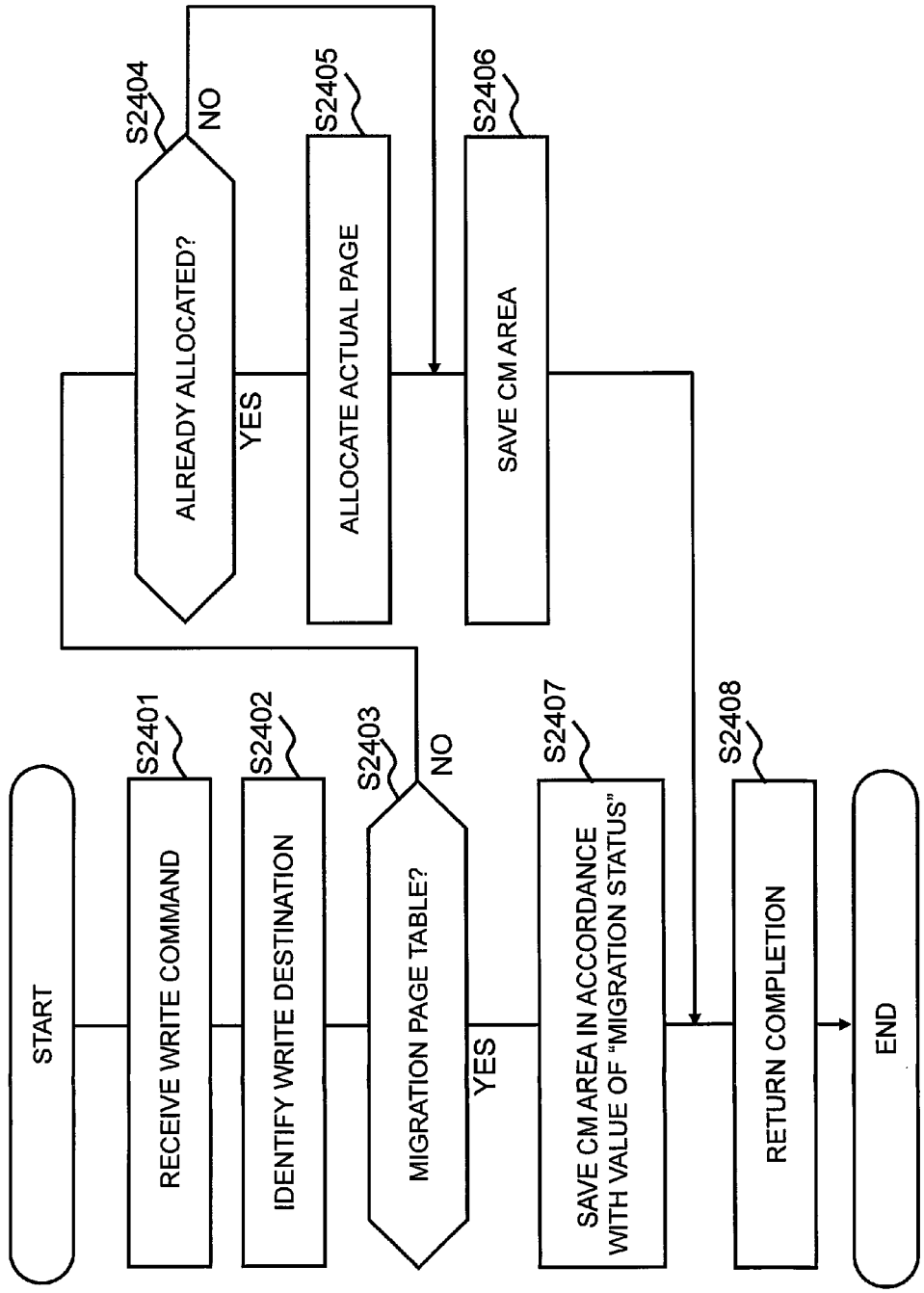
FIG. 24 shows the flow of the write processing (write to a cache memory).

FIG. 24 shows the flow of the write processing (write to a cache memory).

(S2401)

The I/O control program 414 receives a write command from the host 101.

(S2402)

The program 414, from The I/O destination information which the received write command comprises, identifies the VVOL as the write destination and the virtual page. At this point, multiple virtual pages are identified frequently. This is because the size of the data as the write target is usually larger than the capacity of one virtual page. For each identified virtual page, the processing S2403 and later is performed. With reference to one virtual page as an example, (referred to as a "target virtual page" in the description of FIG. 24), the processing S2403 and later is described below. Furthermore, in the description of FIG. 24, the data elements as the write target to the target virtual page are referred to as "target data elements."

(S2403)

The program 414 determines whether the Id of the target virtual page exists in the migration page table 411 or not. If the result of this determination is negative, the processing from S2404 to S2406 is performed while, if the result of this determination is affirmative, the processing from S2407 to S2408 is performed.

(S2404)

The program 414, with reference to the allocation table 407 (FIG. 10), determines whether an actual page is allocated to the target virtual page or not. If the result of this determination is negative, the processing S2405 is performed.

(S2405)

The program 414 performs the processing below.

The program 414 identifies the pool corresponding with the VVOL as the write destination and the default tier in the pool based on the VVOL management table 404 (FIG. 8).

The program 414 identifies a free actual page in the identified default tier based on the tier management table 402 (FIG. 6) and the actual page management table 408 (FIG. 11).

The program 414 allocates the identified actual page to the target virtual page. That is, the program 414, in the fields corresponding with the ID of the target virtual page in the allocation table 407 (FIG. 10), registers the ID of the allocated actual page, the ID of the tier comprising the actual page, and the ID of the pool comprising the tier.

The program 414, if unable to identify the free actual page from the default tier, may identify the free actual page from the allocated tier corresponding with the VVOL as the write destination, and allocate the identified actual page to the target virtual page.

The program 414 updates the value of the "usage rate" of the tier comprising the allocated actual page in the table 402 (FIG. 6) (hereinafter referred to as an "allocation source tier" in this description of S2403).

The program 414 determines whether the value of the "usage rate" of the allocation source tier after the update exceeds the "tier threshold" of the allocation source tier or not (hereinafter referred to as a "determination Z"). The "tier threshold" of the allocation source tier is the value registered in the table 402 (FIG. 6) or the value registered in the table 412 (FIG. 15), and the value registered in the table 412 may be preferentially adopted.

The program 414, if the result of the determination Z is affirmative, may perform at least one part of the processing (a) and (b).

(a) The program 414 may report an error to the management apparatus 107 (and/or the host 101 as the transmission source of the write command). The administrator, if recognizing the error of the allocation source tier, may add an RVOL to the allocation source tier.

(b) The program 414 invokes the reallocation program 415. The reallocation program 415 performs the processing shown in FIG. 38. The processing shown in FIG. 38 is described later.

(S2406)

The program 414 saves a CM area for the data elements to be stored in the target virtual page from the cache memory.

(S2407)

The program 414, in accordance with the value of the "migration status" corresponding with the target virtual page in the migration page table 411, saves a CM area. As more specifically described, the processing is as follows.

<Case A: the "Migration Status" is "not Completed">

For example, either (concrete example A1) or (concrete example A2) is performed.

CONCRETE EXAMPLE A1

The program 414 saves a CM area, and determines the free actual page in the migration destination tier corresponding with the target virtual page as the write destination. As more specifically described, for example, the program 414, if the data elements in any of the free actual pages in the migration destination tier exists in the cache memory, saves the CM area where the data elements exist and, at the same time, determines the free actual page as the write destination. The free actual pages in the migration destination tier, as mentioned above, can be identified with reference to the tables 402 (FIG. 6) and 408 (FIG. 11).

The program 414 updates the "migration status" corresponding with the target virtual page to "completed." As a result, for the target virtual page, the migration of the data elements is not performed. That is, it can be said that the migration of the data elements for the target virtual page was cancelled.

The program 414, to the target virtual page, instead of the original actual page, allocates the actual page as the determined write destination. That is, the program 414, overwrites the fields corresponding with the ID of the target virtual page in the allocation table 407 with the ID of the actual page as the determined write destination and the ID of the tier comprising the actual page (the ID of the migration destination tier).

The program 414 updates the "status" of the original actual page allocated to the target virtual page in the actual page management table 408 (FIG. 11) to "free." Furthermore, the program 414 updates the "status" of the actual page newly allocated to the target virtual page in the table 408 to "on use."

CONCRETE EXAMPLE A2

The program 414 saves a CM area and determines the actual page allocated to the target virtual page (actual page in the migration source tier) as the write destination. As more specifically described, for example, the program 414, if no data elements of any free actual pages in the migration destination tier exists in the cache memory, saves a CM area (e.g. area where the data elements in the actual page allocated to the target virtual page exist) and, at the same time, determines the actual page allocated to the target virtual page (actual page in the migration source tier) as the write destination.

The program 414 may update the "migration status" corresponding with the target virtual page to "suspended." By this method, for example, for the target virtual page, data migration by the reallocation program 415 is not performed. Note that the value of this "migration status," for example, when the destaging described later is completed by the program 414, may be changed from "suspended" back to "not completed."

<Case B: the "Migration Status" is "in Process">

For example, any one of (concrete example B1) to (concrete example B3) is performed.

CONCRETE EXAMPLE B1

The program 414 updates the "migration status" corresponding with the target virtual page to "suspended." Then, the program 414 performs the above-mentioned (concrete example A1) or (concrete example A2). If (concrete example A1) is performed, the "migration status" corresponding with the target virtual page is considered to be updated to "completed." If (concrete example A2) is performed, the "migration status" corresponding with the target virtual page is considered to be updated to "not completed."

CONCRETE EXAMPLE B2

The program 414 saves a CM area. In case of (concrete example B2), destaging is performed after the "migration status" corresponding with the target virtual page is updated to "completed." Therefore, the write destination (destaging destination) is the actual page in the migration destination tier. This is because, at that point, to the target virtual page, the actual page in the migration destination tier is allocated.

CONCRETE EXAMPLE B3

The program 414 saves a CM area. In case of (concrete example B3), destaging is performed while the "migration status" corresponding with the target virtual page is "in process," and the data elements are destaged both to the actual page allocated to the target virtual page and to the actual page in the migration destination tier (i.e. what is called double write is performed).

<Case C: the "Migration Status" is "Completed">
For example, the processing below is performed.
The program 414 saves a CM area. In this case, the write destination (destaging destination) is the actual page in the migration destination tier. This is because, as the "migration status" corresponding with the target virtual page is updated to "completed," the actual page allocated to the target virtual page is, as described later, changed to the actual page as the migration destination.

(S2408)
If a CM area was saved for all virtual pages identified at S2402, the program 414 writes the write target data to one or more saved CM areas, and reports the completion to the host 101.

Figure 25:
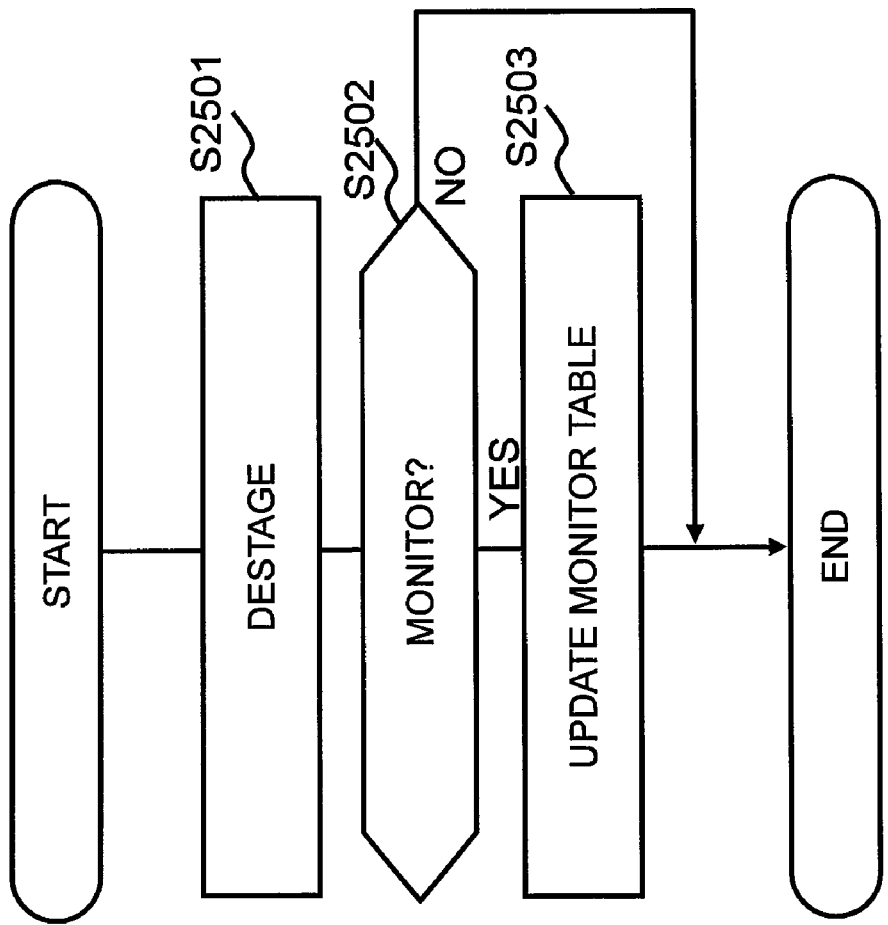
FIG. 25 shows the flow of the destaging processing.

<Write Processing (Destaging)>.
FIG. 25 shows the flow of the destaging processing.
The I/O control program 414, for each of the data elements configuring the write target data, performs the destaging processing.

(S2501)
The program 414 performs destaging. That is, the program 414, among the multiple data elements existing in the cache memory, writes the data elements not yet written to the actual page (dirty data elements) to the actual page. The actual page as the destaging destination is the actual page allocated to the virtual page which is the write destination of the actual page (actual page identified by the allocation table 407). Note that, at this point, if the "migration status" corresponding with the virtual page is "suspended," the program 414 may update the "migration status" to "not completed."

(S2502)
The program 414, with reference to the table 403 (FIG. 7) or 404 (FIG. 8), determines whether the monitor table 409A or 409B must be updated or not. The table 404 (FIG. 8) may be prioritized. As more specifically described, for example, the program 414 makes the following two determinations P and Q. (Determination P) The 414 determines whether "reallocation" corresponding with the pool comprising the actual page as the destaging destination at S2501 (hereinafter referred to as a "target pool" in the description of FIG. 25) is "ON" or not, or whether "reallocation" corresponding with the VVOL comprising the virtual page to which the actual page as destaging destination is allocated (hereinafter referred to as a "target VVOL" in the description of FIG. 25) is "ON" or not. If the result of this determination P is negative, S2503 is not performed (that is, the monitor table 409A or 409B does not have to be updated). (Determination Q) If the result of this determination P is affirmative, the program 414 determines whether the current time is within tie time zone indicated by the "monitor time zone" corresponding with the target pool or not. If the result of this determination Q is negative, S2503 is not performed. On the other hand, if the result of this determination Q as well as the determination P is affirmative, S2503 is performed (that is, the monitor table 409A or 409B must be updated).

(S2503)
The program 414, updates the monitor table 409A or 409B. As more specifically described, for example, the processing below is performed.
The program 414, if "VOL-based migration" corresponding with the target VVOL is "ON" in the 412 (FIG. 15), updates the active type 1 monitor table 409A corresponding with the target VVOL. As more specifically described, for example, the program 414 updates the value of the "total number of I/Os" in the active type 1 monitor table 409A (for example, increments by 1) and, at the same time, updates the value of the "last I/O time." Furthermore, the program 414, for example, for the target VVOL, adds the time of destaging to the I/O history table which is not shown in the figure. In the I/O history table, for example, each time I/O is performed for the actual page, the time of performing the I/O is recorded (furthermore, other types of information such as the I/O type (read or write) may also be permitted to be recorded). For example, with reference to the I/O history table, later, the program 414 may also be permitted to update the "average number of I/Os" and the "maximum number of I/Os" in the active type 1 monitor table 409A.
The program 414, if "page-based migration" corresponding with the target VVOL is "ON" in the 412 (FIG. 15), updates the active type 2 monitor table 409B corresponding with the target VVOL. As more specifically described, for example, the program 414 updates the value of the "total number of I/Os" corresponding with the virtual page as the write destination of the destaged data elements in the active type 2 monitor table 409B (for example, increments by 1) and, at the same time, updates the value of the "last I/O time." Furthermore, the program 414, for example, for the virtual page as the write destination, adds the time of destaging to the above-mentioned I/O history table. In this case, in the I/O history table, the ID of the virtual page as the write destination may also be permitted to be recorded. For example, with reference to the I/O history table, later, the program 414 may also be permitted to update the "average number of I/Os" and the "maximum number of I/Os" in the active type 2 monitor table 409B.

Figure 26:
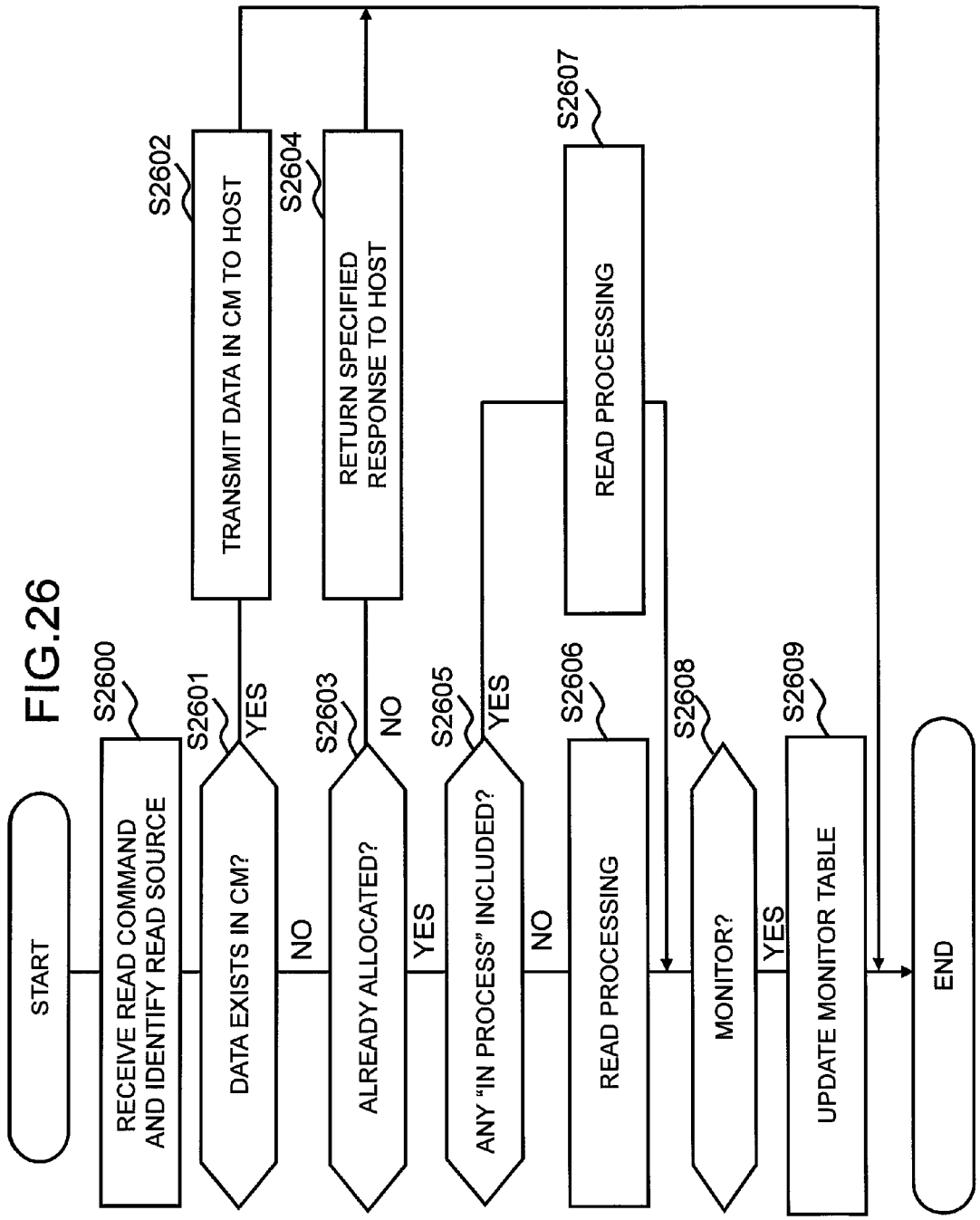
FIG. 26 shows the flow of the read processing.

<Read Processing>.
FIG. 26 shows the flow of the read processing.
(S2600)
The I/O control program 414 receives a read command from the host 101. Then, the program 414, with reference to the I/O destination information which the received read command comprises, identifies the VVOL as the read source and the virtual page.

(S2601)
The program 414 determines whether the read target data exists in the cache memory or not. If the result of this determination is negative, S2603 is performed while, if the result of this determination is affirmative, S2602 is performed (S2602)
The program 414 transmits the read target data in the cache memory to the host 101. In this case, the monitor tables 409A and 409B corresponding with the VVOL as the read source are not updated. This is because no I/O is performed for the actual page.

(S2603)
The program 414, with reference to the allocation table 407, determines whether an actual page is allocated to the virtual page identified at S2600 or not. If the result of this determination is negative, S2604 is performed while, if the result of this determination is affirmative, S2605 is performed.

(S2604)

The program 414 transmits a specified response (e.g. data indicating zero) to the host 101.

(S2605)

The program 414 determines whether at least one of the ID(s) of one or more virtual pages identified at S2600 is registered to the migration page table 411 and, at the same time, the "migration status" corresponding with the registered virtual page ID(s) is "in process" or not. If the result of this determination is negative, S2607 is performed while, if the result of this determination is affirmative, S2606 is performed.

(S2606)

The program 414, from one or more actual pages respectively allocated to one or more virtual pages identified at S2600 (one or more actual pages identified from the allocation table 407), reads data elements. The program 414 transmits the read target data configured of the data elements to the host 101.

(S2607)

The program 414, for the virtual page whose "migration status" is "in process," waits until the "migration status" is changed to "completed." Then, the program 414, from one or more actual pages respectively allocated to one or more virtual pages identified at S2600 (one or more actual pages identified from the allocation table 407), reads data elements. The program 414 transmits the read target data configured of the data elements to the host 101.

(S2608)

The program 414, with reference to the table 403 (FIG. 7) or 404 (FIG. 8), determines whether the monitor table 409A or 409B must be updated or not. The table 404 (FIG. 8) may be prioritized. As more specifically described, for example, the program 414 makes the following two determinations V and W. (Determination V) The 414 determines whether "reallocation" corresponding with the pool allocated to the read source VVOL (hereinafter referred to as a "read source pool" in the description of FIG. 26) is "ON" or not, or whether "reallocation" corresponding with the read source VVOL is "ON" or not. If the result of this determination V is negative, S2609 is not performed (that is, the monitor table 409A or 409B does not have to be updated).

(Determination W) If the result of this determination V is affirmative, the program 414 determines whether the current time is within the time zone indicated by the "monitor time zone" corresponding with the target pool or not. If the result of this determination W is negative, S2609 is not performed. On the other hand, if the result of this determination W as well as the determination V is affirmative, S2609 is performed (that is, the monitor table 409A or 409B must be updated).

(S2609)

The program 414, updates the monitor Table 409A or 409B. As more specifically described, for example, the processing below is performed.

The program 414, if "VOL-based migration" corresponding with the read source VVOL is "ON" in the table 412 (FIG. 15), updates the active type 1 monitor table 409A corresponding with the read source VVOL. As more specifically described, for example, the program 414 updates the value of the "total number of I/Os" in the active type 1 monitor table 409A (for example, increments by 1) and, at the same time, updates the value of the "last I/O time." Furthermore, the program 414, for example, for the read source VVOL, adds the time of reading data to the above-mentioned I/O history table. For example, with reference to the I/O history table, later, the program 414 may also be permitted to update the "average number of I/Os" and the "maximum number of I/Os" in the active type 1 monitor table 409A.

The program 414, if "page-based migration" corresponding with the read source VVOL is "ON" in the table 412 (FIG. 15), updates the active type 2 monitor table 409B corresponding with the read source VVOL. As more specifically described, for example, the program 414 updates the value of the "total number of I/Os" corresponding with the write destination virtual page as the read source in the active type 2 monitor table 409B (for example, increments by 1) and, at the same time, updates the value of the "last I/O time." Furthermore, the program 414, for example, for the read source virtual page, adds the time of reading to the above-mentioned I/O history table. In this case, in the I/O history table, the ID of the virtual page as the read source may also be permitted to be recorded. For example, with reference to the I/O history table, later, the program 414 may also be permitted to update the "average number of I/Os" and the "maximum number of I/Os" in the active type 2 monitor table 409B.

<The Relation Between the I/O Frequency Monitor and Reallocation Processing>.

Figure 27:
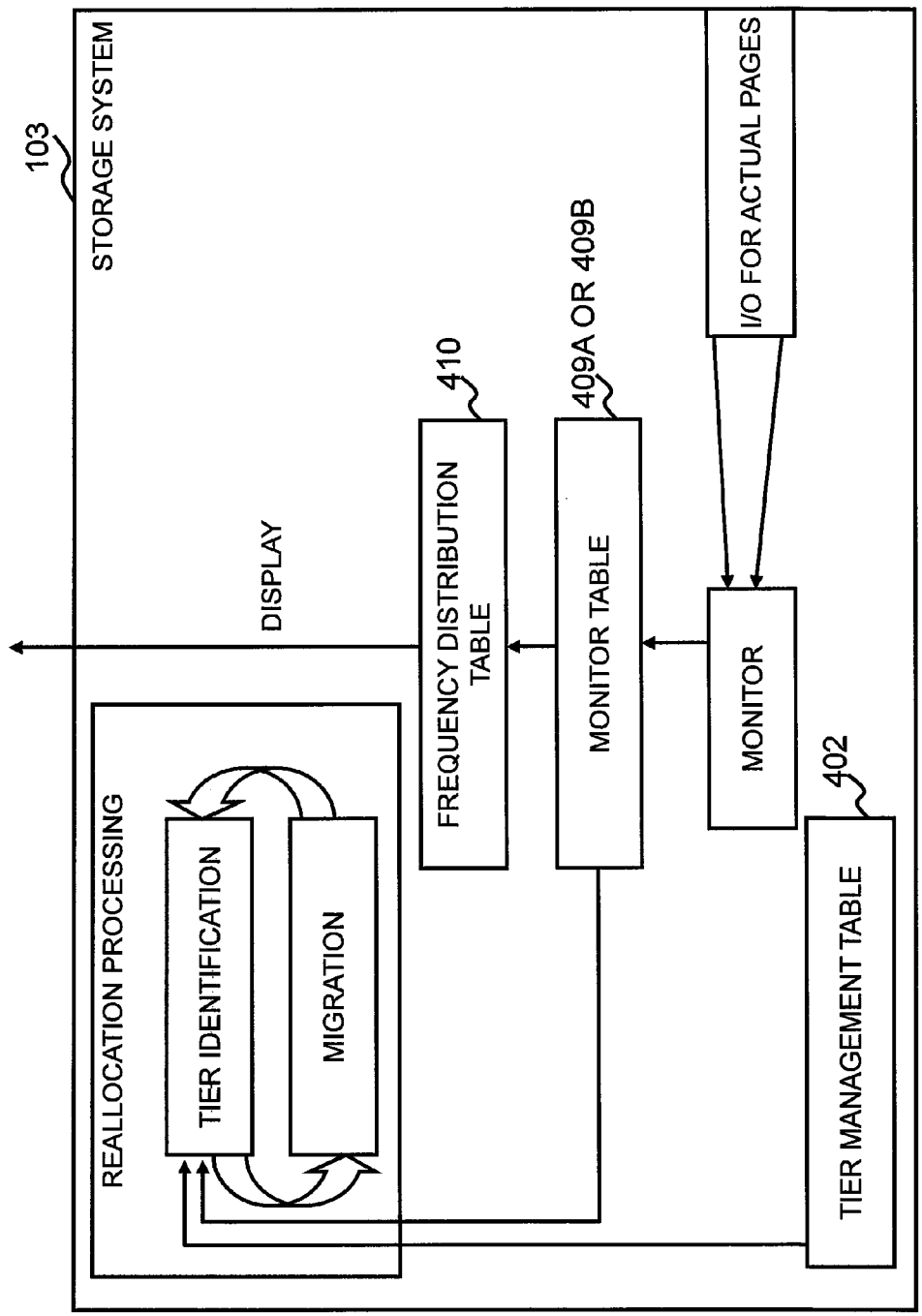
FIG. 27 shows the overview of the relationship between the I/O frequency monitor and reallocation.

FIG. 27 shows the relation between the I/O frequency monitor and reallocation.

If I/O for an actual page is monitored and if I/O for the actual page is performed, the I/O frequency of the virtual page to which the actual page is allocated or the VVOL comprising the virtual page is updated. That is, the monitor table 409A or 409B is updated. In other words, as mentioned above, if the I/O control program 414 receives a read command from the host 101 but if no data elements are read from the actual page, the monitor table 409 is not updated.

In accordance with the updates of the monitor table 409A or 409B, the frequency distribution table 410 is updated. Note that the frequency distribution table 410 does not have to be prepared in advance and, for example, if the command for the display of the frequency distribution is given from the administrator, the frequency distribution table 410 is created with reference to the monitor table 409B, and the frequency distribution may be displayed with reference to the table 410. Note that, instead of the frequency distribution, the monitor table 409A or 409B may be displayed.

The reallocation processing comprises the tier determination processing and the migration processing. In the tier determination processing, the migration page table 411 is created. The table 411 may be created with reference to the I/O frequency indicated by the monitor table 409A or 409B and the tier range in the tier management table 402 (FIG. 6). In the migration processing, with reference to the created migration page table 411, page-based data migration or VOL-based data migration is performed.

<Reallocation Processing>.

The reallocation processing may be performed if the usage rate of a certain tier exceeds the tier threshold of the tier or may also be permitted to be performed periodically (e.g. at each point of time indicated by the value of the "reallocation performance time").

Figure 28:
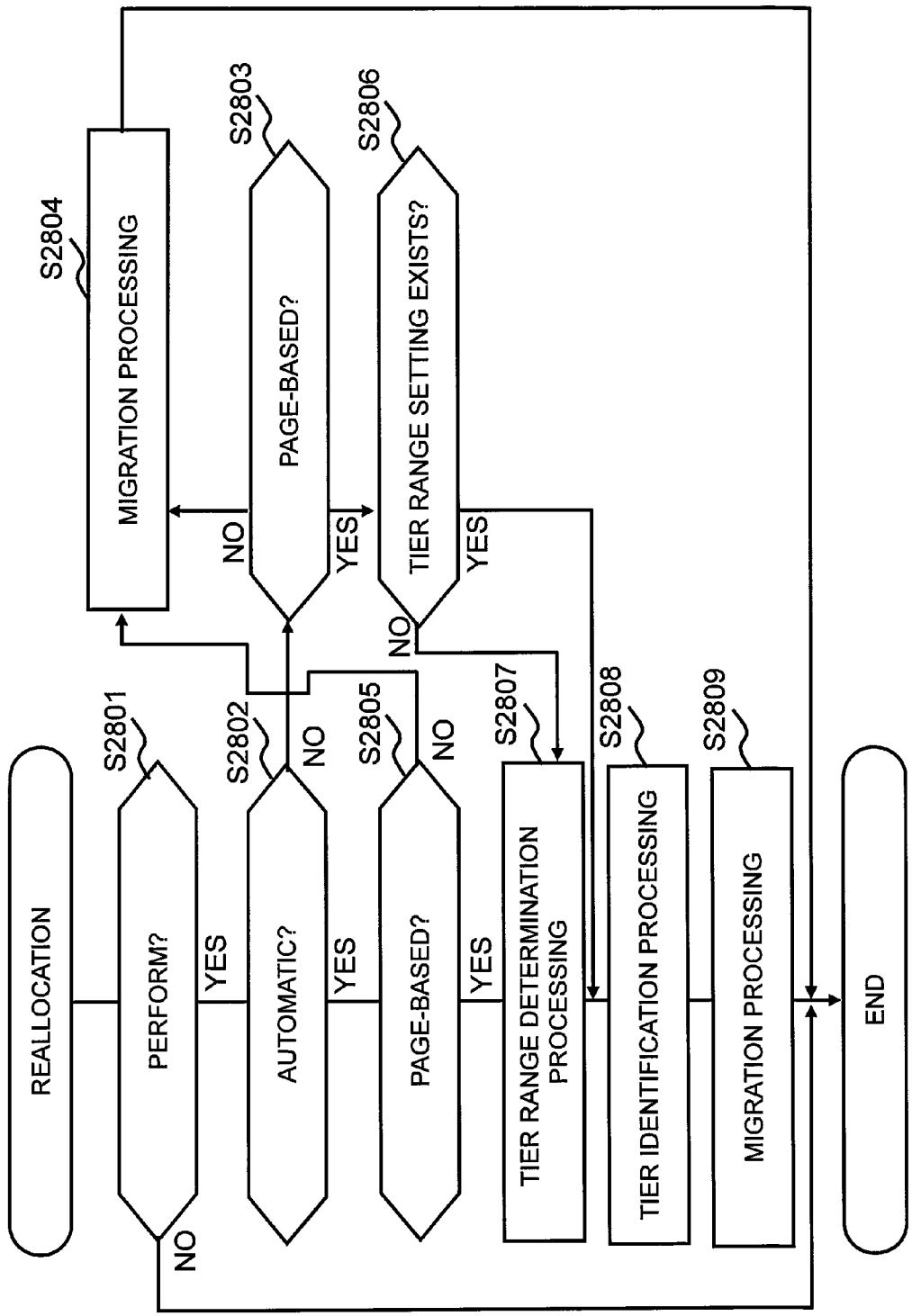
FIG. 28 shows the flow of the reallocation processing.

FIG. 28 shows the flow of the reallocation processing. Note that FIG. 28 shows the flow of one VVOL (hereinafter referred to as a "target VVOL" in the description of FIG. 28).

(S2801)

The reallocation program 415 determines whether to perform data migration for the target VVOL or not. As more specifically described, for example, the following processing is performed.

The reallocation program 415 determines, in the VVOL management table 404 (FIG. 8), whether "automatic performance" corresponding with the target VVOL is "ON" or not. If the setting of the value of "automatic performance" corresponding with the target VVOL does not exist, the program 415 determines, in the pool management table 403 (FIG. 7), whether "automatic performance" corresponding with the pool allocated to the target VVOL (hereinafter referred to as a "target pool" in the description of FIG. 28) is "ON" or not.

If "automatic performance" corresponding with the target VVOL or the target pool is "ON," the program 415, in the migration definition table 412 (FIG. 15), determines whether either "page-based migration" or "VOL-based migration" corresponding with the target VVOL is "ON" or not. If the result of this determination is negative, the result of the determination at S2801 is negative. If the result of this determination is affirmative, the program 415 determines whether the current time reaches the time indicated by the value of "reallocation performance time" corresponding with the target VVOL or the target pool or not. If the result of this determination is affirmative, the result of the determination at S2801 is affirmative while, if the result of this determination is negative, the result of the determination at S2801 is negative.

If "automatic performance" corresponding with the target VVOL or the target pool is "OFF," the program 415, if receiving an instruction for data migration for the target VVOL via the management apparatus 105 from the administrator, the result of the determination at S2801 is affirmative.

The program 415, if "automatic performance" corresponding with the target VVOL or the target pool is "OFF" (S2802: NO) and, at the same time, if receiving an instruction for VOL-based data migration for the target VVOL (S2803: NO), performs S2804.

The program 415, if "automatic performance" corresponding with the target VVOL or the target pool is "OFF" (S2802: NO) and, at the same time, if receiving an instruction for page-based data migration for the target VVOL (S2803: YES), performs S2806.

The program 415, if "automatic performance" corresponding with the target VVOL or the target pool is "ON" (S2802: YES), if "VOL-based migration" corresponding with the target VVOL is "ON" (S2805: NO) and, at the same time, if the I/O frequency corresponding with the target VVOL (e.g. the total number of I/Os, the average number of I/Os, and the maximum number of I/Os indicated by the monitor table 409A corresponding with the target VVOL) satisfies a specific condition, performs S2804. Note that, at this point, as the monitor table 409A which has been active so far is referred to, another monitor table 409A (standby table 409A) is set active, and the monitor table 409A which is set active is used when monitoring the I/O frequency of the target VVOL.

The program 415, if "automatic performance" corresponding with the target VVOL or the target pool is "ON" (S2802: YES) and, at the same time, if "page-based migration" corresponding with the target VVOL is "ON" (S2805: YES), performs S2807.

(S2804)

The program 415 performs the VOL-based migration processing for the target VVOL. In VOL-based data migration, the data elements in the actual page allocated to the target VVOL among the multiple data elements which the target pool comprises are migrated to another pool. The VOL-based migration processing is described in details later.

(S2806)

The program 415 determines whether the tier range is set by the administrator or not. If the result of this determination is negative, S2807 is performed and then S2808 is performed while, if the result of this determination is negative, S2807 is skipped and S2808 is performed.

(S2807)

The program 415 performs the tier range determination processing. By this processing, the tier range is determined. Multiple methods of determining the tier range can be considered. For example, multiple types of tier ranges may be prepared in advance, and the program 415 may select an arbitrary tier range for each tier from those multiple types of tier ranges.

(S2808)

The program 415 performs the tier determination processing. In the tier determination processing, as mentioned above, the migration page table 411 is created.

(S2809)

The program 415, in accordance with the created migration page table 411, performs the page-based migration processing. In page-based migration, in the target pool, the data elements are migrated from the actual page in a certain tier to the actual page in another tier. The page-based migration processing is described in details later.

In case VOL-based data migration is started in response to a manual instruction, for example, the UI control program 413, at a point of time before S2801, accepts an instruction for VOL-based data migration from the management.

<<The VOL-Based Migration Processing>>.

Figure 29:
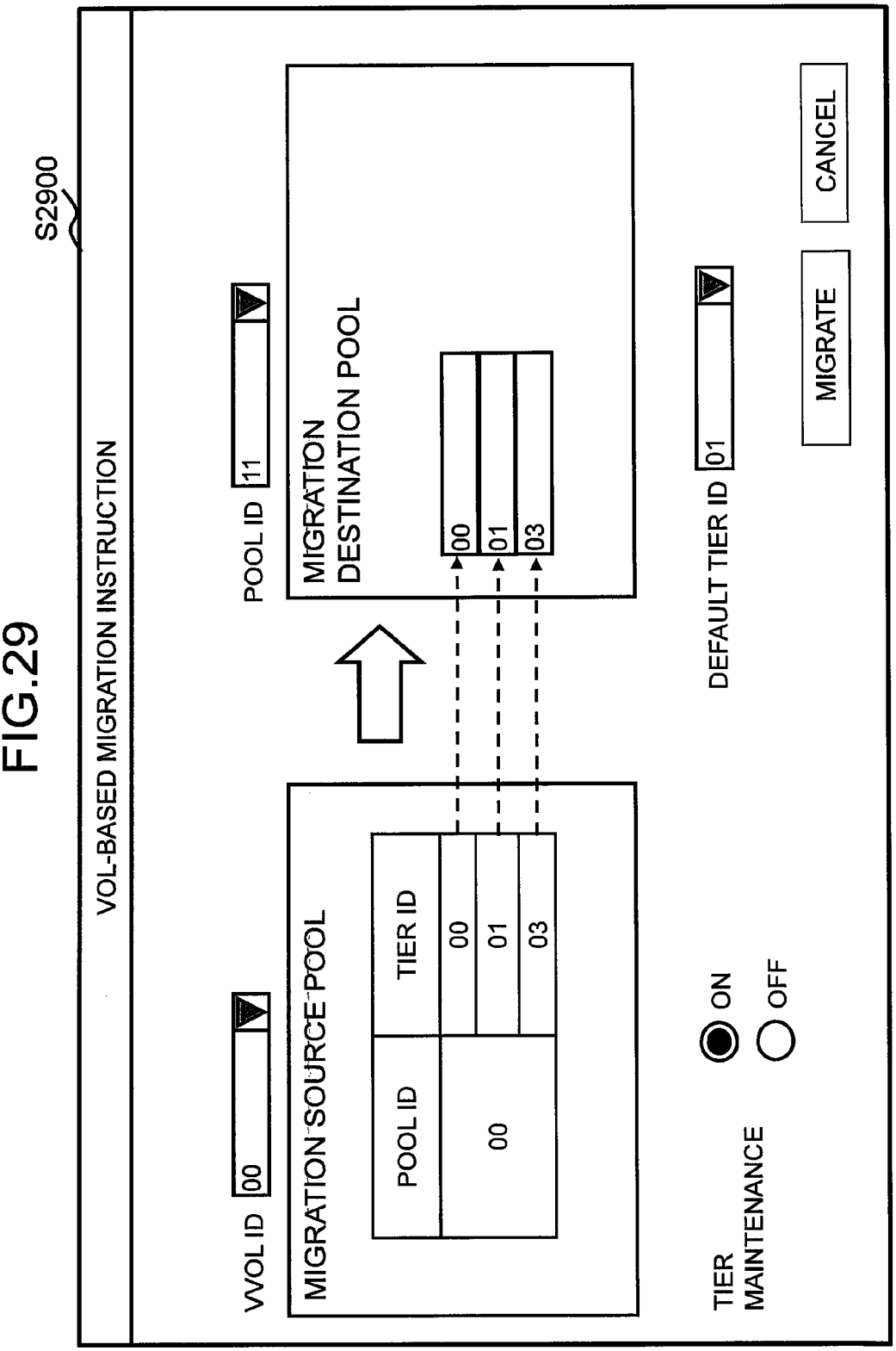
FIG. 29 shows a VOL-based migration instruction GUI 2900.

FIG. 29 shows a VOL-based migration instruction GUI 2900. The description below refers to a VVOL as the target of the migration processing as a "target VVOL," a pool allocated to the target VVOL as a "migration source pool," an actual page storing the data elements as the migration target as a "migration source actual page," a tier comprising the migration source actual page as a "migration source tier," a pool as the migration destination of the data elements as the migration target as a "migration destination pool," a tier as the migration destination of the data elements as the migration target as a "migration destination tier," and an actual page as the migration destination of the data elements as the migration target as a "migration destination actual page."

This GUI 2900 is displayed on the management apparatus 107 by the program 413. The GUI 2900, for example, comprises the VVOL ID, the migration destination pool ID, and an input tool for the administrator to input whether to set tier maintenance ON or not. On the GUI 2900, the VVOL ID and the migration destination pool ID selected by the administrator are displayed.

The program 413, for example, when "OFF" is selected on tier maintenance, as the migration destination pool ID, may display other pool IDs than the migration source pool as selectable. However, for example, when "ON" is selected on tier maintenance, the program 413, as the migration destination pool ID, displays only the ID of the pool comprising the same multiple tiers as the multiple tiers which the migration source pool comprises (i.e. the pool comprising the same hierarchical structure as the hierarchical structure of the target pool) as selectable. This is because no other pool than the above-mentioned type can perform the tier-maintained migration processing described with reference to FIG. 30 and FIG. 31.

Furthermore, the program 413 displays the default tier ID corresponding with the displayed migration destination pool ID. The program 413, for example, may also be permitted to display a list of the allocated tier IDs corresponding with the displayed pool IDs and set the ID desired by the administrator in the list as the new default tier ID.

If the "migration" button on the GUI 2900 is pressed, in accordance with the setting input through the GUI 2900, the VOL-based migration processing is performed.

The types of VOL-based migration processing are the tier-maintained migration processing and the non-tier-maintained migration processing. Which of the tier-maintained migration processing and the non-tier-maintained migration processing to perform can be specified, if manually performed, for example, through the GUI 2900 and, if automatically performed, determined in accordance with the setting of the table 412 (FIG. 15) (whether "tier maintenance" is "ON" or "OFF").

Figure 30:
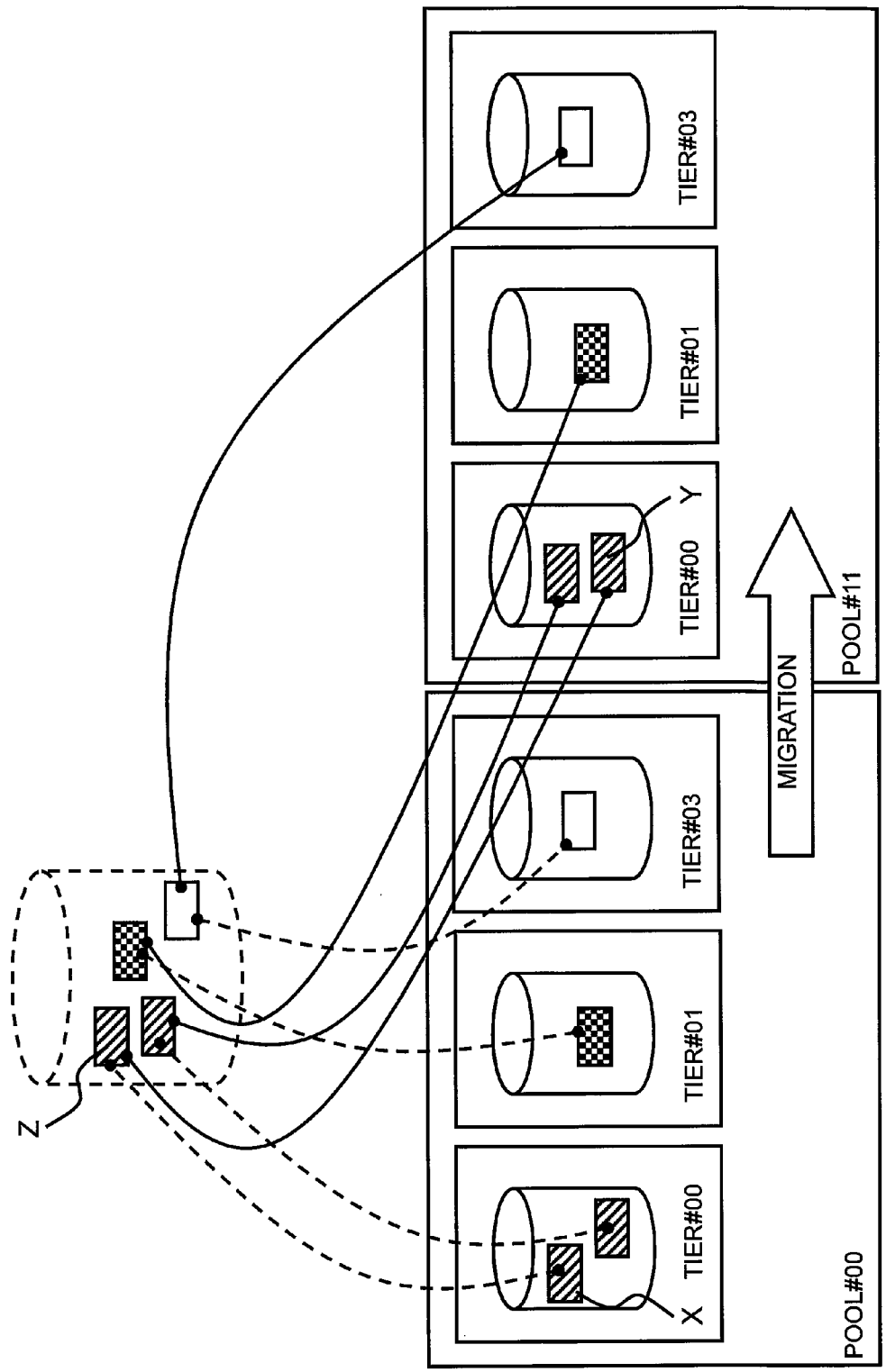
FIG. 30 shows the overview of the tier-maintained migration processing.

FIG. 30 shows the overview of the tier-maintained migration processing.

In the tier-maintained migration processing, the data elements in the migration source actual page are migrated to the actual page in the tier of the same ID as the ID of the migration source tier (tier type). As more specifically described, for example, the data elements stored in an actual page #X in a tier #00 which a pool #00 comprises are migrated to an actual page #Y in the tier #00 which a pool #11 comprises. After the migration, to the virtual page #Z as the allocation destination of the actual page #X, an actual page #Y instead of the actual page #X is allocated.

Figure 31:
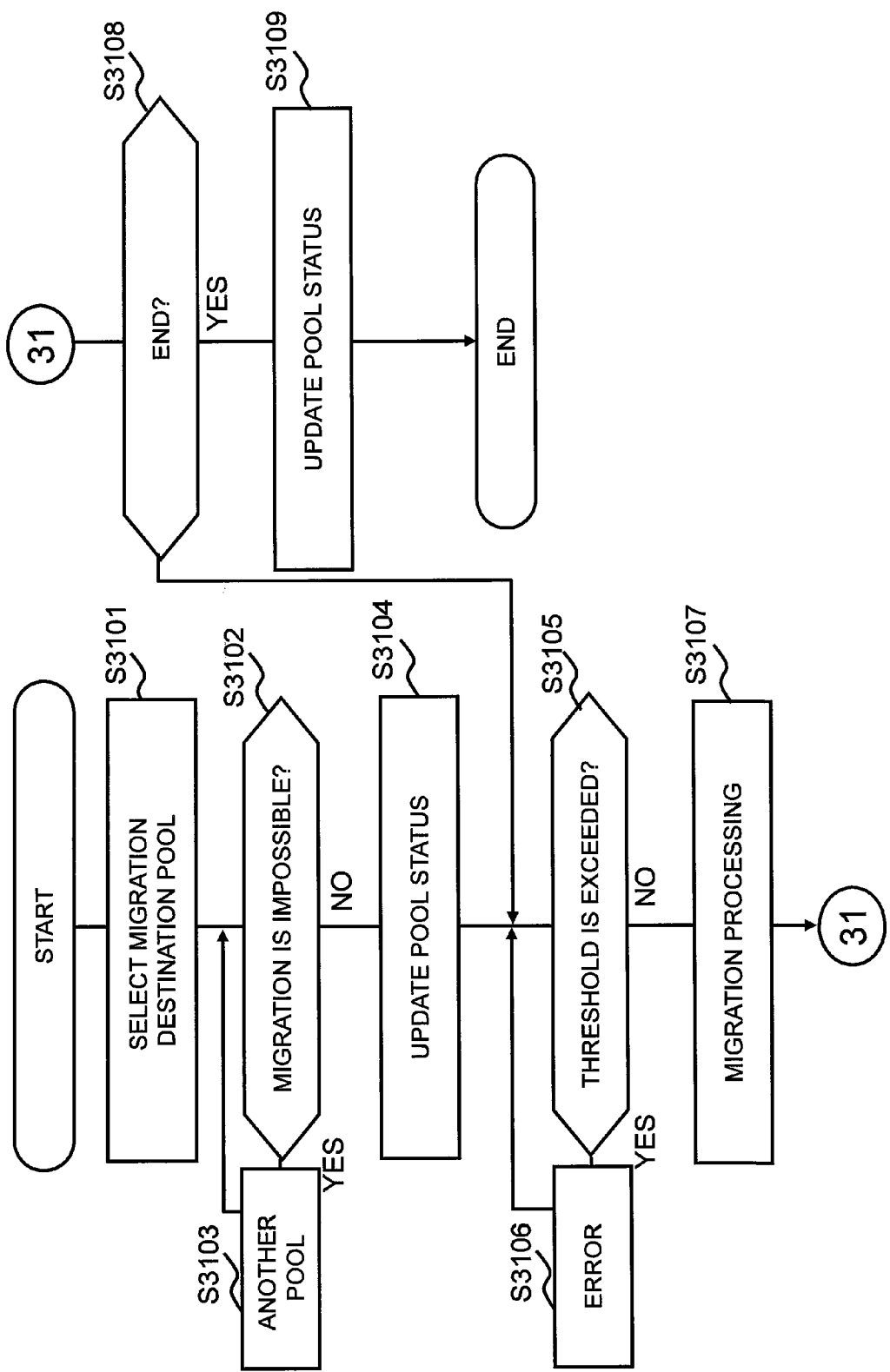
FIG. 31 shows the flow of the tier-maintained migration processing.

FIG. 31 shows the flow of the tier-maintained migration processing.

(S3101)

The reallocation program 415, with reference to the tier management table 402 (refer to FIG. 6), selects a migration destination pool from multiple pools. The migration destination pool is the pool comprising the same multiple tiers as the multiple tiers which the target pool comprises (i.e. the pool comprising the same hierarchical structure as the hierarchical structure of the target pool).

Note that this S3101 does not have to be performed if, for example, the migration destination pool is already selected manually.

(S3102)

The program 415 determines whether migration is impossible or not. As more specifically described, the program 415 determines whether the "pool status" corresponding with the migration destination pool in the pool management table 403 (FIG. 7) is "reallocating" or not. If the result of this determination is affirmative, S3103 is performed while, if the result of this determination is negative, S3104 is performed.

(S3103)

Another pool is selected as the migration destination pool. For example, in case of automatic performance, the program 415 may select another pool comprising the same multiple tiers as the multiple tiers which the migration source pool comprises. Meanwhile, for example, in case of manual performance, the UI control program 413 may display an error message in GUI 2900 of FIG. 29 and accept the specification of the migration destination pool ID from the administrator. After that, S3102 is performed for the selected migration destination pool.

(S3104)

The program 415 updates the value of the "pool status" both in the migration source pool and in the migration destination pool to "reallocating." Furthermore, at this point, the program 415 may update the table 404 (FIG. 8) for the migration destination pool to be allocated to the target pool instead of the migration source pool. After performing this, the I/O control program 414 may receive the write command specifying the target VVOL and, if the data elements as the write target complying with the write command are destaged, the data elements may be written to the actual data in the migration destination pool.

(S3105)

The program 415 selects a tier from one or more allocated tiers of the target VVOL. The tier selected at this point is one migration source tier. The program 415, assuming that all the data elements as the migration target in the migration source tier are migrated to the migration destination tier (which is the tier of the same ID as the selected migration source tier and the tier in the migration destination pool), determines whether the usage rate of the migration destination tier exceeds the tier threshold of the migration destination tier or not. The program 415 makes this determination with reference to the tables 402 (FIG. 6) and 408 (FIG. 8). If the result of this determination is affirmative, S3106 is performed while, if the result of this determination is negative, S3107 is performed.

(S3106)

The error processing is performed. For example, the program 415 may display an error on the management apparatus 107 and terminate. Otherwise, for example, the program 415, by performing the processing shown in FIG. 38, increase free actual pages in the migration destination tier.

(S3107)

The program 415 performs the migration processing. As more specifically described, for example, the processing is as follows.

The program 415 creates the migration page table 411 for this migration processing. As more specifically described, for example, the program 415, with reference to the tables 402 (FIG. 6) and 407 (FIG. 10), registers the ID of the virtual page to which the actual page in the migration source tier is allocated among the multiple virtual pages configuring the target VVOL. Furthermore, the program 415, for each registered virtual page ID, registers the ID of the migration source tier and the ID of the migration destination tier and, at the same time, sets "not completed" as the "migration status."

The program 415, for each virtual page ID registered in the migration page table 411, performs the processing below. When the processing below for all the virtual page IDs registered in the migration page table 411 is completed, S3107 is completed. The processing is described below with reference to one virtual page (referred to as a "target virtual page" in the description of S3107) as an example.

The program 415 updates the value of the "migration status" corresponding with the target virtual page to "in process."

The program 415 selects a free actual page from the migration destination tier.

The program 415 migrates the data elements stored in the migration source actual page in the migration source tier to the selected actual page (migration destination actual page). The migration source actual page is the actual page allocated to the target virtual page.

The program 415 updates the allocation table 407 for allocating the migration destination actual page to the target virtual page instead of the migration source actual page. That is, the program 415 makes the target virtual page correspond with the migration destination actual page ID, the migration destination tier ID, and the migration destination pool ID.

The program 415 updates the I/O frequency of the target virtual page (e.g. the active table 409A or 409B). As more specifically described, for example, the total number of I/Os of the target virtual page or the target VVOL is incremented by 1.

The program 415 updates the value of the "usage rate" of the migration destination tier in the table 402 (FIG. 6).

The program 415 updates the value of the "migration status" corresponding with the target virtual page to "completed."

(S3108)

The program 415, for all the migration source tiers in the migration source pool (all the allocated tiers of the target VVOL), determines whether the processing S3105 and later was performed or not. If the result of this determination is negative, for the migration source tiers for which S3105 was not performed, S3105 is performed. If the result of this determination is affirmative, S3109 is performed.

(S3109)

The program 415 updates the value of the "pool status" of both the migration source pool and the migration destination pool to a different value from "reallocating," for example, "monitoring" or "not monitoring."

Figure 32:
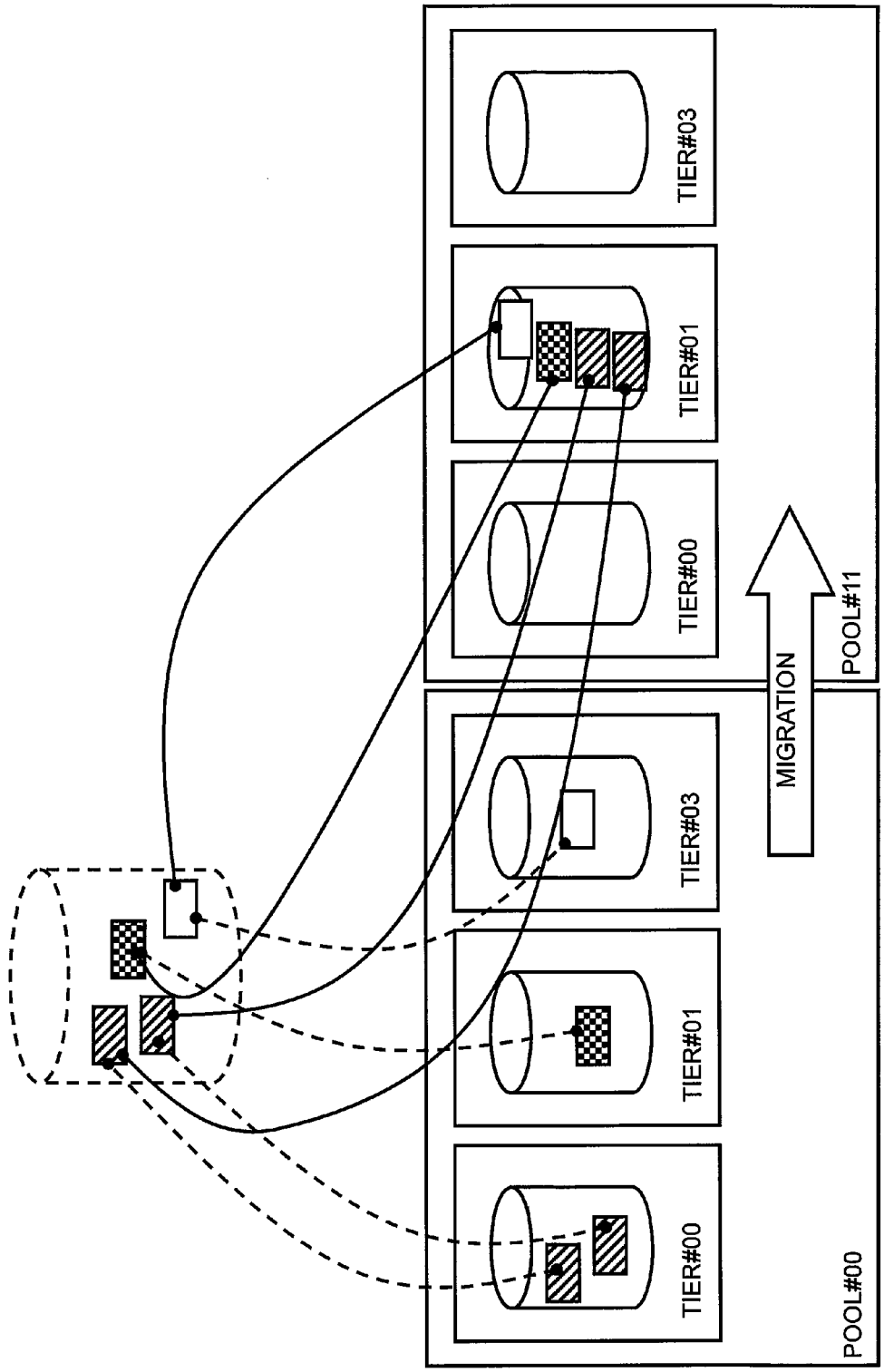
FIG. 32 shows the overview of the non-tier-maintained migration processing.

FIG. 32 shows the overview of the non-tier-maintained migration processing.

In the non-tier-maintained migration processing, all the data elements as the migration target in the migration source pool are migrated to the default tier in the migration destination pool. As more specifically described, for example, all the data elements as the migration target in a pool #00 are migrated to a default tier #01 in a pool #11.

Figure 33:
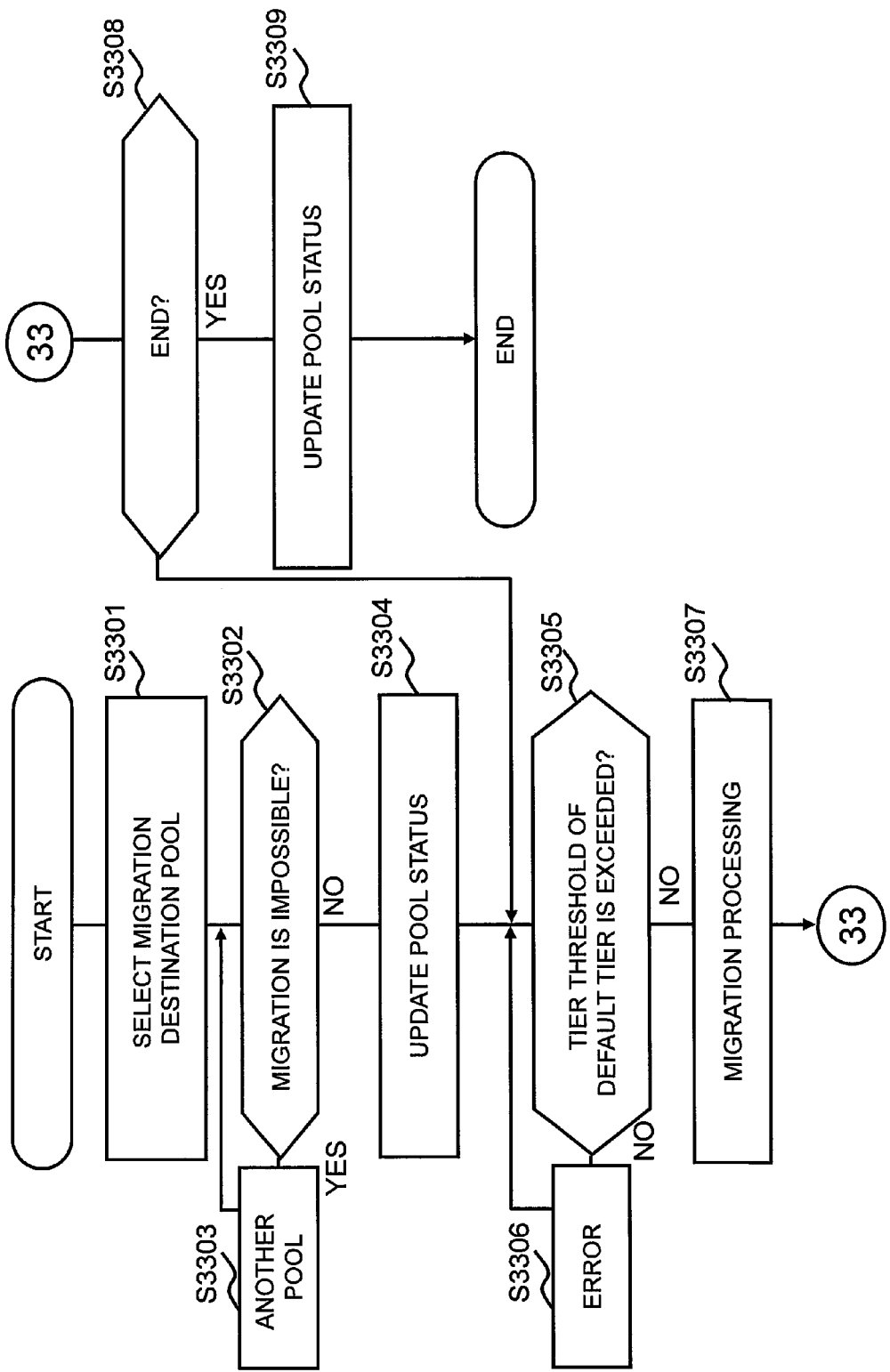
FIG. 33 shows the flow of the non-tier-maintained migration processing.

FIG. 33 shows the flow of the non-tier-maintained migration processing.

The same processing as S3101 to S3109 in FIG. 31 is performed (S3301 to S3309). The processing at S3305 is slightly different from the processing at S3105. As more specifically described, at S3105, the migration destination tier is different if the migration source tier is different while, at S3305, even if the migration source tier is different, the migration destination tier is always the default tier in the migration destination pool.

Note that, in the non-tier-maintained migration processing, for example, the processing below may also be permitted to be performed. In this case, by the performance of the relevant migration processing, the data elements in the VVOL are expected to be allocated in the appropriate manner for the I/O frequency of the VVOL.

The program 415, with reference to in what tiers, what rate of all the actual pages allocated to the VVOL exist, ascertains the threshold range of the I/O frequency. For example, the program 415, with reference to the tier range of all the allocated tiers of the VVOL and the number of actual pages allocated to the VVOL which each allocated tier comprises, ascertains the threshold range of the I/O frequency.

The program 415 compares the ascertained threshold range with the I/O frequency of the VVOL.

The program 415, if the I/O frequency of the VVOL does not fall within the ascertained threshold range, for acquiring the threshold range within which the I/O frequency of the VVOL falls, migrates all the data elements in the VVOL from the pool allocated to the VVOL (migration source pool) to the migration destination pool. That is, the program 415, for each actual page allocated to the VVOL, determines the migration destination tier in the migration destination pool, and migrates the data elements to the determined actual page in the migration destination tier. As a result, the threshold range becomes the threshold range after the migration (the threshold range which can be ascertained with reference to the tier range of one or more tiers comprising all the migration destination actual pages allocated to the VVOL and the number of migration destination actual pages allocated to the VVOL in the one or more tiers) respectively within which the I/O frequency of the VVOL falls.

<<The Page-Based Migration Processing>>.

Figure 34:
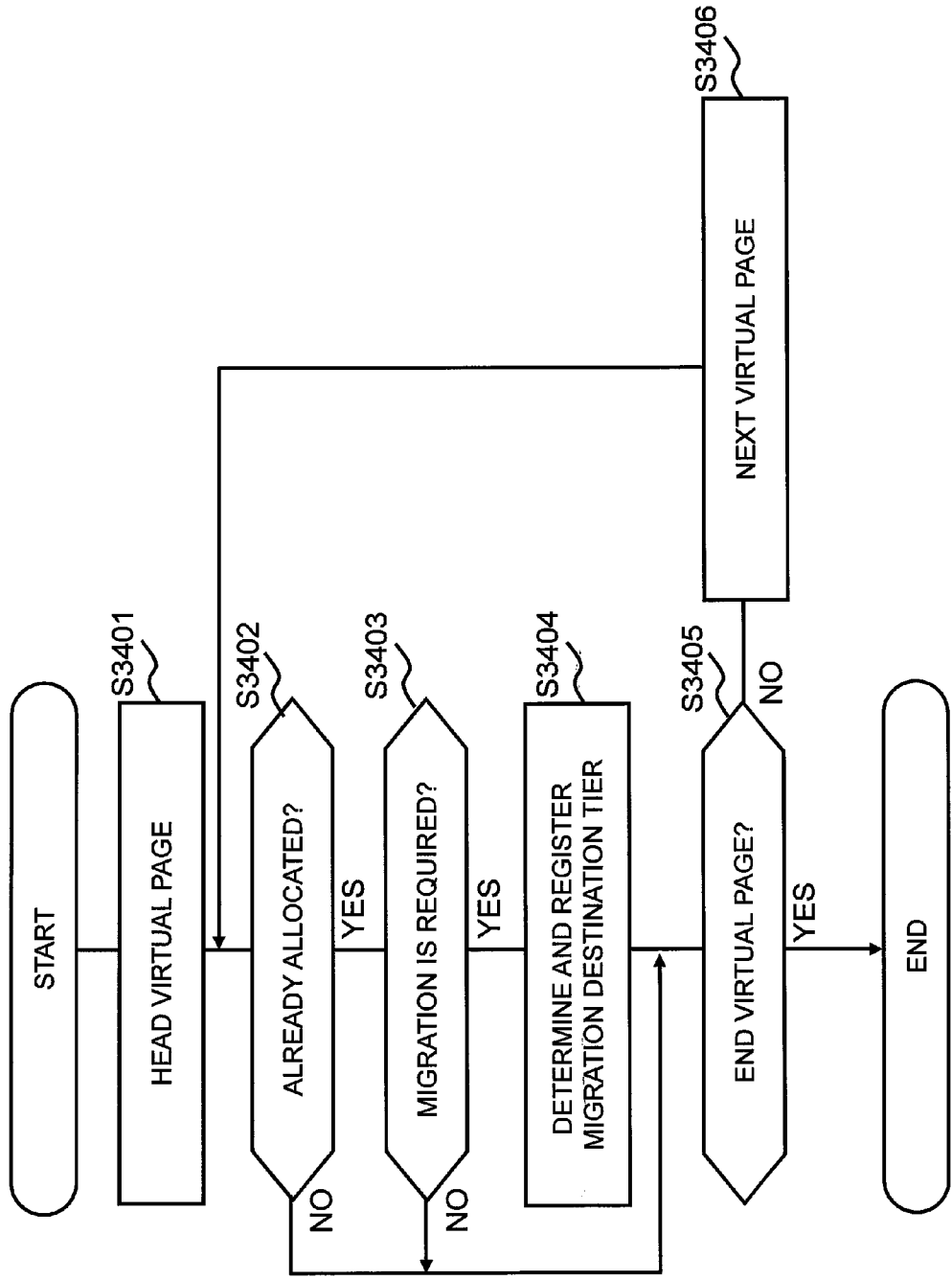
FIG. 34 shows the flow of the migration page table creation processing at S2808 in FIG. 28.

FIG. 34 shows the flow of the migration page table creation processing at S2808 in FIG. 28. (S3401)

The program 415 selects the head virtual page of the target VVOL.

(S3402)

The program 415, with reference to the allocation table 407, determines whether an actual page is allocated to the selected virtual page or not. If the result of this determination is negative, S3405 is performed while, if the result of this determination is affirmative, S3403 is performed.

(S3403)

The program 415, with reference to the type 2 monitor table 409B, determines whether the tier where the data elements in the actual page allocated to the selected virtual page should exist should be changed or not. As more specifically described, for example, the processing below is performed.

The program 415 identifies the tier comprising the actual page allocated to the selected virtual page (referred to as a "target tier" in the description of S3403) from the table 402 (FIG. 6).

The program 415, with reference to the I/O frequency of the selected virtual page (e.g. at least one of the total number of I/Os, the average number of I/Os, and the maximum number of I/Os indicated by the active monitor table 409B corresponding with the target VVOL) and the value of the "tier range" corresponding with the target tier, determines whether the data elements in the actual page allocated to the selected virtual page should be migrated from the target tier to another tier or not. For example, if the I/O frequency of the selected virtual page does not fall within the tier range corresponding with the target tier of the selected virtual page, it is determined that the data elements should be migrated.

If the result of this determination at S3403 is negative, S3405 is performed while, if the result of this determination is affirmative, S3404 is performed.

(S3404)

The program 415, with reference to the I/O frequency of the selected virtual page (e.g. at least one of the total number of I/Os, the average number of I/Os, and the maximum number of I/Os indicated by the active monitor table 409B corresponding with the target VVOL) and the value of the "tier range" corresponding with the other allocated tiers in the pool comprising the target tier, determines the migration destination tier. At this point, for example, the allocated tier corresponding with the tier range the I/O frequency of the selected virtual page falls within (allocated tier of the target VVOL) is determined to be the migration destination tier. Then, the program 415, to the migration destination page table 411, registers the ID of the selected virtual page, the ID of the target tier, the ID of the determined migration destination tier, and "not completed" as the migration status.

(S3405)

The program 415 determines whether the selected virtual page is the virtual page at the end of the target VVOL or not. If the result of this determination is negative, S3406 is performed while, if the result of this determination is affirmative, this migration page table creation processing is completed.
(S3406)
The program 415, from the target VVOL, selects the next virtual page after the virtual page selected at the last time. Then, for the selected virtual page, the processing S3402 and later is performed.

By this migration page table creation processing, the migration page table 411 for the page-based migration processing is created.

Figure 35:
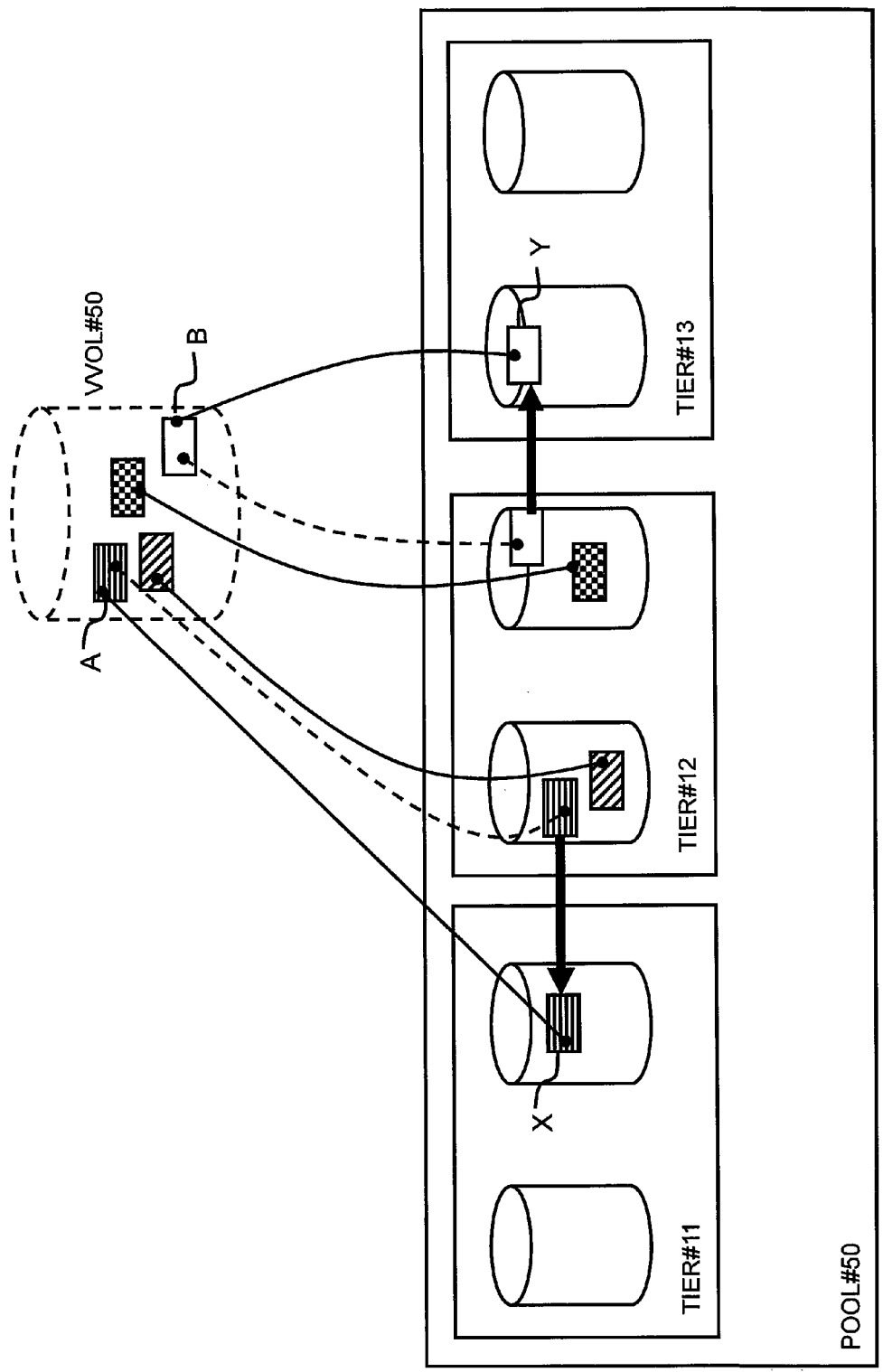
FIG. 35 shows the overview of the page-based migration processing.

FIG. 35 shows the overview of the page-based migration processing.

According to the page-based migration processing, for each virtual page registered to the table 411, the data elements in the actual page allocated to the virtual page are migrated to the free actual page in the migration destination tier corresponding with the virtual page. To the virtual page, instead of the migration source actual page, the migration destination actual page is allocated. As shown in FIG. 35, by this migration processing, some data elements are migrated to higher tiers and some tiers are migrated to lower tiers.

Depending on what type of tier range is set for what tier, the data elements in the virtual page appropriate for the I/O frequency of the virtual page can be allocated.

For example, let us assume that higher tier ranges are set for higher tiers and lower tier ranges are set for lower tiers. As more specifically described, for example, let us assume that a tier #11 is a high-speed and highly-reliable tier (e.g. a tier whose RVOL type is "SSD") and that a high tier range is set. Furthermore, for example, let us assume that a tier #13 is a low-speed, low-trust tier (e.g. a tier whose RVOL type is "HDD-SATA") and that a low tier range is set.

Furthermore, for example, let us assume that a tier #12 is the default tier of the VVOL #50 and that a medium tier range is set. In this case, the data elements as the write target for the virtual page configuring the VVOL #50 are written to the actual page in the default tier #12 once. Then, for example, if the I/O frequency of a virtual page #A in the VVOL #50 becomes high enough to fall within the high tier range, the data elements in the actual page #X allocated to the virtual page #A are migrated from the tier #12 to the tier #11. On the other hand, for example, if the I/O frequency of a virtual page #B in the VVOL #50 becomes low enough to fall within the low tier range, the data elements in the actual page #Y allocated to the virtual page #B are migrated from the tier #12 to the tier #13.

As mentioned above, with reference to what type of tier range is set for what tier, the result of monitoring the I/O frequency of each virtual page, and page-based data migration, the data elements in the VVOL can be allocated in appropriate tiers (physical storage resources).

Figure 36:
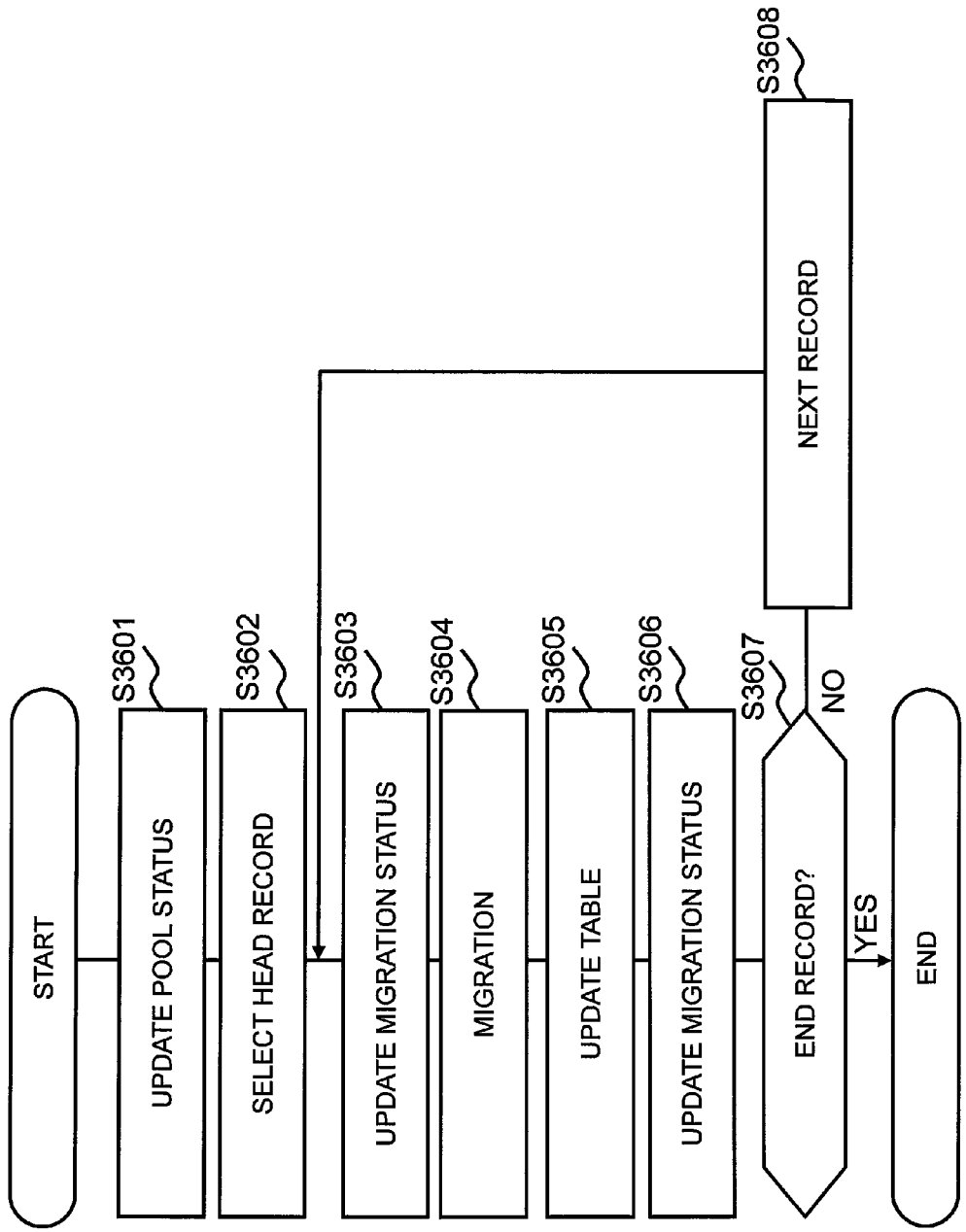
FIG. 36 shows the flow of the page-based migration processing.

FIG. 36 shows the flow of the page-based migration processing.
(S3601)
The reallocation program 415 updates the "pool status" of the pool allocated to the target VVOL to "reallocating."
(S3602)
The program 415 selects the head record of the created migration page table 411.
(S3603)
The program 415 updates the value of the "migration status" in the selected record to "in process."
(S3604)
The program 415 selects a free actual page from the migration destination tier indicated by the selected record and, to the selected actual page (migration destination actual page), migrates the data elements stored in the migration source actual page in the migration source tier. The migration source actual page is an actual page allocated to the target virtual page.
(S3605)
The program 415 updates the table. As more specifically described, for example, the processing below is performed.
  The program 415 updates the allocation table 407 for allocating the migration destination actual page instead of the migration source actual page to the virtual page indicated by the selected record (hereinafter referred to as the "selected virtual page" in the description of S3605). That is, the program 415 makes the selected virtual page correspond with the ID of the migration destination actual page and the ID of the migration destination tier.
  The program 415 updates the I/O frequency of the selected virtual page (e.g. the active table 409A or 409B). As more specifically described, for example, the total number of I/Os of the selected virtual page or the target VVOL is incremented by 1.
  The program 415 updates the value of the "usage rate" of the migration destination tier in the table 402 (FIG. 6).
(S3606)
The program 415 updates the value of the "migration status" in the selected record to "completed."
(S3607)
The program 415 determines whether the selected record is the record at the end of the virtual page table 411 or not. If the result of this determination is negative, S3608 is performed while, if the result of this determination is affirmative, this migration processing is completed.
(S3608)
The program 415, from the virtual page table 411, selects the next record after the record selected at the last time. Then, for the selected record, the processing S3603 and later is performed.

The flow of the page-based migration processing is as described above. Note that, as a variation of the page-based migration processing, for example, at least one of the multiple variations described below can be considered.
  Between S3602 and S3603, the program 415, assuming that the data elements are migrated to the migration destination tier, may determine whether the usage rate of the migration destination tier exceeds the tier threshold of the migration destination tier or not. If the rate is determined to exceed the threshold, the program 415 may skip the processing from S3603 to S3606 and perform S3607 (i.e. the program 415 does not have to migrate the data elements for the selected record). In other cases, if the rate is determined to exceed the threshold, the program 415 may also be permitted to increase free actual pages in the migration destination tier by performing the reallocation processing for the VVOL whose allocated tier is the migration destination tier, and then start S3603.
  If the usage rate of the migration destination tier is updated at S3605, the program 415 may determine whether the usage rate of the migration destination tier exceeds the tier threshold of the migration destination tier or not. If the rate is determined to exceed the threshold, the program 415 may display a caution on the management apparatus 107 and/or increase free actual pages in the migration destination tier by performing the reallocation processing for the VVOL whose allocated tier is the migration destination tier.

<Changing the Tier Threshold>.

The UI control program 413 can receive a change of the tier threshold from the administrator.

FIG. 37 shows the flow of the tier threshold changing processing.

(S3701)

The program 413 accepts the pool ID, the tier ID, and the tier threshold of the tier ID after the change.

(S3702)

The program 413 determines whether the value of the "usage rate" corresponding with the pool ID and the tier ID accepted at S3701 exceeds the tier threshold after the change or not.

(S3703)

The program 413, if the result of the determination at S3702 is affirmative, displays an error on the management apparatus 107.

<Monitoring the Usage Rate>.

As mentioned above, the I/O control program 414 or the reallocation program 415, if data elements are written to an actual page, updates the value of the "usage rate" of the tier comprising the actual page in the table 402 (FIG. 6). Then, the program 414 or 415 may determine whether the updated value of the "usage rate" exceeds the value of the "tier threshold" corresponding with the tier or not. If the result of this determination is affirmative, the program 414 or 415 may perform the threshold excess handling processing shown in FIG. 38.

FIG. 38 shows the flow of the threshold excess handling processing.

The program 414 or 415 determines whether the "pool status" of the pool comprising the tier whose usage rate exceeds the tier threshold is "reallocating" or not (S3801).

If the result of the determination at S3801 is affirmative, the program 414 or 415 gives a caution to the management apparatus 107 or the host 101 (S3802). The caution, for example, may include the ID of the tier whose usage rate exceeds the tier threshold, the ID of the pool comprising the tier, and the value of the "pool status" of the pool ("reallocating").

If the result of the determination at S3801 is negative, the program 414 or 415 gives a caution to the management apparatus 107 or the host 101 (S3803), and performs the reallocation processing (FIG. 28) for making the usage rate of the tier equal to or lower than the threshold of the tier (S3804). Note that the caution at S3803 may include a message indicating the ID of the tier whose usage rate exceeds the tier threshold, the ID of the pool comprising the tier, and the performance of reallocation processing for the pool.

<Data Element Aggregation>.

In this embodiment, the data element aggregation processing may be performed.

FIG. 39 shows the overview of the data element aggregation processing.

The I/O control program 414 or the reallocation program 415, for a VVOL #39, periodically or when data elements are written to an actual page (e.g. when completing the VOL-based or page-based migration processing), checks the allocation of the data elements in the VVOL #39. As more specifically described, for example, the program 414 or 415 ascertains what rate of data elements among all data elements exist (i.e. storage rate) in each of the allocated tiers #00, #01, and #03 in the VVOL #39. The program 414 or 415 determines whether allocated tiers whose storage rate exceeds the storage threshold exist in each of the allocated tiers #00, #01, and #03 in the VVOL #39 or not.

The program 414 or 415, if allocated tiers whose storage rate exceeds the storage threshold exist, migrates the data elements in the other allocated tiers #01 and #03 than the relevant allocated tier #00 to the allocated tier #00 (specifically, for example, free actual pages in the allocated tier #00).

Note that, after this processing, for example, the program 414, if a write occurs to an virtual page in the VVOL #39 (especially, a virtual page to which no actual page is allocated), may always allocate an actual page from the allocated tier #00 to the virtual page.

Note that, if the migration of the data elements in the allocated tiers #01 and #03 (data elements in the VVOL #39) to the allocated tier #00 causes the usage rate of the allocated tier #00 to exceed the tier threshold of the allocated tier #00, the program 414 or 415 may perform the processing (x) or (y) described below.

(x) The program 414 does not migrate the data elements in the allocated tiers #01 and #03 to the allocated tier #00.

(y) The program 414, by migrating the data elements which are the data elements in the other VVOLs than the target VVOL and are in the allocated tier #00 to the other tiers, increases free actual pages in the allocated tier #00.

The description of the Embodiment 1 is as above.

Note that, in the Embodiment 1, for example, for a VVOL, the default tier may always be, among the allocated tiers of the VVOL, the tier with the highest I/O performance (e.g. the I/O speed or the response time) (e.g. the most significant tier of the allocated tiers). This is for the purpose of optimizing the I/O performance of the VVOL. In this case, the data elements written to the VVOL may be allocated to as high a tier as possible. However, the usage rate of the allocated tier is controlled for the prevention of exceeding the tier threshold of the allocated tier.

Furthermore, for example, commonly for an individual pool and for multiple pools, a save tier may be prepared. The program 414 or 415, for a save tier, to a save tier, normally, whether at a write in accordance with a write command from the host or in the migration processing in the reallocation processing, data elements are not written. However, the program 414 or 415, for example, if the usage rate of a tier as the write destination of the data elements (hereinafter referred to as a "target tier" in the description of this paragraph) exceeds the tier threshold of the tier, may also be permitted to migrate the data elements in an arbitrary actual page in the target tier (or data elements in an actual page in the target tier allocated to the virtual page whose I/O frequency does not fall within the tier range of the target tier) to the save tier, and by that method, increase free actual pages in the target tier. In this case, the program 414 or 415, to the virtual page allocated to the migration source actual page in the target tier, instead of the migration source actual page, may allocate the migration destination actual page in the save tier. After that, the program 414 or 415, to the tier where the tier range within which the I/O frequency of the virtual page allocated to the actual page in the save tier falls is set, may also be permitted to migrate the data elements stored in the actual page in the save tier. The save tier, for example, may be a tier configured of the same RVOL as the most significant tier.

Furthermore, the default tier does not have to be set. The data elements as the write target from the host 101 to the VVOL may be written to as high a tier as possible. If the usage rate of the high tier exceeds the tier threshold, the data elements may also be permitted to be written to the next lower tier from the high tier.

Furthermore, among the monitor tables 409B and 409A, the 409A does not necessarily have to exist. In this case, by summing the values of the I/O frequency of each virtual page which the monitor table 409B comprises, the I/O frequency of the VVOL may be ascertained.

Furthermore, the page-based migration processing or the VOL-based migration processing can be suspended. For example, the reallocation program 415, if receiving a suspend instruction from the administrator, after performing the processing until the migration status "in process" changes to "completed," can suspend the page-based migration processing or the VOL-based migration processing. The program 415, for example, a certain length of time after receiving a suspend instruction or if receiving an instruction for resumption, may also be permitted to resume the migration processing with reference to the migration page table 411. On the other hand, the program 415, if receiving a suspend instruction, may also be permitted to discard the migration page table 411 and, at the time of the next migration processing, create the migration page table 411 with reference to the active monitor tables 409A or 409B.

Furthermore, in the Embodiment 1, no matter which of "VOL-based migration" and "page-based migration" is "ON," both of the monitor tables 409A and 409B may also be permitted to be updated.

Furthermore, though this embodiment assumes that, to a Thin Provisioning VVOL 203, an actual page is allocated in accordance with a write request from the host 101 to an address of the virtual page, this invention is not limited to this case, but the examples described below are also preferable. This is because these examples can also achieve the reduction of the actually used capacity.

The first example is as follows. That is, to some virtual pages of the multiple virtual pages in the VVOL 203 or part of the area included in each virtual page in the VVOL 203, before receiving a write request from the host 101 to an address of the virtual page, an actual area is allocated in advance (pre-allocation), in accordance with the write request from the host 101 to an address of the virtual page, if the already allocated area is not large enough and further allocation is required, an additional actual area is allocated.

The second example is as follows. That is, multiple virtual pages in the VVOL 203 are tentatively allocated (tentative allocation), before receiving a write request from the host 101 to an address of the virtual page, to an actual area or a control area where zero data is stored (these areas correspond with the areas in the storage devices such as SSDs) in advance and, in accordance with the write request from the host 101 to an address of the virtual page, the allocation destination is changed from the tentative allocation area to the actual page where the data should be stored (actual allocation). In this case, if a read request is received from the host 101 to an address of the virtual page before performing the actual allocation, zero data stored in the actual area or the control area as the tentative allocation description is returned to the host 101.

Furthermore, though this embodiment manages multiple pools 201 in one table for managing the multiple pools 201 collectively, this invention is not limited to this, and it is also preferable, for managing actual pages 207 collectively in each pool 201, to set a separate management table in each pool 201 (other forms of information than a table form may also be permitted).

Furthermore, the types of tiers 303 are not limited to the classification by attributes stated in this embodiment, SSD, HDD-SAS, HDD-SATA and others, but it is also preferable to classify the tiers by attributes such as HDD comprising the FC interface, or storage devices other than the HDD type e.g. devices configured of semiconductor storage media such as flash memories. In this case, the virtual page attribute associated with each tier 303 and the attribute of each actual page included in each tier 303 are also not limited to the classification by attributes stated in this embodiment SSD, HDD-SAS, HDD-SATA and others, but are also classified by attributes such as HDD comprising the FC interface, or storage devices other than the HDD type e.g. devices configured of semiconductor storage media such as flash memories.

Furthermore, the types of tiers 303 are not limited to the classification by attributes of the above-mentioned storage device types, but it is also preferable to classify the tiers by the attribute of combining the above-mentioned storage device types and the RAID type from RAID1 to RAID5 and others or the attribute of combining the above-mentioned storage device types, the performance of the above-mentioned storage devices (such as the access speed), the storage capacity, and the RAID type from RAID1 to RAID5 and others. In this case, the virtual page attribute associated with each tier 303 and the attribute of each actual page included in each tier 303 are also not limited to the classification by attributes of the above-mentioned storage device types, but are also classified by the attribute of combining the above-mentioned storage device types and the RAID type from RAID1 to RAID5 and others or the attribute of combining the above-mentioned storage device types, the performance of the above-mentioned storage devices (such as the access speed), the storage capacity, and the RAID type from RAID1 to RAID5 and others.

[Embodiment 2]

The Embodiment 2 of this invention is described below. At this point, the differences from the Embodiment 1 are mainly described, and the description common to the Embodiment 1 is omitted or shortened (which is true of the following Embodiment 3 and later).

In the Embodiment 2 of this invention, instead of or in addition to the I/O frequency, with reference to the last I/O time of each VVOL or each virtual page, the VOL-based or page-based migration processing is performed. The last I/O time is, as described in the Embodiment 1, if data elements are written to an actual page, registered to the monitor tables 409A and 409B. The reallocation program, instead of or in addition to the relation between the I/O frequency of a virtual page and the tier range of the tier comprising the data elements in the virtual page, with reference to the last I/O time of the virtual page, determines the virtual page to be registered to the migration page table 411. For example, a virtual page whose last I/O time is earlier than the current time by a specified length of time or larger may be registered to the migration page table 411. In that case, the migration destination of the data elements in the virtual page may be a lower tier than the tier comprising the data element in the virtual page. This is because the data elements in the virtual page with the earlier last I/O time is less probable to be input/output in the future, and is considered preferable to be allocated in a lower tier.

[Embodiment 3]

In the Embodiment 3 of this invention, in accordance with by which access pattern I/O is performed, sequential access or random access, the VOL-based or page-based migration processing is performed.

If the I/O target data is the data to which sequential access is performed and if the PDEV which is the base of the I/O destination RVOL is an HDD, the time for seeking the HDD can be short. In this case, even if the I/O target data is in an HDD of relatively low performance, the degree of performance deterioration can be considered small because sequential access is performed. Furthermore, by migrating data to which sequential access is performed to an inexpensive, low-performance PDEV, for other data to which random access is performed, more actual pages based on high-performance PDEVs can be made free. Therefore, the I/O performance of the entire storage system can be expected.

In the Embodiment 3, for example, the I/O control program 414, if data elements are written to an actual page, registers the access pattern of the I/O destination virtual page (sequential access or random access), for example, to the allocation table 407. To the allocation table 407, the performance frequency per access pattern per virtual page may be written.

The reallocation program 415, for example, for creating a migration page table 411, if the access pattern for a virtual page is sequential access (or if the performance frequency of sequential access is high), as the migration destination corresponding with the virtual page, may select a lower tier. Furthermore, for example, the reallocation program 415, even if the I/O frequency of the virtual page is higher than the maximum value of the tier range of the tier comprising the actual page allocated to the virtual page, does not have to make the data elements in the actual page the migration target.

[Embodiment 4]

In the Embodiment 4 of this invention, the two monitor tables 409B (409A), instead of being used alternately, are saved as uneditable in the CMPK 119 or other storage resources by specific timing. For example, the monitor table 409B (409A) showing the result of monitoring on Monday may be saved as the table 409B (409A) of the Monday while the monitor table 409B (409A) showing the result of monitoring on Saturday may be saved as the table 409B (409A) of the Saturday, separately from the monitor table 409B (409A) of the Monday. Doing this method increases the number of options for operating the reallocation processing.

In the Embodiment 4, for example, the reallocation program 415, just before reallocation, determines whether to save the active monitor table 409B (409A) or not, by asking the administrator or other means. If saving the table, just before the reallocation processing, the program 415 saves the monitor table 409B (409A) in the management apparatus 107 or other storage resources. The program 415 selects which monitor table 409B (409A) to refer to for creating the migration page table 411 from the multiple saved monitor tables 409B (409A) and, by using the selected monitor table 409B (409A), can create the migration page table 411.

Though some embodiments of this invention were described as above,
it is obvious that this invention is not limited to these embodiments and also comprises any changes or modifications within the spirit and scope hereof.

For example, at least one P-VOL may also be permitted to be a virtual P-VOL, and the PDEV which is the base of the P-VOL may also be permitted to exist in another storage system. In this case, the data elements written to the actual page configuring the P-VOL may be written to the PDEV in another storage system which is the base of the P-VOL.

Furthermore, for example, the monitor table 409A or 409B, whether I/O for the actual page is performed or not, may also be permitted to be updated each time I/O for the virtual page occurs.

Furthermore, for example, in the VOL-based or page-based migration processing, for a virtual page as the allocation destination of the migration destination actual page or the VVOL comprising the virtual page, when the data elements are migrated to the migration destination actual page, the I/O frequency or the last I/O time does not have to be updated. After the migration, when I/O is performed for the actual page allocated to the virtual page or the VVOL in accordance with the I/O for the virtual page or the VVOL, the I/O frequency or the last I/O time of the virtual page or the VVOL may be updated.

Furthermore, for example, the RVOL type, instead of or in addition to the type of the PDEV comprising the RG which is the base of the RVOL, may be based on the RAID level of the RG (RAID1, RAID5 (3D+1P) and others). Therefore, for example, even if the PDEVs respectively configuring the first RG and the second RG are of the same type, if the RAID levels of the first RG and the second RG are different, that means the first RVOL based on the first RG and the second RVOL based on the second RG are of different types, and therefore, the first RVOL and the second RVOL may belong to different tiers. The tiers may also be permitted to be defined from other perspectives, regardless of the RVOL type.

Furthermore, for example, the capacity of one actual page may also be permitted to be the capacity such that multiple actual pages can be allocated to one virtual page. In this case, in page-based migration, for example, from the multiple migration source actual pages allocated to the virtual page, the data elements may be migrated to multiple migration destination actual pages respectively.

Furthermore, for example, the capacity of one actual page may also be permitted to be the capacity such that one actual page can be allocated to multiple virtual pages. In this case, in the page-based migration processing, multiple virtual pages are selected and, for those multiple virtual pages, the data elements may be migrated from the one migration source actual page to the multiple migration destination actual pages.

Furthermore, the pool VOL may also be permitted to be a virtual logical volume corresponding with the VOL provided by the external storage system. In this case, the data elements written to the actual page in the pool VOL are written to the VOL of the external storage system corresponding with the pool VOL.

Furthermore, the unit of the I/O frequency, for example, may also be permitted to be IOPS (the number of I/Os per second).

Furthermore, the range of the I/O frequency in the frequency distribution may also be permitted to be 1 (that is, the number of virtual pages may also be permitted to be counted per I/O frequency).

[Reference Sign List]
103: Storage system

The invention claimed is:

1. A storage system coupled to one or more hosts, comprising:
   multiple types of physical storage device groups; and
   a storage control device,
   wherein the storage control device comprises,
      a storage resource, and
      a controller coupled to the multiple types of physical storage device groups, the storage resource, and the host(s),
   wherein the physical storage device group is configured of one or more physical storage devices,
   wherein the multiple types of physical storage device groups are the bases of multiple types of actual page groups,
   wherein the type of an actual page group is based on the attribute of the physical storage device group which is the base of the real page group,
   wherein the actual page group comprises multiple actual pages,
   wherein the controller provides one or more virtual volumes to the one or more hosts,
   wherein the virtual volume is a virtual logical volume configured of multiple virtual pages,
   wherein the virtual pages are virtual storage areas,
   wherein the actual pages are actual storage areas, wherein the storage resource stores allocation information, which is the information indicating which actual page is allocated to which virtual page, wherein the controller receives a write command from the host, identifies the virtual page as the write destination with reference to the write command, updates the allocation information to allocate a free actual page to the identified virtual page, and stores the write target data in the allocated actual page, wherein the actual page is an actual storage area, and the data stored in the actual page is stored in the physical storage device, which is the base of the actual page, wherein the controller performs migration processing that includes the processing (A) and (B) described below;

(A) migrating the data stored in a first actual page in the actual page group of a first type to a second actual page in the actual page group of a second type, and (B) updating the allocation information to allocate the second actual page instead of the first actual page to the first virtual page, which is the virtual page as the allocation destination of the first actual page.

2. A storage system according to claim 1, wherein the storage resource stores monitor information, which indicates the I/O (Input/Output) frequency of each virtual page, wherein the controller, in accordance with the I/O to the virtual page or the actual page allocated to the virtual page, updates the I/O frequency of the virtual page in the monitor information, and wherein the first virtual page is the virtual page whose I/O frequency identified by the monitor information does not satisfy a predetermined condition.

3. A storage system according to claim 2, wherein the storage resource stores actual page group management information including the information indicating the I/O frequency range set for each actual page group type, wherein the predetermined condition is falling within the I/O frequency range of the actual page group of the first type, and wherein the actual page group of the second type is the actual page group whose I/O frequency range falls within the I/O frequency of the first virtual page.

4. A storage system according to claim 2, wherein the controller receives an I/O command from the host and identifies the virtual page as the I/O destination from this I/O command, wherein the controller, when performing I/O for the actual page allocated to the virtual page as the I/O destination, updates the I/O frequency corresponding to the virtual page as the I/O destination in the monitor information, or alternatively, when not performing I/O for the actual page allocated to the virtual page as the I/O destination, does not update the I/O frequency corresponding to the virtual page as the I/O destination in the monitor information.

5. A storage system according to claim 3, wherein the storage resource stores, as the monitor information, monitor information in the active status and monitor information in the standby status, wherein the controller updates the I/O frequency in the active monitor information, and wherein the controller, in the migration processing, with reference to the active monitor information, identifies the first virtual page as well as changes the status of the standby monitor information from standby to active, and thereafter, when performing I/O for an actual page in accordance with an I/O command by which the virtual page is identified, updates the I/O frequency of the identified virtual page in the monitor information whose status is changed to active.

6. A storage system according to claim 5, wherein the controller, using the active monitor information, creates relation information, which is the information indicating the relation between the I/O frequency and the number of virtual pages, and outputs the relation information to display the created relation information, and wherein the controller starts the migration processing upon receiving an instruction for starting migration.

7. A storage system according to claim 1, wherein the controller starts the migration processing when the usage rate of the first actual data group exceeds a specified threshold for the rate.

8. A storage system according to claim 1, wherein the actual data group of the first type is the most significant actual data group, and wherein the controller always allocates an actual page from the actual data group of the first type to the virtual page as the write destination identified by the write command.

9. A storage system according to claim 1, wherein a first and a second virtual volume exist as the virtual volumes, wherein multiple pools based on the multiple types of physical storage device groups exist, wherein a pool comprises one or more types of actual page groups and is allocated to at least one virtual volume, wherein the controller performs page-based migration processing for the first virtual volume, and performs volume-based migration processing for the second virtual volume, wherein the controller, in the page-based migration processing, migrates data from the first actual page to the second actual page in the pool allocated to the first virtual volume, and wherein the controller, in the volume-based migration processing, respectively migrates data in all the actual pages allocated to the second virtual volume in the pool allocated to the second virtual volume to actual pages in a different pool from the pool allocated to the second virtual volume.

10. A storage system according to claim 9, wherein the storage resource stores monitor information, which is the information indicating the I/O frequency of the second virtual volume, and the actual page group management information, which is the information including the information indicating the I/O frequency range set for each actual page group type, wherein the controller, in accordance with the I/O for the second virtual volume or the actual page allocated to the second virtual volume, updates the I/O frequency of the second virtual volume in the monitor information, wherein the controller, with reference to the I/O frequency range corresponding to the type of the actual page group comprising the actual page allocated to the second virtual volume, ascertains the threshold range of the I/O frequency, and wherein the controller, in a case where the I/O frequency of the second virtual volume does not fall within the threshold range, migrates the data in all the actual pages allocated to the second virtual volume to the other pool so as to acquire the threshold range within which the I/O frequency of the second virtual volume falls.

11. A storage system according to claim 10,
wherein, in the volume-based migration processing, the type of the actual page group comprising the actual pages as the migration source is the same as the type of the actual page group comprising the actual pages as the migration destination for all the actual pages as the migration source.

12. A storage system according to claim 10,
wherein, in the volume-based migration processing, for all the actual pages as the migration source regardless of the type of the actual page group comprising the actual pages as the migration source, the actual pages as the migration destination are the actual pages in the actual page group of one specified type.

13. A storage system according to claim 1, wherein the controller, in a case where the larger number of actual pages than a specified rate of all the actual pages allocated to the virtual volume exist in a certain type of actual page group, migrates, from among all the actual pages allocated to the virtual volume, the data in the actual pages in the actual page groups of other types than the certain type of actual page group, to the actual page in the certain type of actual page group.

14. A storage system according to claim 9,
wherein the storage resource stores monitor information, which indicates the I/O (Input/Output) frequency of each virtual page,
wherein the controller, in accordance with the I/O to the virtual page or the actual page allocated to the virtual page, updates the I/O frequency of the virtual page in the monitor information, and
wherein the first virtual page is the virtual page whose I/O frequency identified by the monitor information does not satisfy a predetermined condition.

15. A storage system according to claim 14,
wherein the storage resource stores actual page group management information including the information indicating the I/O frequency range set for each actual page group type,
wherein the predetermined condition is falling within the I/O frequency range of the actual page group of the first type, and
wherein the actual page group of the second type is the actual page group whose I/O frequency range falls within the I/O frequency of the first virtual page.

16. A storage system according to claim 14,
wherein the controller receives an I/O command from the host and identifies the virtual page as the I/O destination from this I/O command,
wherein the controller, when performing I/O for the actual page allocated to the virtual page as the I/O destination, updates the I/O frequency corresponding to the virtual page as the I/O destination in the monitor information, or alternatively, when not performing I/O for the actual page allocated to the virtual page as the I/O destination, does not update the I/O frequency corresponding to the virtual page as the I/O destination in the monitor information.

17. A storage system according to claim 15,
wherein the storage resource stores, as the monitor information, monitor information in the active status and monitor information in the standby status,
wherein the controller updates the I/O frequency in the active monitor information, and
wherein the controller, in the migration processing, with reference to the active monitor information, identifies the first virtual page as well as changes the status of the standby monitor information from standby to active, and thereafter, when performing I/O for an actual page in accordance with an I/O command by which the virtual page is identified, updates the I/O frequency of the identified virtual page in the monitor information whose status is changed to active.

18. A storage system according to claim 17,
wherein the controller, using the active monitor information, creates relation information, which is the information indicating the relation between the I/O frequency and the number of virtual pages, and outputs the relation information to display the created relation information, and
wherein the controller starts the migration processing upon receiving an instruction for starting migration.

19. A storage system according to claim 9,
wherein the controller starts the migration processing when the usage rate of the first actual data group exceeds a specified threshold for the rate.

20. A storage system according to claim 9,
wherein the actual data group of the first type is the most significant actual data group, and
wherein the controller always allocates an actual page from the actual data group of the first type to the virtual page as the write destination identified by the write command.

21. A storage system according to claim 9, wherein the controller, in a case where the larger number of actual pages than a specified rate of all the actual pages allocated to the virtual volume exist in a certain type of actual page group, migrates, from among all the actual pages allocated to the virtual volume, the data in the actual pages in the actual page groups of other types than the certain type of actual page group, to the actual page in the certain type of actual page group.

* * * * *